(12) United States Patent  
Frost et al.

(10) Patent No.: US 7,726,469 B2
(45) Date of Patent: Jun. 1, 2010

(54) CONVEYOR CHAIN

(75) Inventors: Charles C. Frost, Ada, MI (US); Jonathan M. Rathbun, Comstock Park, MI (US); Ryan L. Kastamo, Grand Rapids, MI (US)

(73) Assignee: Frost Links, Inc., Grand Rapids, MI (US)

( * ) Notice: Subject to any disclaimer, the term of this patent is extended or adjusted under 35 U.S.C. 154(b) by 3 days.

(21) Appl. No.: 11/781,609

(22) Filed: Jul. 23, 2007

(65) Prior Publication Data

US 2008/0011588 A1 Jan. 17, 2008

Related U.S. Application Data

(63) Continuation of application No. 10/969,825, filed on Oct. 21, 2004, now Pat. No. 7,246,699, which is a continuation-in-part of application No. 10/383,825, filed on Mar. 7, 2003, now Pat. No. 6,991,094.

(60) Provisional application No. 60/362,751, filed on Mar. 8, 2002, provisional application No. 60/367,390, filed on Mar. 25, 2002, provisional application No. 60/381,518, filed on May 17, 2002, provisional application No. 60/425,577, filed on Nov. 12, 2002.

(51) Int. Cl.
 *B65G 17/06* (2006.01)
(52) U.S. Cl. .................................. 198/851; 198/850
(58) Field of Classification Search ............. 198/851, 198/853, 850, 852
See application file for complete search history.

(56) References Cited

U.S. PATENT DOCUMENTS

| 1,660,354 | A | 2/1928 | Phelps |
| 2,059,063 | A | 10/1936 | Tourville |
| 2,293,029 | A | 8/1942 | Focke |
| 2,600,174 | A | 6/1952 | Sheehan |

(Continued)

FOREIGN PATENT DOCUMENTS

DE 3408295 10/1985

(Continued)

OTHER PUBLICATIONS

Supplementary European Search Report for corresponding European Patent Application No. 03716422.5.

*Primary Examiner*—Gene Crawford
*Assistant Examiner*—Kavel P Singh
(74) *Attorney, Agent, or Firm*—Varnum, Riddering, Schmidt & Howlett LLP

(57) ABSTRACT

A section of chain for conveying product along a material handling system includes a pin connecting a center link between two side links. The pin may be dialable or selectably positioned at the side links to control and adjust the wear surface of the pin relative to the chain links. The pin may have a rotationally non-symmetrical shaft portion to provide different wear surfaces that engage a center link of the section of chain. The different wear surfaces may be sized and shaped to accommodate wear at the wear surface of the center link. The shaft portion may include a rotationally non-symmetrical ball member or portion on the shaft portion to enhance flexibility of the section of chain. The pin may be dialed to the next position or wear surface in response to an output of a wear measurement device or system.

12 Claims, 36 Drawing Sheets

U.S. PATENT DOCUMENTS

| | | | |
|---|---|---|---|
| 2,625,830 A | 1/1953 | Transeau | |
| 3,379,072 A | 4/1968 | Kuntzmann | |
| 3,742,863 A | 7/1973 | Rosenberger | |
| 3,748,674 A | 7/1973 | Powell et al. | |
| 3,998,317 A * | 12/1976 | Stinnett | 198/810.02 |
| 4,114,467 A | 9/1978 | Petershack | |
| 4,140,025 A | 2/1979 | Lapeyre | |
| 4,151,652 A | 5/1979 | Palma | |
| 4,195,887 A | 4/1980 | Ruddell | |
| 4,413,513 A | 11/1983 | Ross et al. | |
| 4,493,680 A | 1/1985 | Hoffmann | |
| 4,750,325 A * | 6/1988 | Messier | 59/78 |
| 4,986,798 A | 1/1991 | Van Rooij et al. | |
| 5,121,831 A | 6/1992 | Fesler | |
| 5,186,280 A | 2/1993 | Mattcheck | |
| 5,215,616 A | 6/1993 | Fillar | |
| 5,305,872 A * | 4/1994 | Hutton | 198/853 |
| 5,365,765 A | 11/1994 | Gohl et al. | |
| 5,378,205 A | 1/1995 | Gohl et al. | |
| 5,423,724 A | 6/1995 | Cole et al. | |
| 5,461,852 A | 10/1995 | Nagamatsu | |
| 5,482,154 A | 1/1996 | Affeldt et al. | |
| 5,490,590 A | 2/1996 | Courtney | |
| 5,492,215 A | 2/1996 | Affeldt et al. | |
| 5,563,392 A | 10/1996 | Brown et al. | |
| 5,966,923 A | 10/1999 | Nakamura | |
| 6,098,787 A | 8/2000 | Murano | |
| 6,138,820 A | 10/2000 | Ewert | |
| 6,161,685 A | 12/2000 | Stebnicki | |
| 6,241,080 B1 | 6/2001 | Tuomikoski | |
| 6,244,426 B1 | 6/2001 | Murano et al. | |
| 6,321,523 B1 | 11/2001 | Christmas | |
| 6,364,094 B1 | 4/2002 | Alstmar | |
| 6,474,464 B1 | 11/2002 | Horton et al. | |
| 6,666,328 B2 * | 12/2003 | Sykora | 198/853 |
| 6,691,862 B1 * | 2/2004 | Mogens | 198/851 |
| 6,746,353 B2 | 6/2004 | Albertin et al. | |
| 6,991,094 B2 | 1/2006 | Frost | |
| 7,246,699 B2 | 7/2007 | Frost | |
| 2003/0029701 A1 | 2/2003 | Sykora | |
| 2004/0060203 A1 * | 4/2004 | Briscoe | 37/307 |

FOREIGN PATENT DOCUMENTS

| | | |
|---|---|---|
| DE | 4300160 | 7/1994 |
| JP | 60093017 | 5/1985 |

* cited by examiner

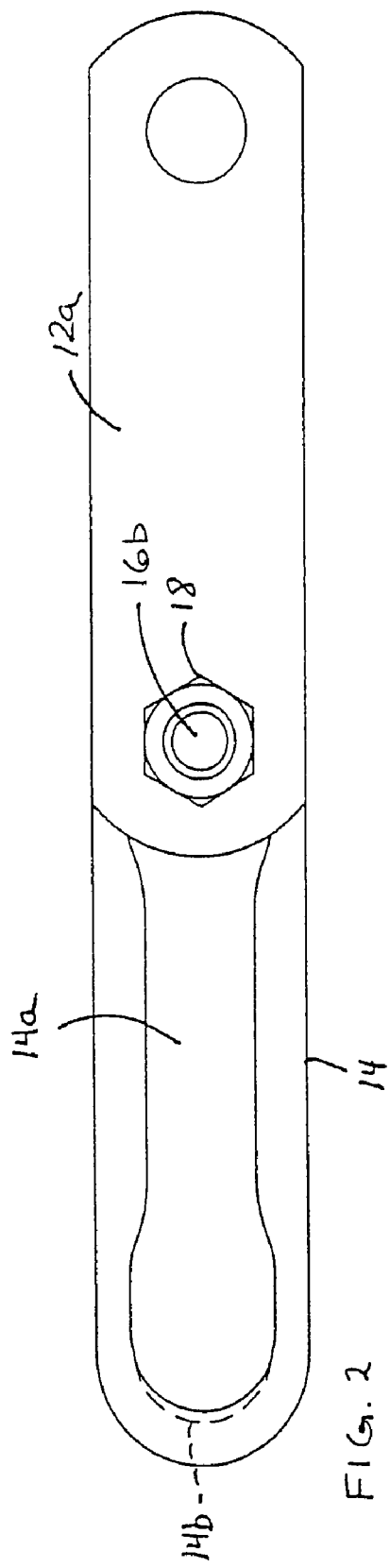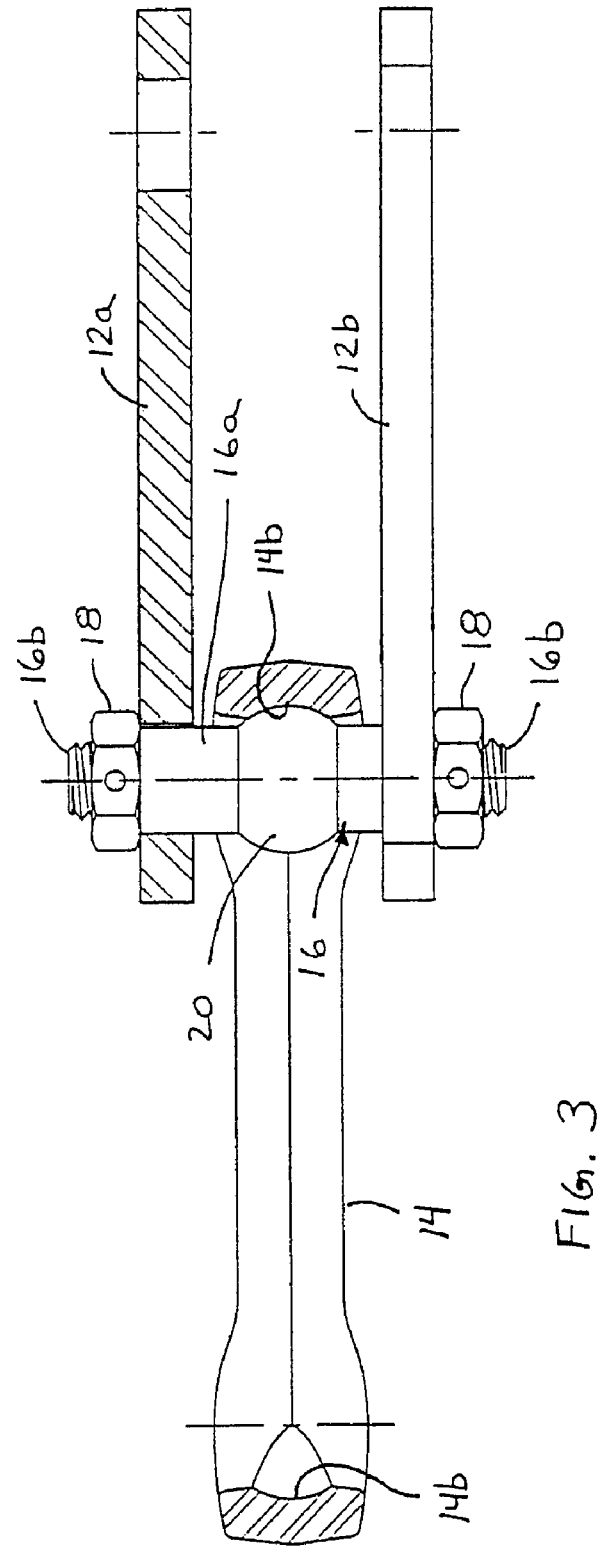

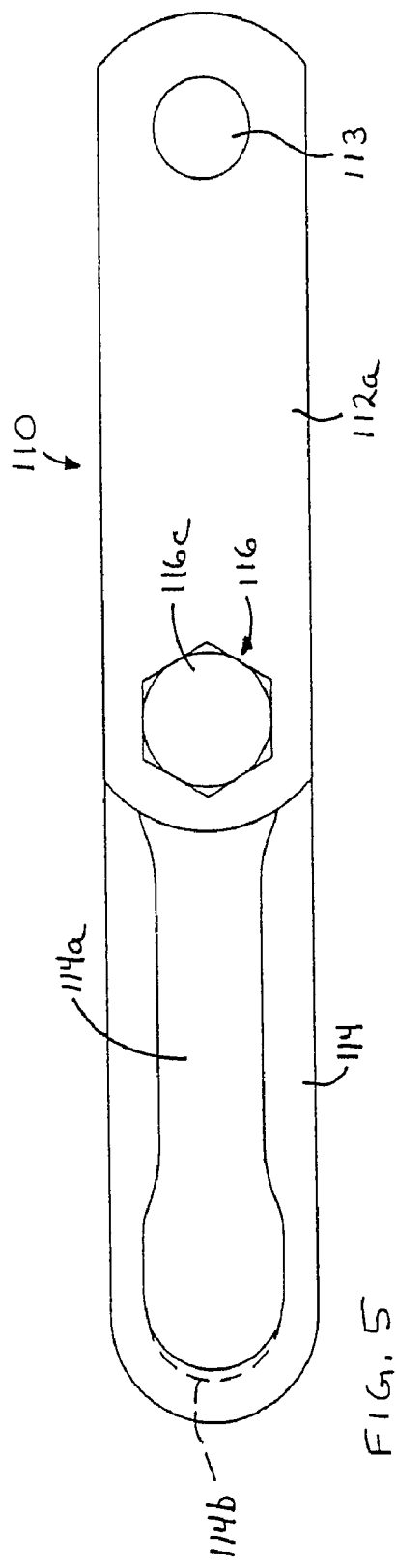
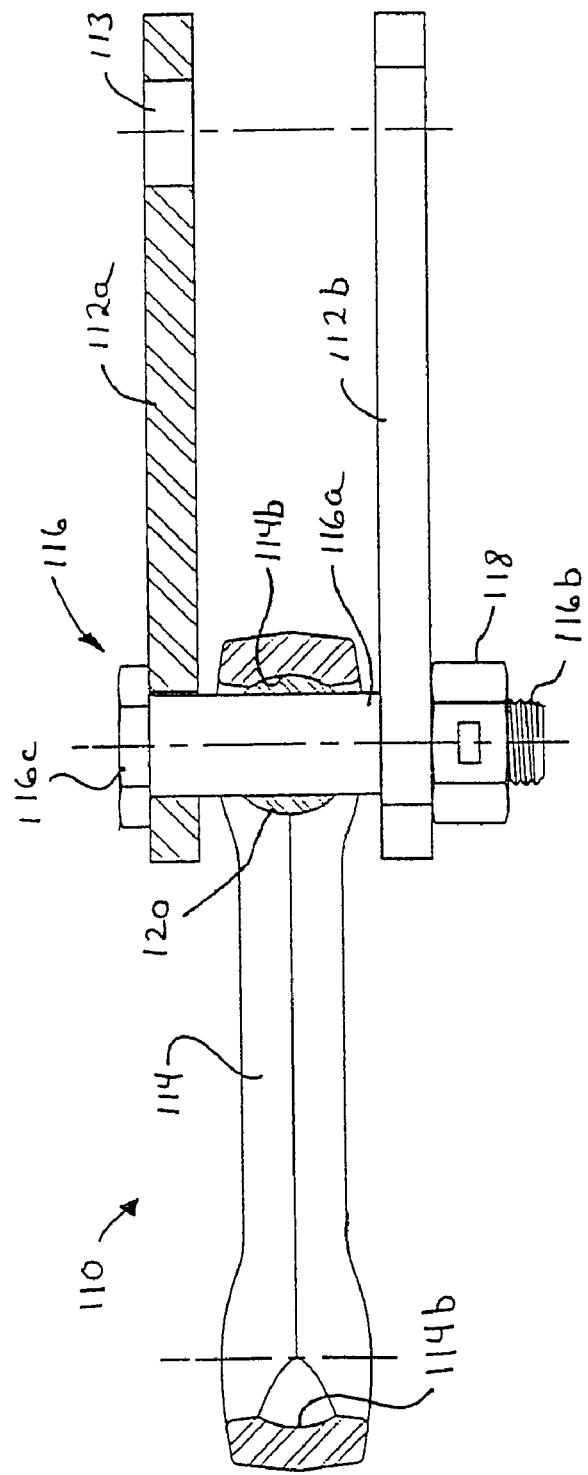
FIG. 5
FIG. 6

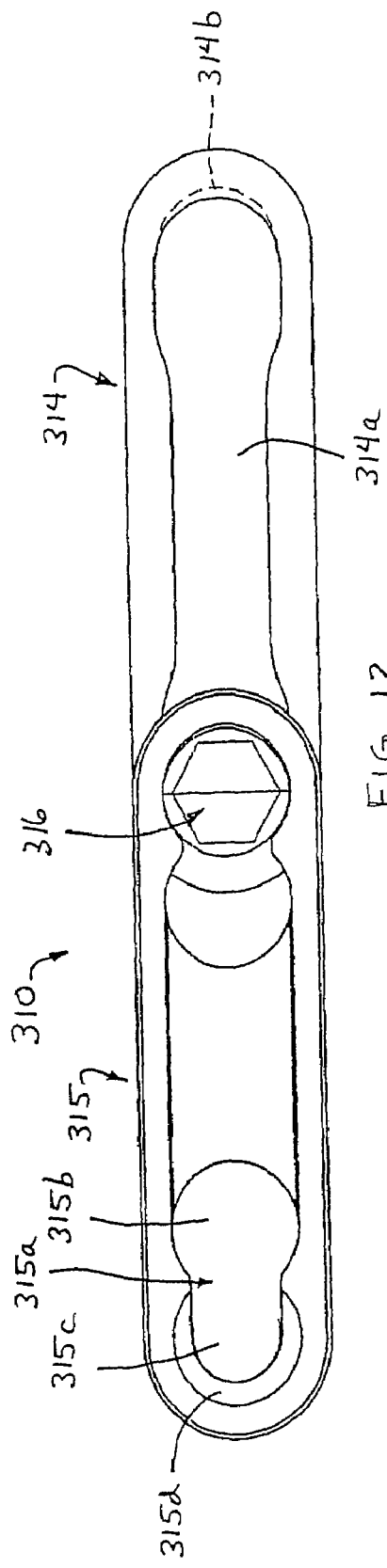
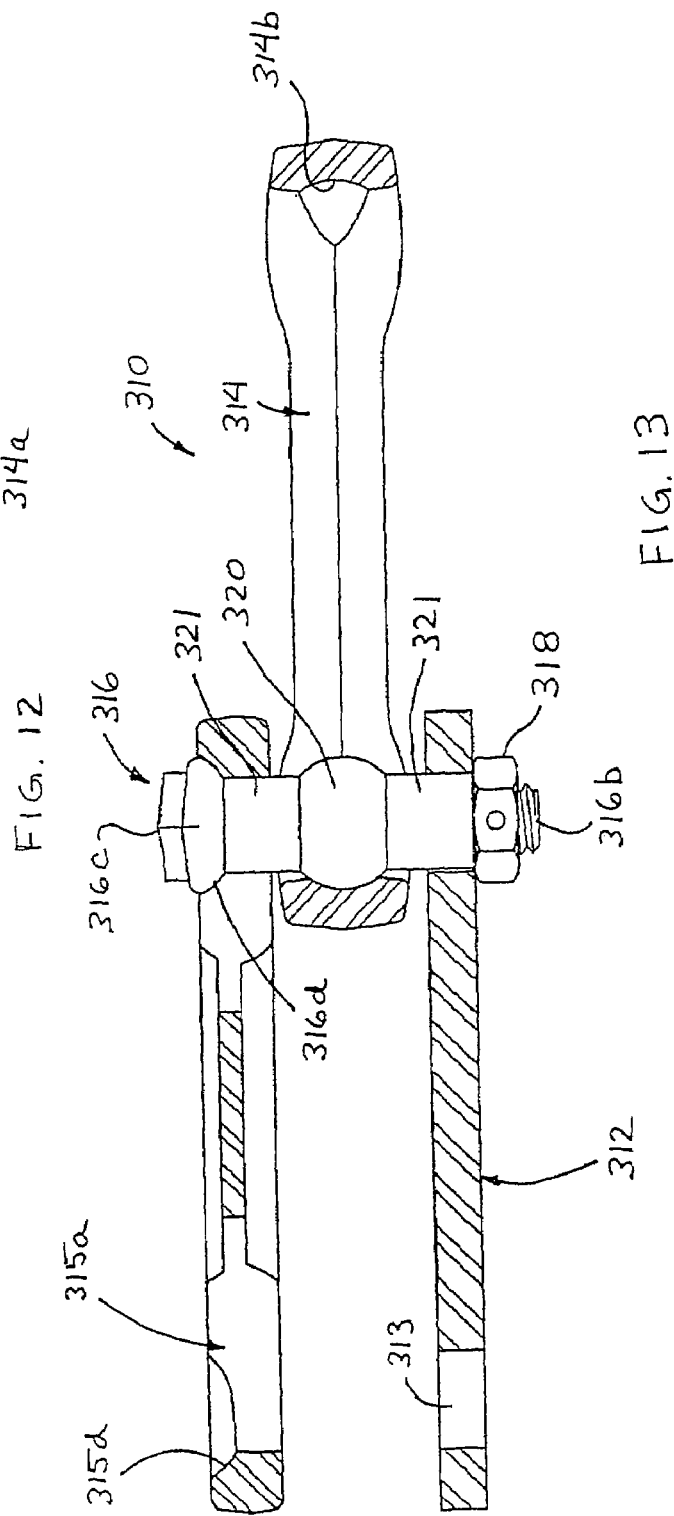
FIG. 12
FIG. 13

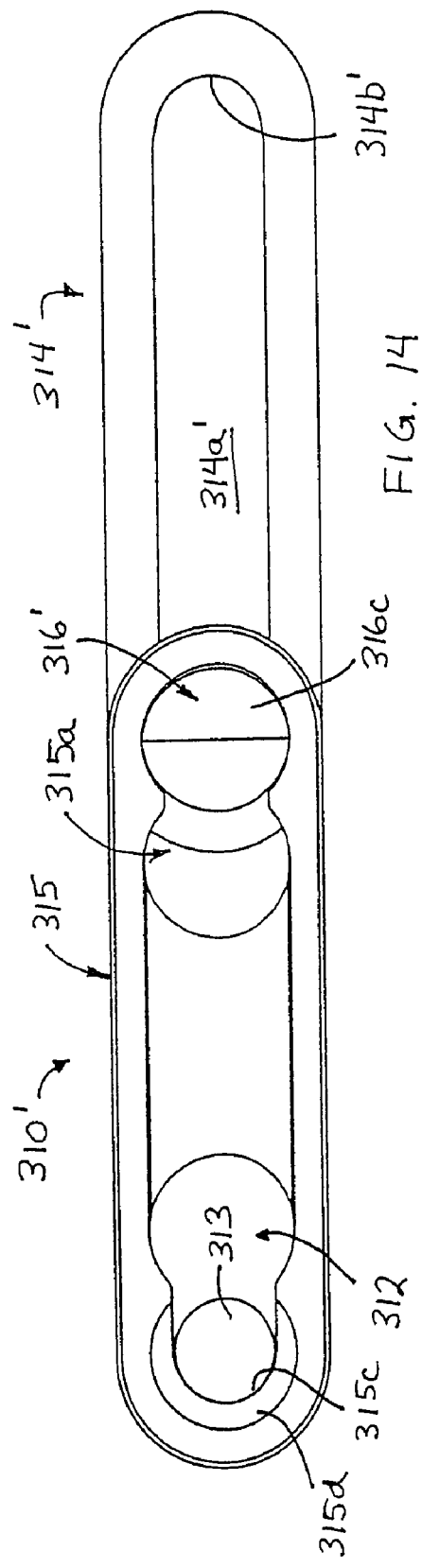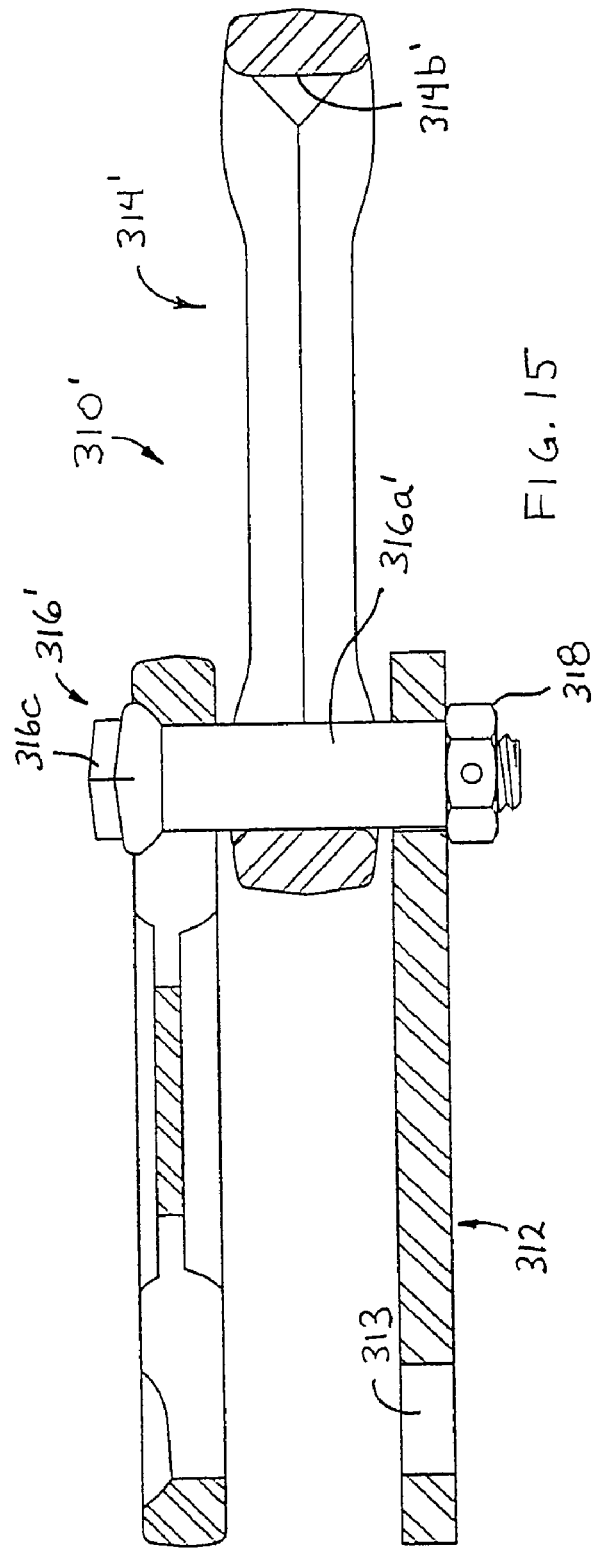

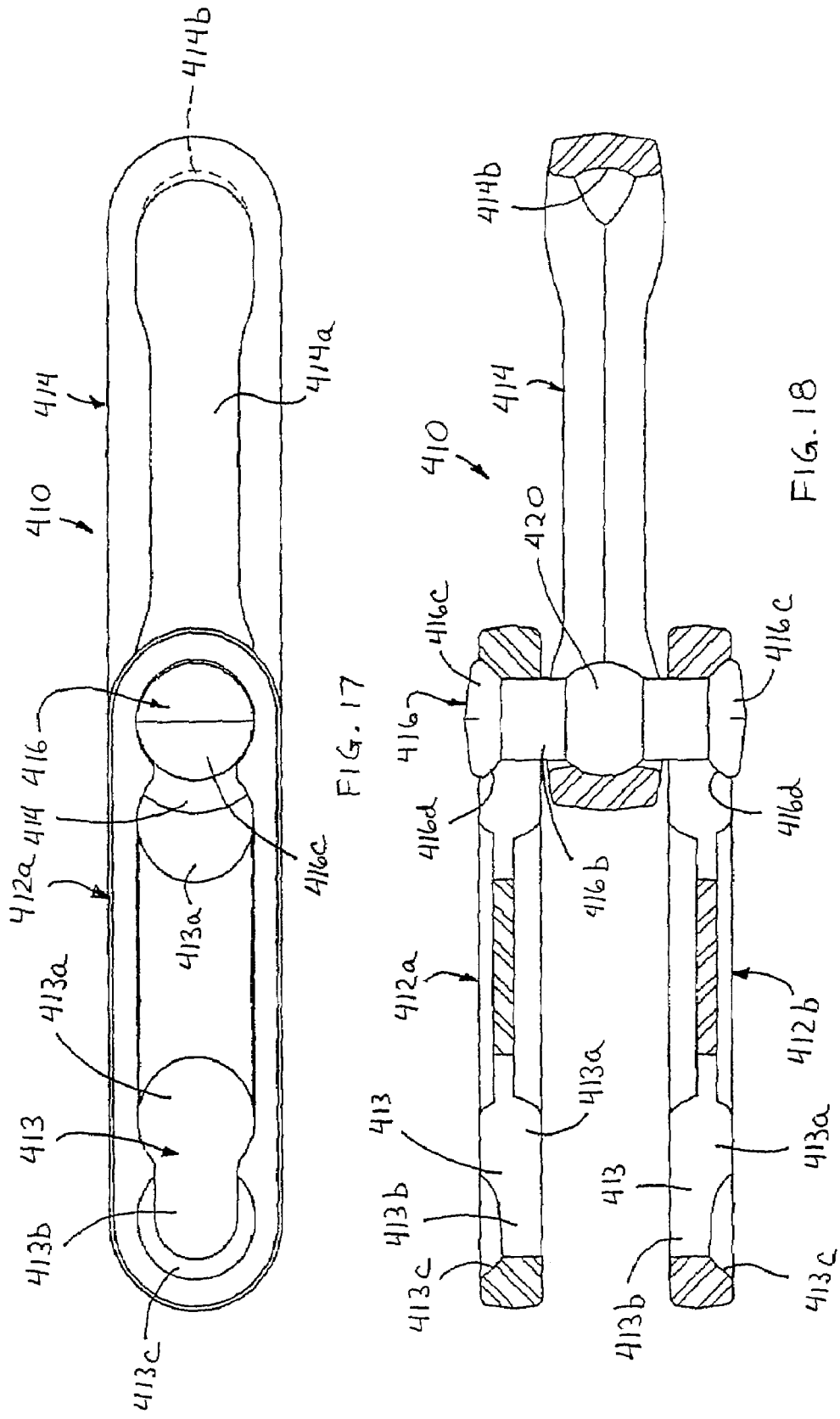

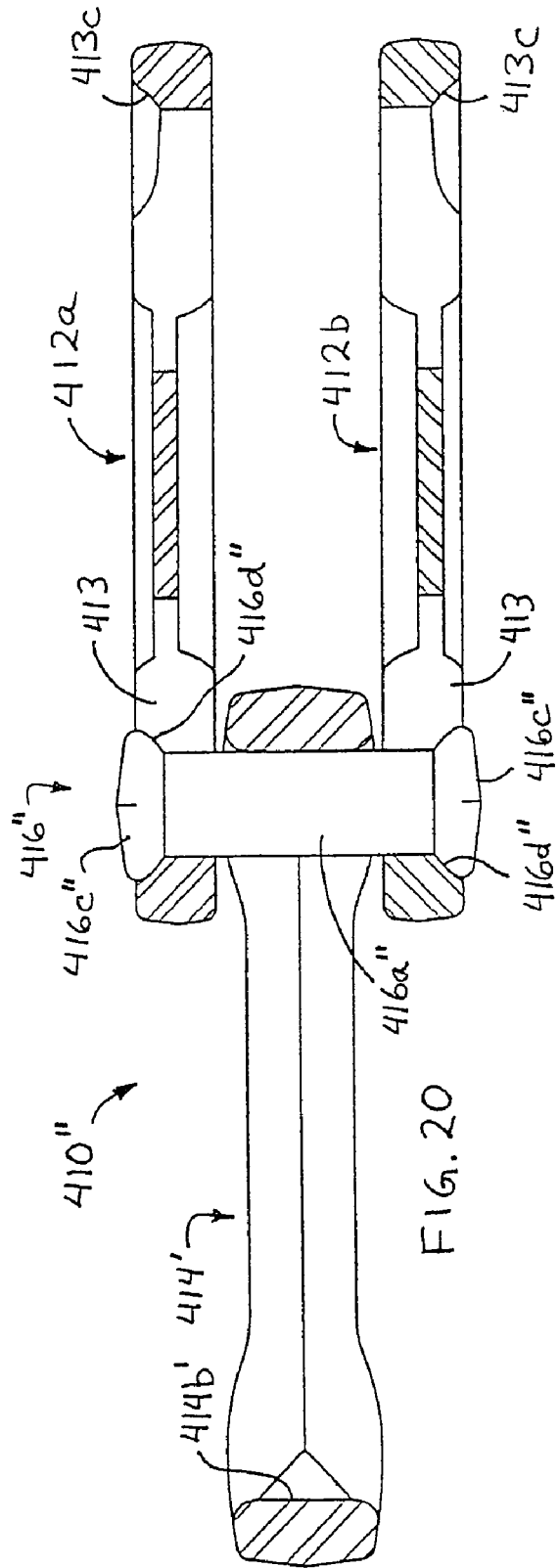
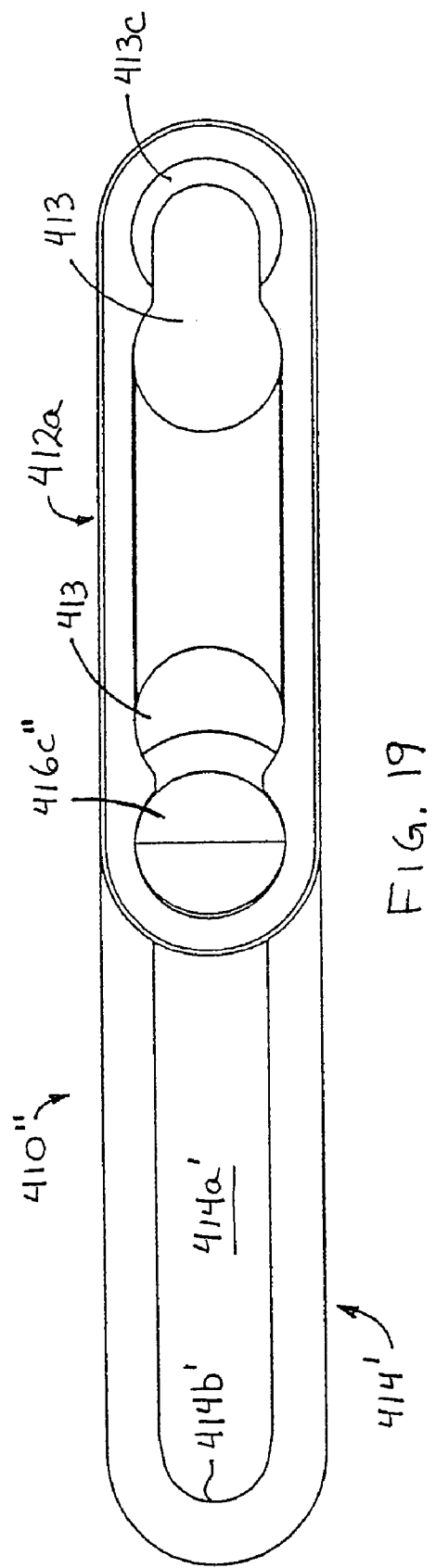
FIG. 20
FIG. 19

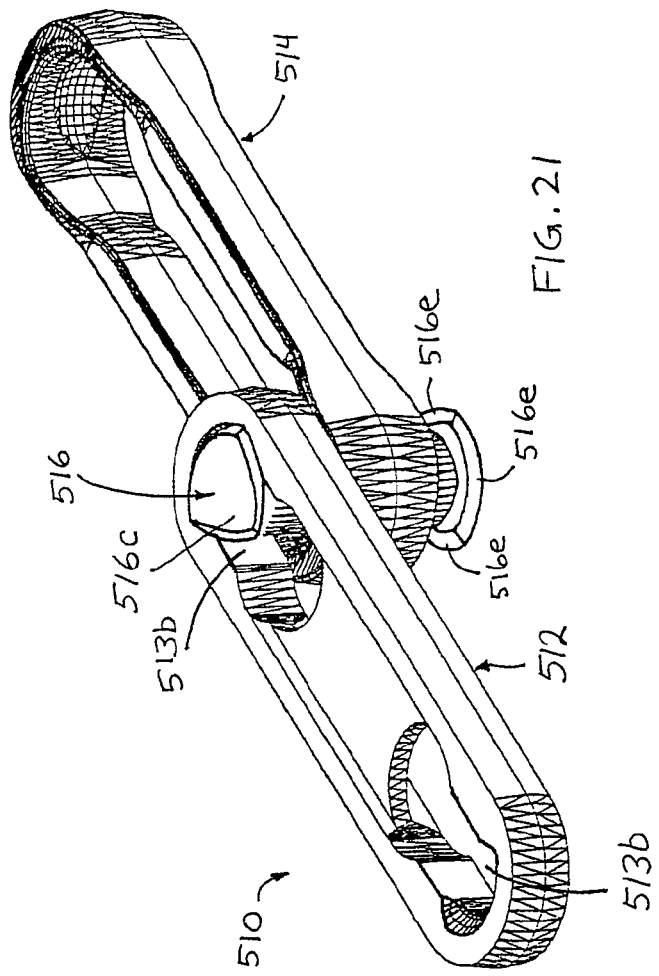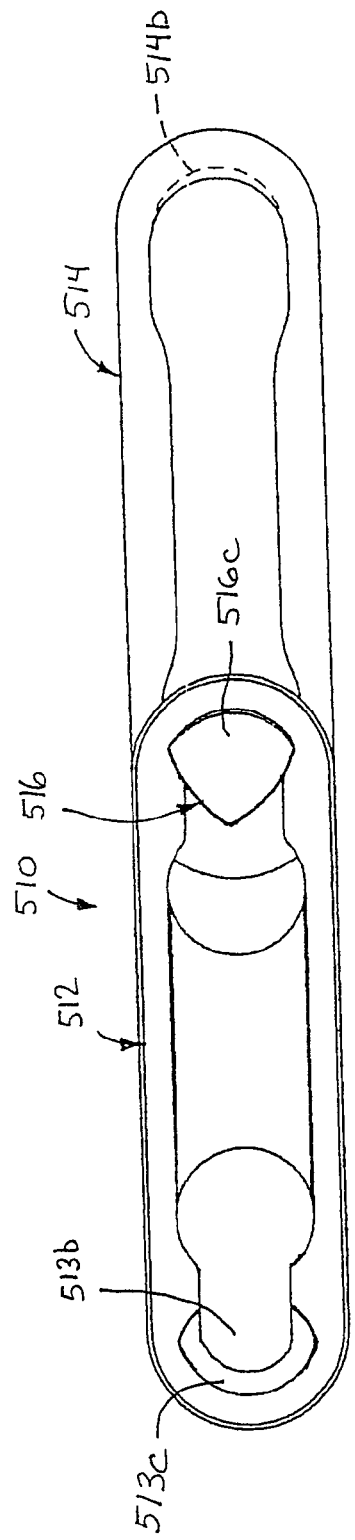

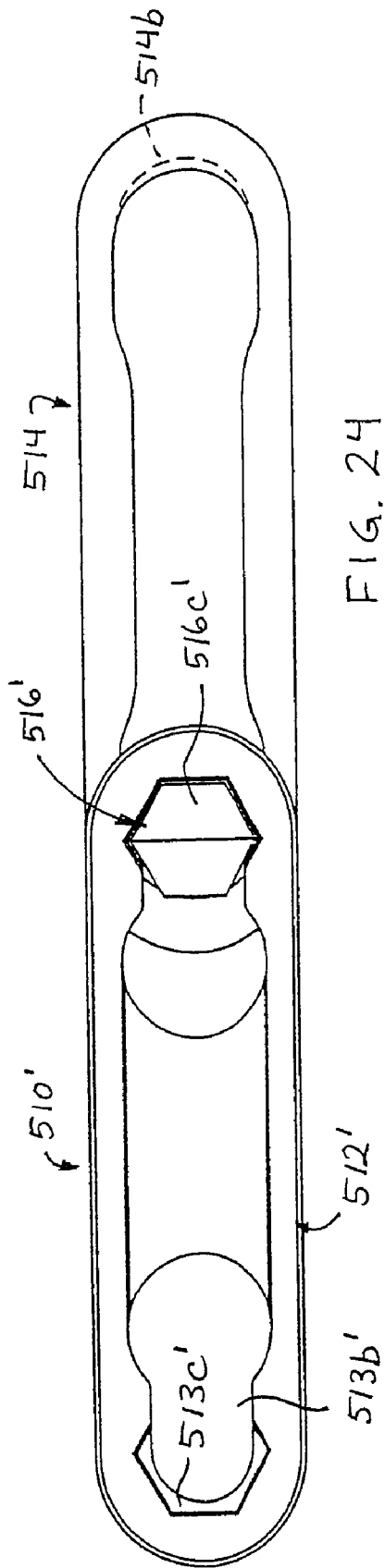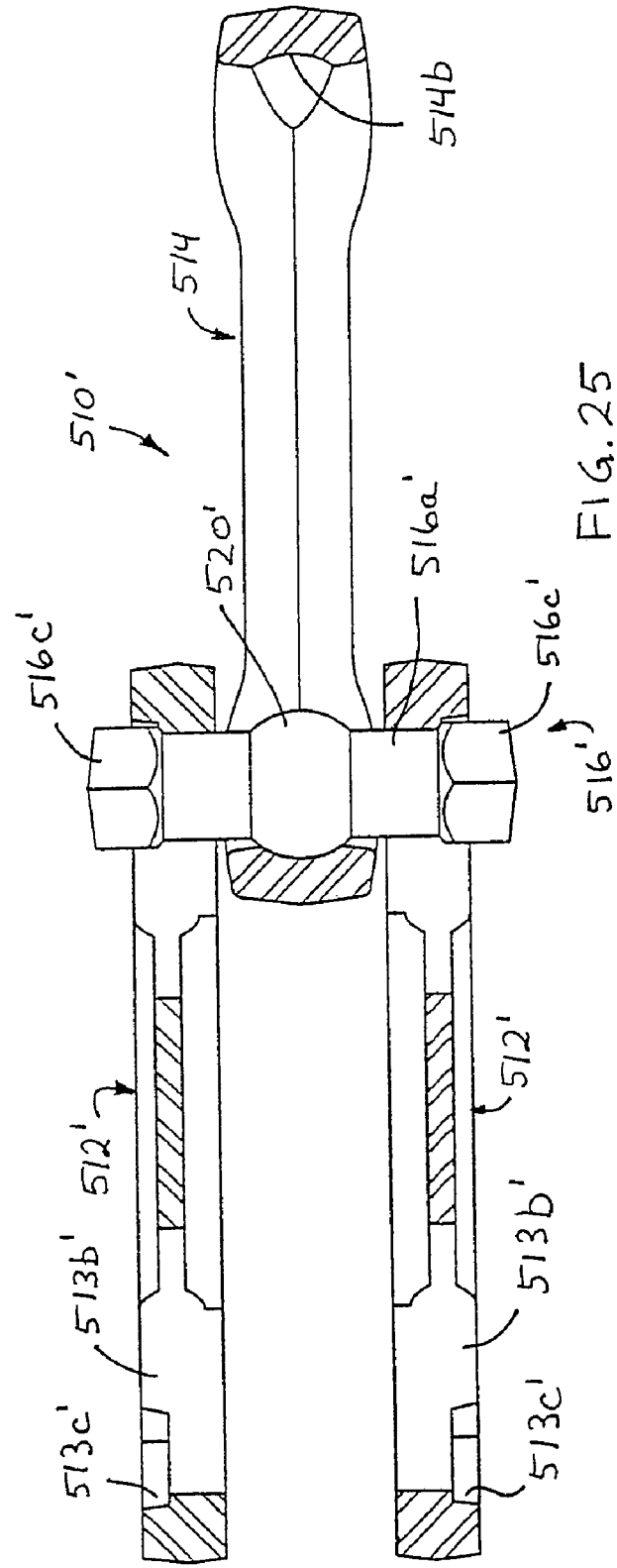

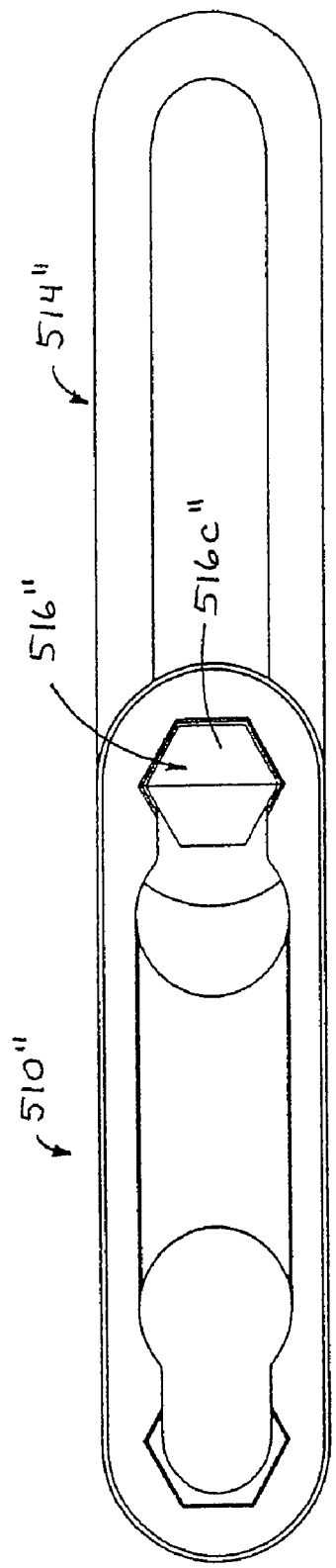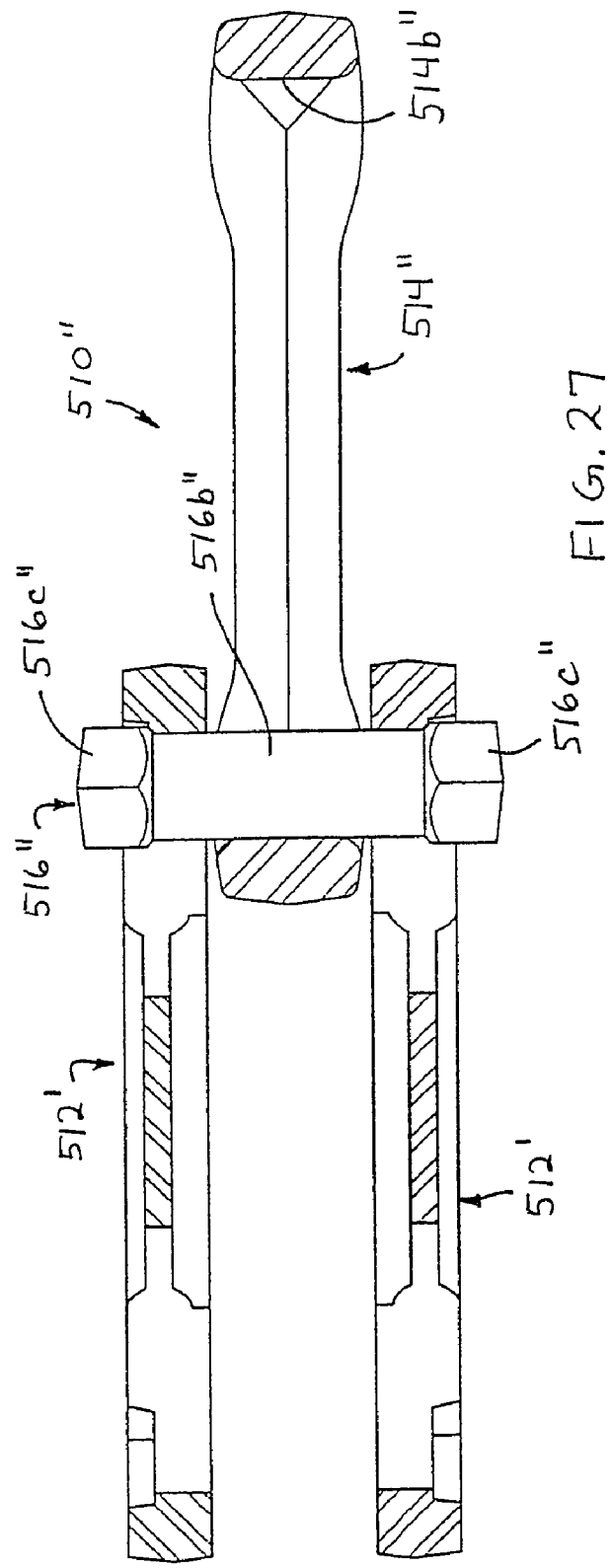

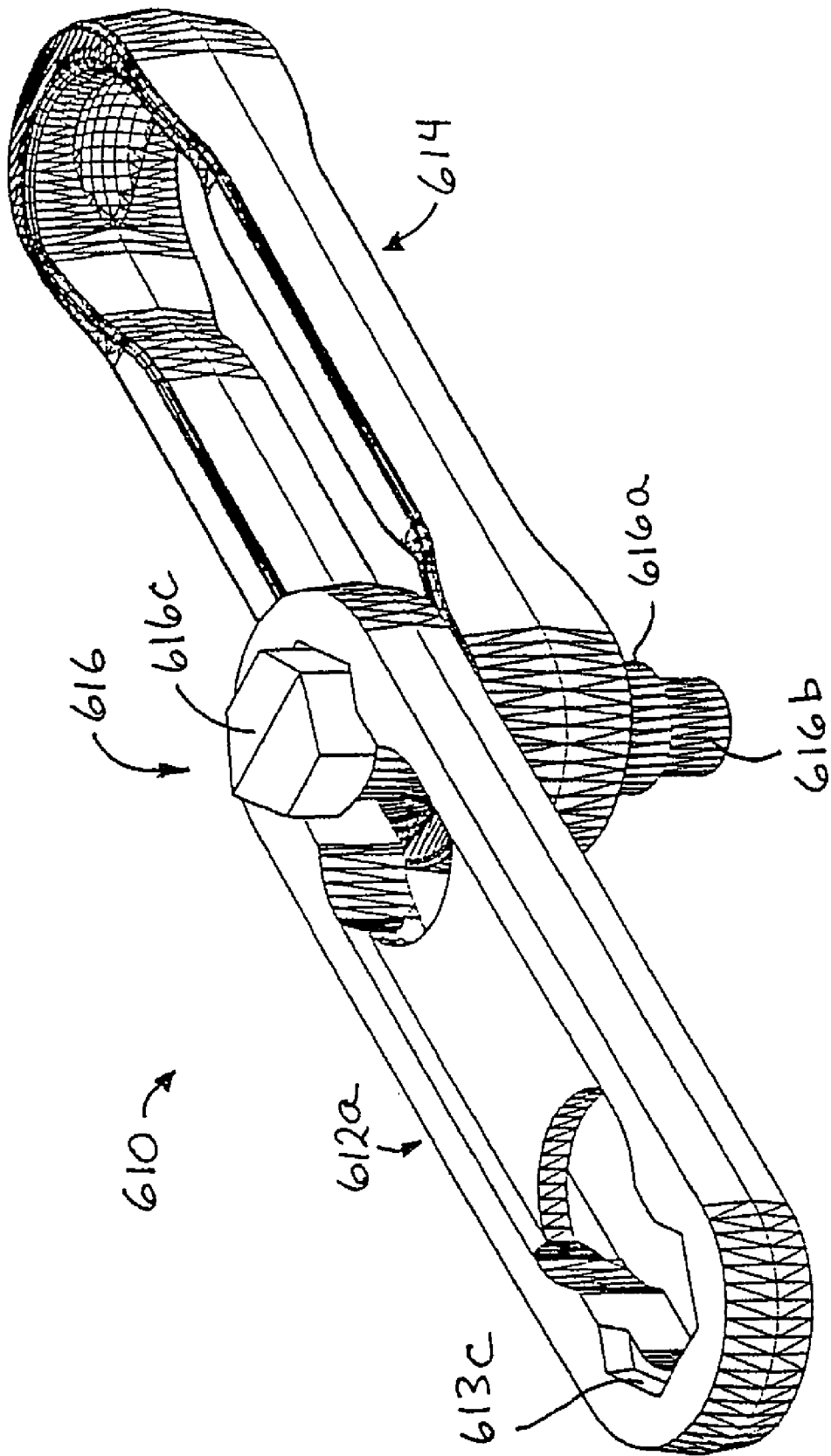

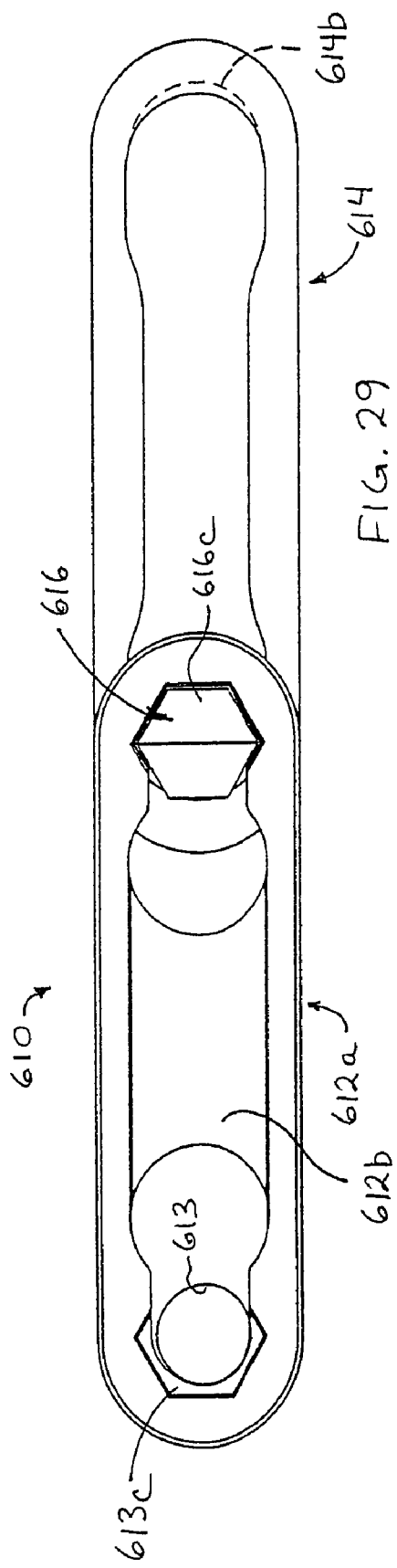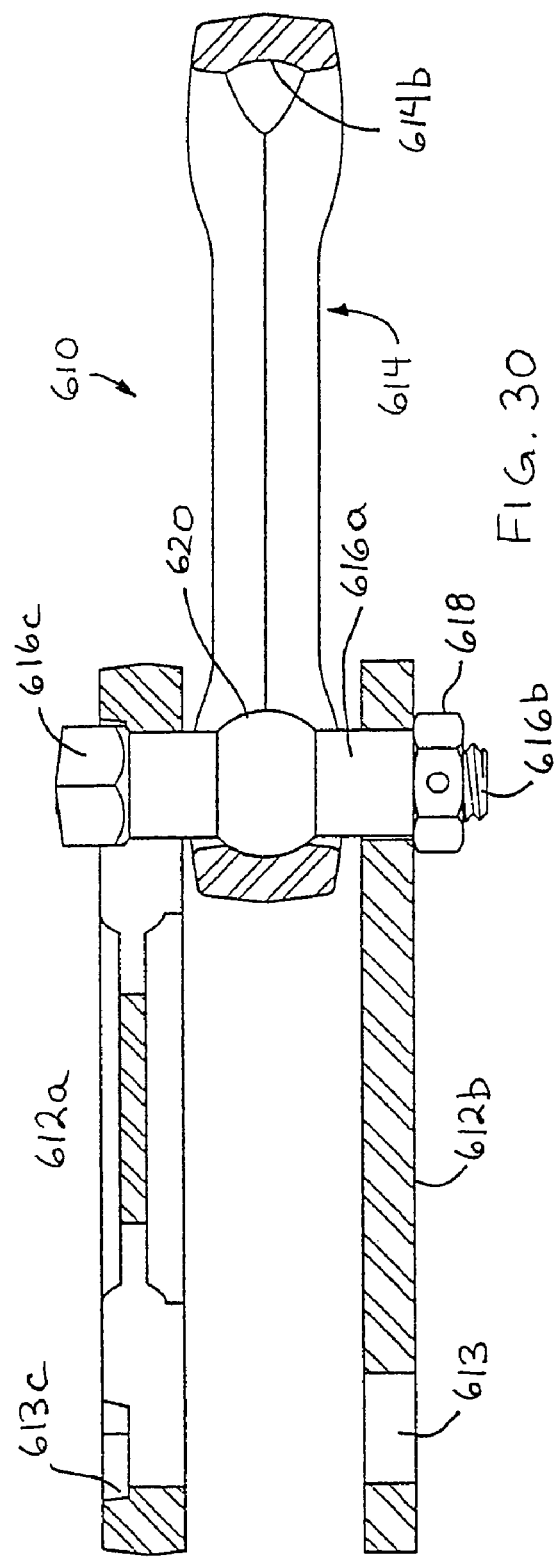

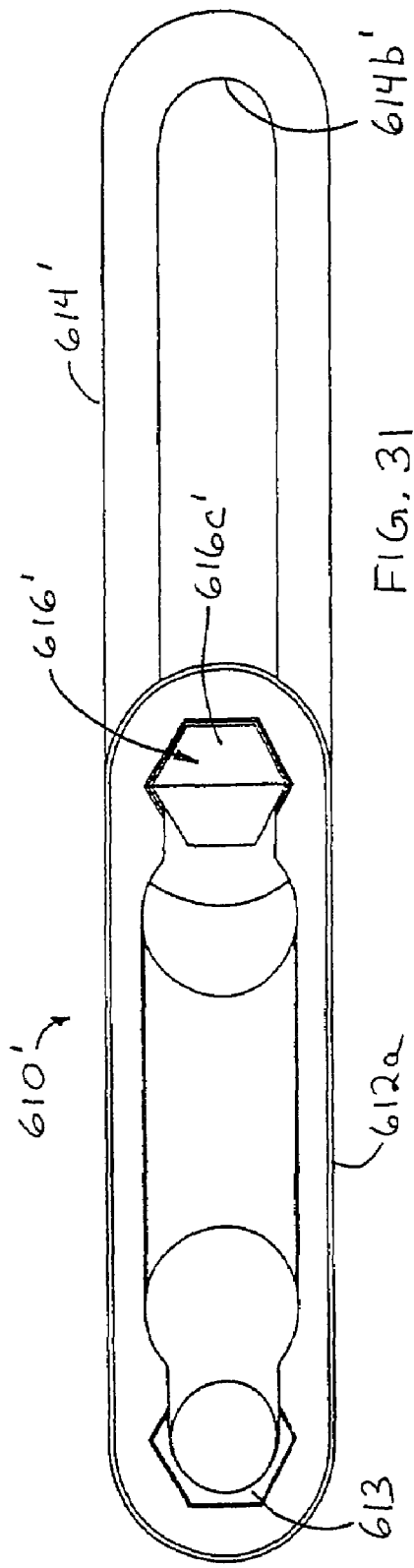
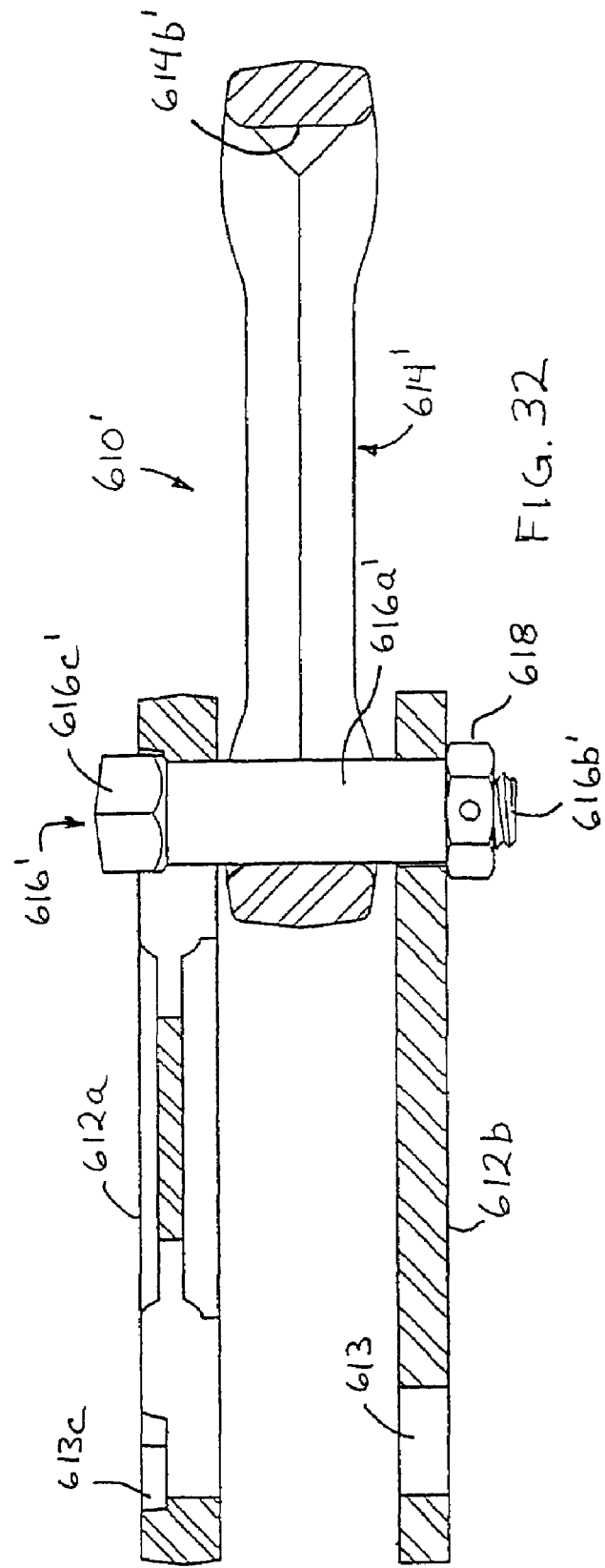

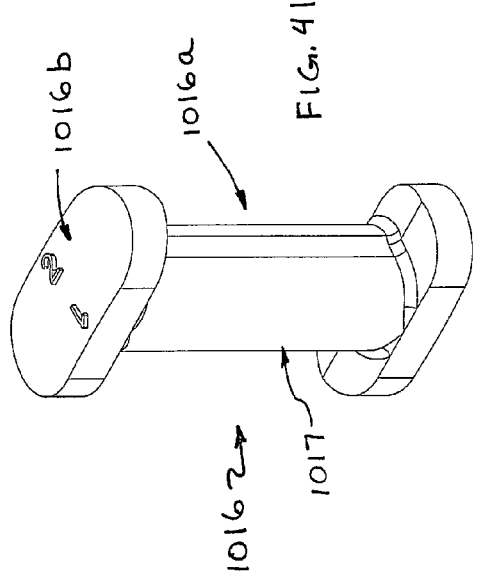
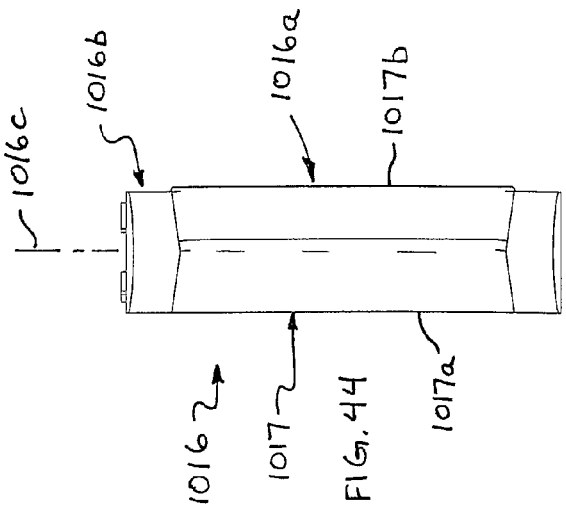
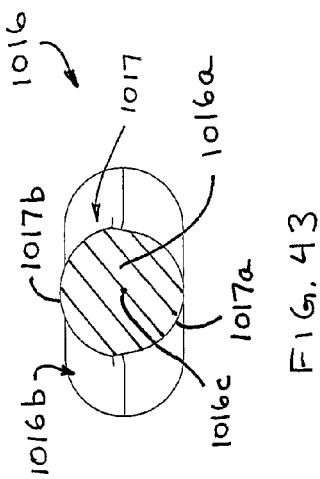
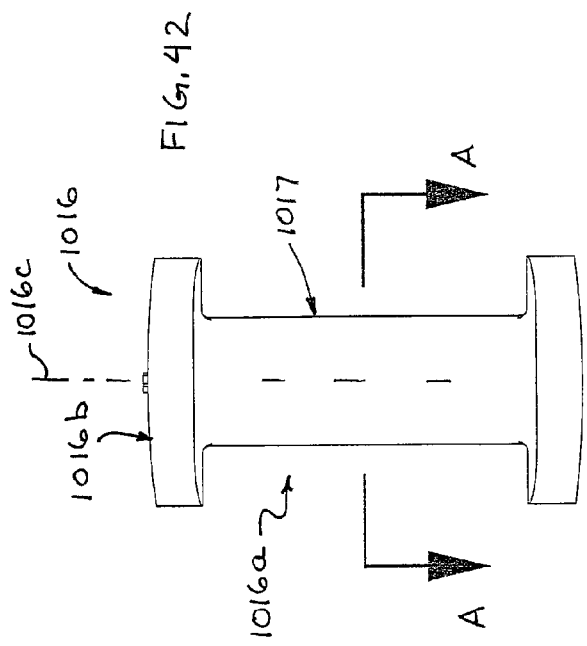

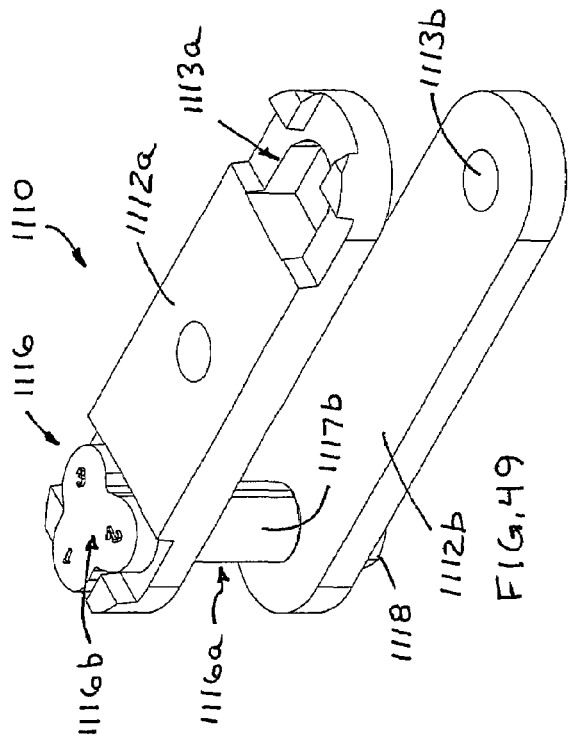
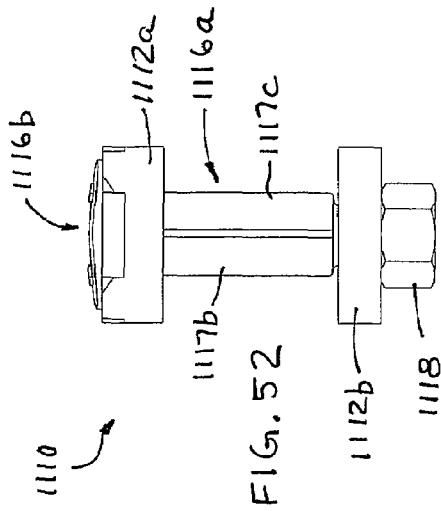
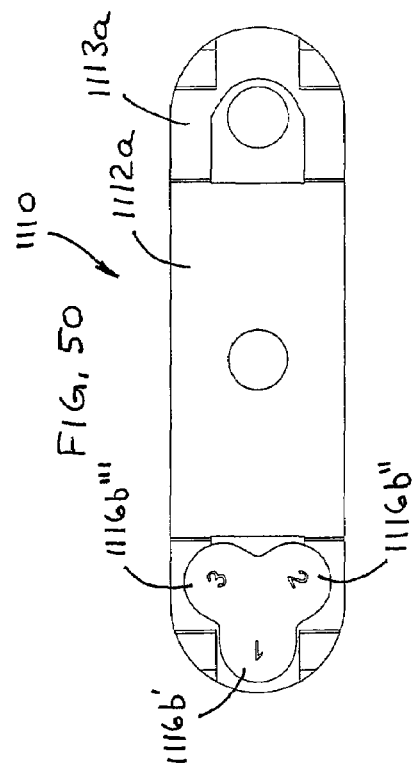
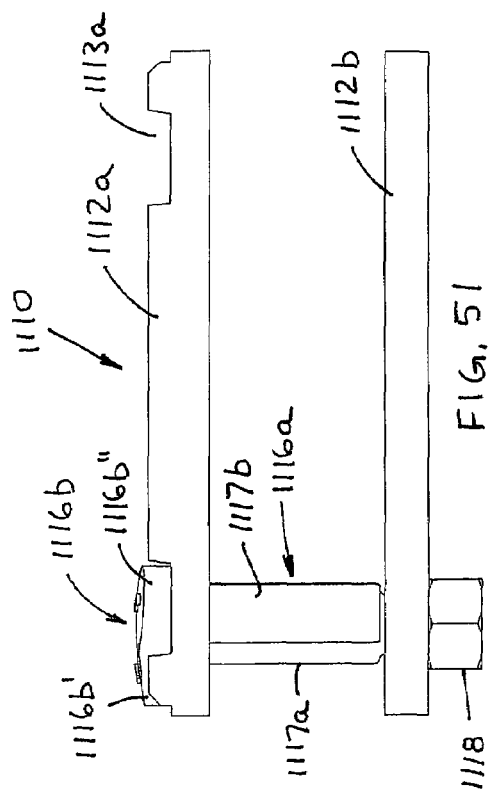

CONVEYOR CHAIN

CROSS REFERENCE TO RELATED APPLICATIONS

The present application is a continuation of U.S. patent application Ser. No. 10/969,825, filed Oct. 21, 2004, now U.S. Pat. No. 7,246,699, which is a continuation-in-part of U.S. patent application, Ser. No. 10/383,825, filed Mar. 7, 2003 by Frost, now U.S. Pat. No. 6,991,094, which claims priority of U.S. provisional application, Ser. No. 60/362,751, filed Mar. 8, 2002 by Frost; U.S. provisional application Ser. No. 60/367,390, filed Mar. 25, 2002 by Frost; U.S. provisional application, Ser. No. 60/381,518, filed May 17, 2002 by Frost; and U.S. provisional application, Ser. No. 60/425,577, filed Nov. 12, 2002 by Frost, which are all hereby incorporated herein by reference in their entireties.

FIELD OF THE INVENTION

The present invention relates generally to chains for a conveying system and, more particularly, to bolted or pinned chains which allow for pivotable movement between a center link and a pair of side links about an axis defined by a bolt or pin extending therethrough.

BACKGROUND OF THE INVENTION

Chains for power transmission or for material handling and processing systems, such as, for example, chains which function to move a plurality of trolleys or the like along a path in a processing plant, warehouse or the like, flex as the chain travels along the desired path. As the chain is routed along the desired path, the chain may flex to make lateral turns and/or upward or downward curves along the path. As the chain flexes, the links of the chain may move relative to the pins or bolts which define the joints of the chain. The relative movement of the links and the pins or bolts leads to wear on the components and may eventually lead to a failure of the links and/or the pins or bolts. The wear may increase if the friction between the pin and the links increases, such as due to a roughened surface (such as by machining grooves, scratches or the like) of one or more of the components and/or a lack of lubrication on the components.

In certain situations, the chains may have to negotiate an incline from horizontal which is approximately 45-60 degrees above or below horizontal. Such sharp inclines may result in binding of the chain links as they flex or bend along the curve. It is known to provide an I-pin chain with a ball formed on the forged I-pin between the side links and the center link of the chain. The I-pin may be forged with a ball or spherical shape at a center portion of the pin, such that the center link may be pivotable about the ball between the side links. The I-pin is fixed relative to the side link and center link of the chain, which is commonly known as "rivetless chain." The ball may provide for additional flexibility in the chain, but still wears against the center chain links as the chain links move relative to the pins.

Therefore, there is a need in the art for an improved chain that overcomes the short comings of the prior art.

SUMMARY OF THE INVENTION

The present invention is intended to provide enhanced flexibility of chain links and enhanced relative movement between the chain links and pins, while reducing or controlling wear on the chain or reducing or controlling the effects of wear on the chain components.

According to another aspect of the present invention, a pin for connecting chain links together to define a section of chain for conveying product along a conveying system comprises opposite end portions for engaging at least one link of the section of chain, a shaft portion extending between the opposite end portions, and a sleeve portion around and at least partially along the shaft portion. The sleeve portion is arranged on the shaft portion to engage another link of the section of chain when the opposite end portions are engaged with the at least one link of the section of chain. The sleeve portion is movable relative to the shaft portion.

In one form, the sleeve portion comprises a generally spherical or toroidal-shaped member, which may be generally centrally positioned along the shaft portion. The sleeve portion may include a spacer portion at one or both ends of the toroidal-shaped member. The shaft portion of the pin may be generally cylindrical or may have a spherical or ball or rounded portion formed thereon. In another form, the shaft portion may comprise a generally cylindrical shaft portion and the sleeve portion may comprise a generally cylindrical sleeve portion.

The sleeve portion may comprise a polymeric material. The sleeve portion may be molded onto the shaft portion of the pin, which may be an I-pin or bolted pin or the like, or the sleeve portion may be slid or removably positioned over the shaft portion of a bolted pin or stud type pin when a fastener is removed from a fastener end of the pin.

Optionally, the sleeve portion may comprise a low coefficient of friction coating on an inner surface of the sleeve portion which slidably engages the shaft portion, or the sleeve portion may comprise a low coefficient of friction coating on an outer surface of the sleeve portion which engages the other chain link.

According to another aspect of the present invention, a section of chain for conveying product along a conveying system comprises a first chain link, at least one second chain link having apertures through opposite ends thereof, and a pin. The second chain link comprises a recessed area surrounding at least a portion of the aperture. The pin connects the first chain link to the second chain link via insertion of the pin through a respective one of the apertures in the second chain link and through an opening in the first chain link. The pin has at least one head portion and a shaft portion, with the head portion defining a mating surface. The recessed area rotatably receives the mating surface of the head portion of the pin. The mating surface is correspondingly formed with the recessed area to facilitate relative rotation therebetween. The mating surface engages the recessed area of the second chain link and is rotatable relative to the second chain link as the section of chain conveys product along the conveying system.

The aperture may comprise a slotted opening having a narrowed region adjacent to the recessed area and a larger diameter region adjacent to the narrowed region. The head portion of the pin is insertable through the larger diameter region and the shaft portion is slidable through the narrowed region to the recessed area, whereby the mating surface of the head portion engages the recessed area to retain the pin in the aperture.

According to another aspect of the present invention, a section of chain for conveying product along a conveying system comprises at least two chain links having apertures through opposite ends thereof and a pin connecting the chain links together via insertion of the pin through the apertures in the chain links. The pin comprises opposite end portions and a shaft portion extending between the opposite end portions. The shaft portion defines a wear surface which engages at least one of the chain links. The pin is selectably adjustable between at least three positions relative to the chain links to adjust the wear surface of the shaft portion relative to the chain links. The pin is generally non-rotatable relative to the chain links when in each of the at least three positions.

At least one of the end portions of the pin may define at least three engaging portions for selectably engaging corresponding wall portions of the aperture of at least one of the chain links, whereby the pin is generally non-rotatable relative to the chain links by engagement of at least some of the engaging portions with at least some of the wall portions when in each of the at least three positions.

According to another aspect of the present invention, a method of adjusting a wear surface of a pin of a section of chain comprises providing a section of chain having at least two chain links having apertures through opposite ends thereof and a pin connecting the chain links together via insertion of the pin through the apertures in the chain links. The pin comprises opposite end portions and a shaft portion extending between the opposite end portions. The shaft portion defines a wear surface which engages at least one of the chain links. The pin is non-rotatably positioned relative to the chain links in one of at least two positions. The pin is generally non-rotatable relative to the chain links when in each of the at least two positions. The pin is selectably rotated to a different one of the at least two positions relative to the chain links to adjust the wear surface of the shaft portion relative to the chain links.

A degree of wear on the pin may be monitored and the pin may be selectably rotated to limit or control wear on wear surfaces of the pin corresponding to the at least two positions. The method may include monitoring a degree of wear on a portion of the engaged wear surface of the pin and selectively rotating the pin to position a new wear surface at the chain link in response to the degree of wear. For example, the method may include determining a degree of wear of the section of chain via a wear measurement device, and may further include selectively rotating the pin in response to an output of the wear measurement device. The pin may be marked to indicate which of the at least two positions have been selected and used.

According to another aspect of the present invention, a pin adapted for connecting at least two chain links of a section of chain includes a shaft portion and at least one head portion at at least one end of said shaft portion. The shaft portion is configured to engage at least one of the chain links. The shaft portion comprises a rotationally non-symmetrical shaft portion and has at least two wear surfaces for engaging the chain link. The at least one head portion defines at least two portions for selective engagement with a corresponding portion of the other of the chain links.

The shaft portion of the pin may include a ball member positioned thereon. The ball member may be rotationally non-symmetrical and may define the wear surfaces. The ball member may be integrally formed with the shaft portion or may receive the shaft portion therethrough, and may be removably positioned on the shaft portion.

According to yet another aspect of the present invention, a section of chain for conveying product along a conveying system comprises at least two chain links and a pin for connecting the chain links together. At least one of the chain links defines a pin engaging region. The pin engaging region defines a first wear surface. The pin has opposite end portions and a shaft portion and defines a second wear surface. At least one of the first and second wear surfaces comprises a polymeric material.

At least one of the pin engaging regions and the pin has a low coefficient of friction coating thereon. The coating may comprise a diamond like coating at at least one of the first and second wear surfaces.

According to another aspect of the present invention, a section of chain for conveying product along a conveying system comprises at least two chain links and a pin for connecting the chain links together. At least one of the chain links defines a pin engaging region. The pin engaging region defines a first wear surface. The pin has opposite end portions and a shaft portion and defines a second wear surface. At least one of the first and second wear surfaces comprises a replaceable wear surface, whereby the replaceable wear surface is removable from the at least one chain link and/or removable from the pin to facilitate replacement of the replaceable wear surface.

The replaceable wear surface may comprise a polymeric material. The replaceable wear surface may comprise a sleeve positionable around the shaft portion of the pin. The sleeve may comprise a toroidal-shaped member. The replaceable wear surface may comprise an insert at an end portion of the at least one chain link, whereby the insert engages the shaft portion of the pin. The pin engaging regions and/or the pin may have a low coefficient of friction coating thereon, such as a TEFLON® coating or a diamond like coating or the like, at the first and/or second wear surfaces.

According to another aspect of the present invention, a pin for connecting and retaining at least two chain links of a section of chain comprises a shaft portion and a replaceable wear surface member removably positioned around at least a portion of the shaft portion. The section of chain is movable to convey product along a conveying system. The replaceable wear surface is removable from the pin to facilitate replacement of the replaceable wear surface.

The pin may comprise at least one fastening portion at at least one end of the pin for receiving a fastener thereon to retain the pin at the chain links. The replaceable wear surface may be removable and replaceable via sliding the replaceable wear surface off from and onto the shaft portion at the fastening portion when the fastener is removed therefrom. The replaceable wear surface may comprise a toroidal-shaped member or a generally cylindrical member or the like. The replaceable wear surface may comprise a metallic or a polymeric material and may be coated with a low coefficient of friction material or coating.

According to yet another aspect of the present invention, an I-pin for a chain includes opposite head portions and a shaft portion. A unitary polymeric sleeve is movably positioned around at least a portion of the shaft portion of the I-pin. The polymeric sleeve may rotate or slide around the shaft portion.

The sleeve may be molded onto the shaft portion and may be broken free after it has been molded and, thus, may be generally freely rotatable about the shaft portion of the I-pin. The sleeve provides a unitary polymeric component on the shaft portion of the I-pin for engagement with the center link and/or side links of a chain. The sleeve may be molded of a durable polymeric material.

Optionally, the shaft portion of the I-pin may have a smooth exterior surface to facilitate loosening or breaking free of the sleeve about the shaft portion. A low coefficient of friction surface or material may be provided between the sleeve and the pin and/or between the sleeve and the chain links.

In one form, the polymeric sleeve may be molded in a generally spherical shape to provide a generally spherical or toroidal-shaped ball member on the shaft portion of the pin. In another form, the shaft portion of the pin may include a ball member, such that the sleeve is molded over the ball member of the pin. In another form, the sleeve may be a generally cylindrical sleeve molded over a generally cylindrical shaft portion of the pin.

According to another aspect of the present invention, a method for forming an I-pin includes forming a pin having a shaft portion and molding a polymeric sleeve portion onto the shaft portion of the I-pin. The sleeve portion may be a generally cylindrical sleeve portion or may be a generally spherically shaped ball member molded onto the shaft portion of the pin. The sleeve portion may be broken free from the shaft portion of the pin such that the sleeve portion is movably or slidably positioned on the shaft portion.

Therefore, the present invention provides a pin member or pin which may provide enhanced flexibility and wear life to a section of chain. The pin may have a movable sleeve portion around a shaft portion of the pin to reduce friction and wear on the pin and on the chain links of the section of chain. The pin may include a ball member or toroidal-shaped member at or on the shaft portion of the pin, and the center link may include a concave engaging surface for engaging the ball member, to enhance flexibility of the section of chain. The present invention may provide a rotatable pin for rotating within the chain links as the chain travels and bends along the conveying path. Optionally, the chain may be selectably rotated or dialed between two or more generally fixed orientations relative to the chain links to control the wear on the pin and enhance the life cycle of the pin. Optionally, the pin or one or more of the chain links may have a wear surface which comprises a polymeric material, which may reduce friction between the pin and chain links. The polymeric wear surface may be a polymeric insert at an end of the center link or may be a polymeric sleeve portion molded or positioned around the shaft portion of the pin. The pin may comprise an I-pin type of chain pin, a bolted type of chain pin or a double ended stud type of chain pin, and may include a generally spherical-shaped ball member or toroidal-shaped member at the shaft portion to enhance flexibility in the section of chain. Optionally, the pin and/or the chain link may have a replaceable wear surface member to facilitate replacement of the wear surface or surfaces, without having to replace the entire pin and/or chain link.

These and other objects, advantages, purposes and features of the present invention will become apparent upon review of the following specification in conjunction with the drawings.

BRIEF DESCRIPTION OF THE DRAWINGS

FIG. 2 is a top plan view of the section of chain of FIG. 1;

FIG. 3 is a side elevation and partial sectional view of the section of chain of FIGS. 1 and 2;

FIG. 5 is a top plan view of the section of chain of FIG. 4;

FIG. 6 is a side elevation and partial sectional view of the section of chain of FIGS. 4 and 5;

FIG. 12 is a top plan view of the section of chain of FIG. 11;

FIG. 13 is a side elevation and partial sectional view of the section of chain of FIGS. 11 and 12, with both side links shown;

FIG. 14 is a top plan view of another bolted section of chain with the bolted pin being rotatable relative to the chain links;

FIG. 15 is a side elevation and partial sectional view of the section of chain of FIG. 14;

FIG. 17 is a top plan view of the section of chain of FIG. 16;

FIG. 18 is a side elevation and partial sectional view of the section of chain of FIGS. 16 and 17, with both side links shown;

FIG. 19 is a top plan view of another I-pin section of chain with the I-pin being rotatable relative to the chain links;

FIG. 20 is a side elevation and partial sectional view of the section of chain of FIG. 19;

FIG. 21 is a perspective view of another ball and socket I-pin section of chain in accordance with the present invention, with the pin being selectably non-rotatably positioned at the chain links, shown with one of the side links removed to show additional detail of the pin;

FIG. 22 is a top plan view of the section of chain of FIG. 21;

FIG. 24 is a top plan view of the section of chain of FIG. 23;

FIG. 25 is a side elevation and partial sectional view of the section of chain of FIGS. 23 and 24, with both side links shown;

FIG. 26 is a top plan view of another section of chain similar to the section of chain of FIGS. 23-25, with a pin having a generally cylindrical shaft portion;

FIG. 27 is a side elevation and partial sectional view of the section of chain of FIG. 26;

FIG. 28 is a perspective view of another section of chain similar to the sections of chain of FIGS. 23-27, with a bolted-pin being non-rotatably positioned at the section of chain, shown with one of the side links removed to show additional detail of the bolted pin;

FIG. 29 is a top plan view of the section of chain of FIG. 28;

FIG. 30 is a side elevation and partial sectional view of the section of chain of FIGS. 28 and 29;

FIG. 31 is a top plan view of another section of chain similar to the section of chain of FIGS. 28-30, with a bolted-pin having a generally cylindrical shaft portion;

FIG. 32 is a side elevation and partial sectional view of the section of chain of FIG. 31;

FIG. 41 is a perspective view of a rotationally non-symmetrical pin in accordance with the present invention;

FIG. 42 is a side elevation of the pin of FIG. 41;

FIG. 43 is a sectional view taken along the line A-A in FIG. 42;

FIG. 44 is another side elevation of the pin of FIG. 41;

FIG. 49 is a chain section in accordance with the present invention;

FIG. 50 is a plan view of the chain section of FIG. 49;

FIG. 51 is a side elevation of the chain section of FIG. 49;

FIG. 52 is an end elevation of the chain section of FIG. 49;

DESCRIPTION OF THE PREFERRED EMBODIMENTS

Figure 1:
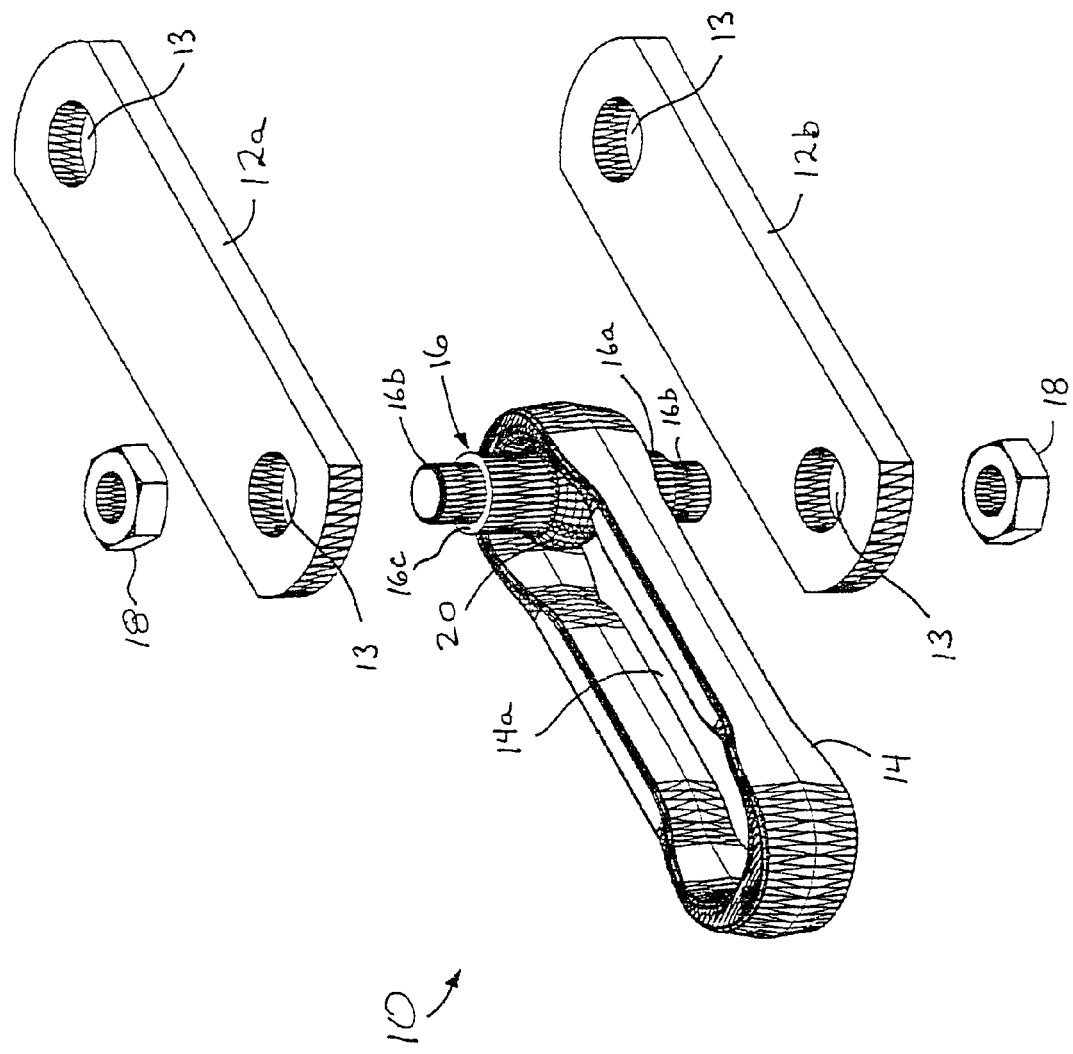
FIG. 1 is an exploded perspective view of a ball and socket bolted chain or section of chain in accordance with the present invention, having a double ended stud type pin.
Figure 1A:
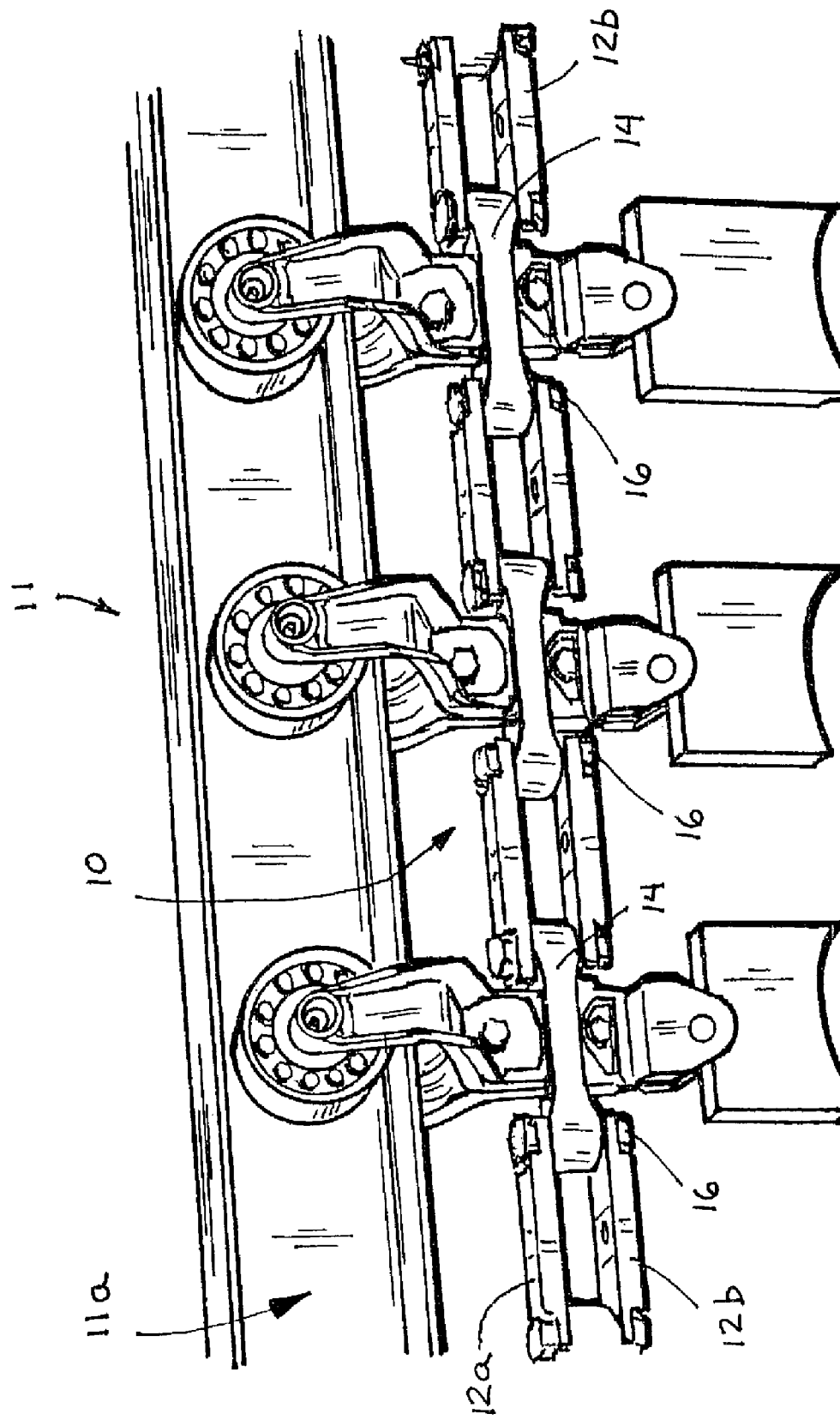
FIG. 1A is a perspective view of a portion of a material handling system incorporating a conveyor chain in accordance with the present invention.

Referring now to the drawings and the illustrative embodiments depicted therein, a chain or section of chain 10 for conveying product along a conveying system 11, such as for material handling or processing systems or the like, includes a pair of side links 12a, 12b and a center link 14 (FIGS. 1-3). The center link 14 is retained between the side links 12a, 12b by a double ended stud or stud type pin 16, which extends through a center region 14a of center link 14 and through an opening 13 in each side link 12a, 12b and is retained therein by a corresponding fastener or nut 18. Stud 16 includes a generally spherical or toroidal-shaped ball member 20 positioned generally at a mid-point or mid-region of a shaft portion 16a of stud 16. Chain 10 includes multiple linkages connected together in a continuous loop 11a about a conveying system 11 (FIG. 1A), as is known in the art. For ease of description, only one section or set of linkages of the chain is shown and described herein, with the other linkages of the chain being substantially identical.

Stud 16 includes center or shaft portion 16a and a pair of opposite threaded portions or fastener portions or ends 16b. Threaded portions 16b are of a narrower diameter than shaft portion 16a, such that the ends of center portion 16a provide an abutting surface 16c against the fastener 18 as the fastener is tightened onto stud 16 or for abutting against an inward side of the respective side link 12a, 12b, to maintain the spacing between the side links when the chain is assembled. Stud 16 may comprise a metallic material, such as steel, stainless steel or iron or the like, similar to conventional studs or pins of chain for material handling systems and the like.

Ball member 20 may be integrally formed as part of stud 16 or may be press-fit or otherwise secured on shaft portion 16a to retain the position of ball member 20 in the middle region of stud 16. However, ball member 20 may otherwise be loosely fit onto shaft portion 16a of stud 16 and allowed to slide along or rotate around stud 16, without affecting the scope of the present invention. Ball member 20 may comprise a metallic material or a plastic or polymeric material. Center link 14 is a generally oval shaped or elongated ring and includes an inner rounded or concave mating or engaging surface 14b (FIGS. 2 and 3) at each end thereof for engaging and partially receiving ball member 20 therein to retain center link 14 at ball member 20 as the chain is moved along the conveying path.

Ball member 20 thus allows for pivotal movement of center link 14 via sliding engagement of concave surface 14b along ball member 20. This provides greater flexibility to bolted chain 10 and may allow bolted chain 10 to negotiate sharper vertical curves in the conveying path without binding the links or joints of the chain. The ball member and correspondingly formed concave surface thus may distribute the loads over a generally constant surface area, reducing or substantially eliminating the stress concentration that typically occur when conventional chains articulate through vertical inclines and declines. The ball member and concave surface engagement may also function to distribute the loads between the chain links and stud or pin over a greater surface area than conventional chains. This decreases the wear on the bolt and chain links and may result in less maintenance and a greater life cycle for the chain.

Figure 4:
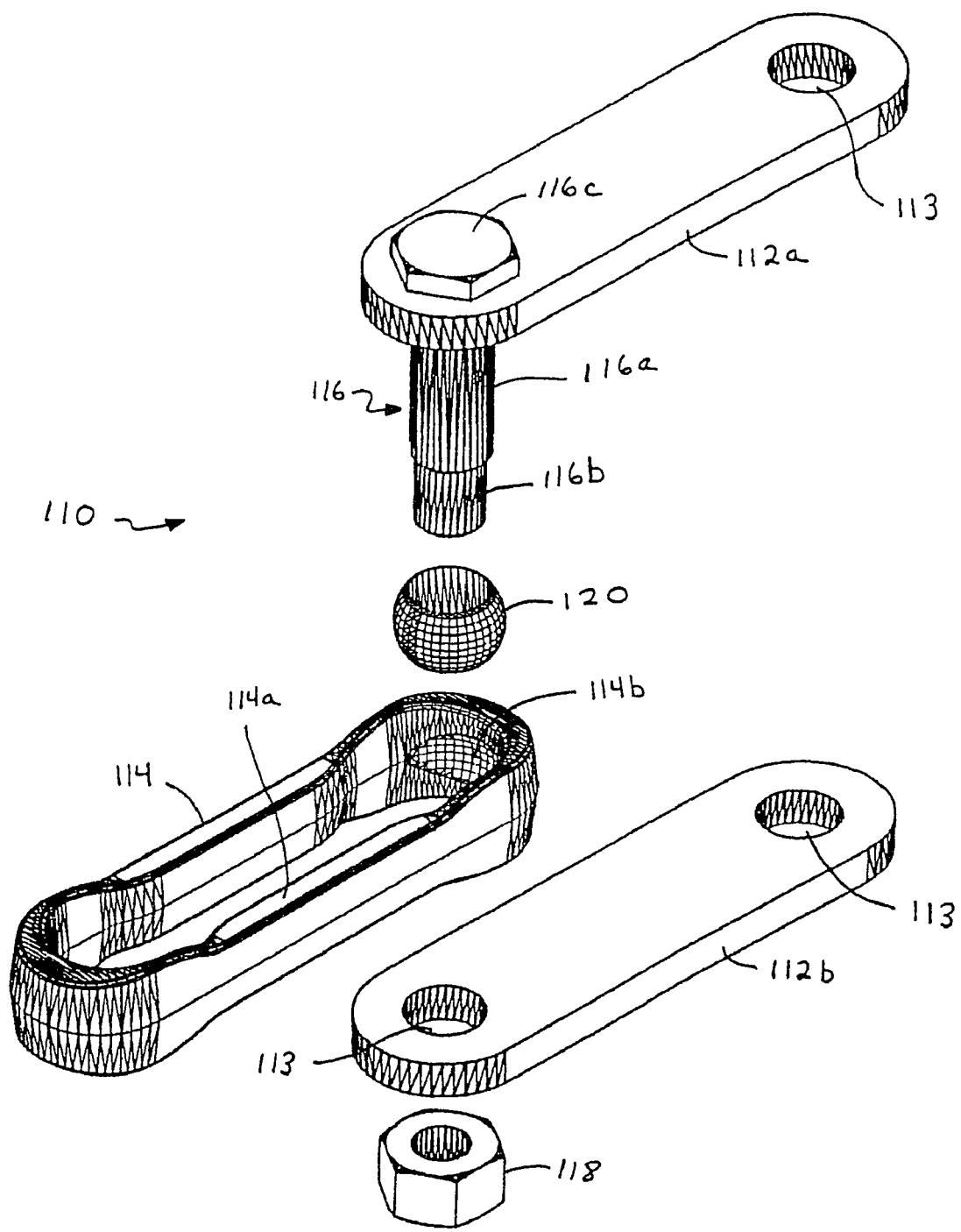
FIG. 4 is an exploded perspective view of another ball and socket bolted section of chain in accordance with the present invention.

Referring now to FIGS. 4-6, a chain or section of chain 110 includes a pair of side links 112a, 112b and a center link 114. The center link 114 is retained between corresponding ends of the side links 112a, 112b by a bolt or bolted pin 116 extending through corresponding openings 113 and through a center region 114a of center link 114. Bolt 116 includes a shaft portion 116a, a threaded portion or end 116b, which threadedly receives a nut 118 thereon to retain the chain links together, and a head or head portion 116c at an opposite end from threaded end 116b. Bolt 116 further includes a generally spherical or generally toroidal-shaped ball member 120, which may slide onto shaft portion 116a of bolt 116. Similar to center link 14, center link 114 is a generally elongated ring with a rounded or concave surface 114b at each end thereof for engaging and partially receiving ball member 120 therein to maintain center link 114 on ball member 120.

Ball member 120 may be loosely fit along bolt 116 to ease assembly of the chain links and to allow the ball member 120, and thus the center link 114, to move between the side links as the chain links negotiate through the conveying path. Optionally, ball member 120 may snugly receive shaft portion 116a or may be press fit onto shaft portion 116a to retain ball member 120 in place on shaft member 116a of bolt 116. Because ball member 120 defines a wear surface of bolt 116, ball member 120 may be removably positioned on shaft portion 116a to allow the ball member and wear surface to be replaced without replacing the entire bolted pin, thereby reducing maintenance and replacement costs of the chain components.

Figures 7, 8:
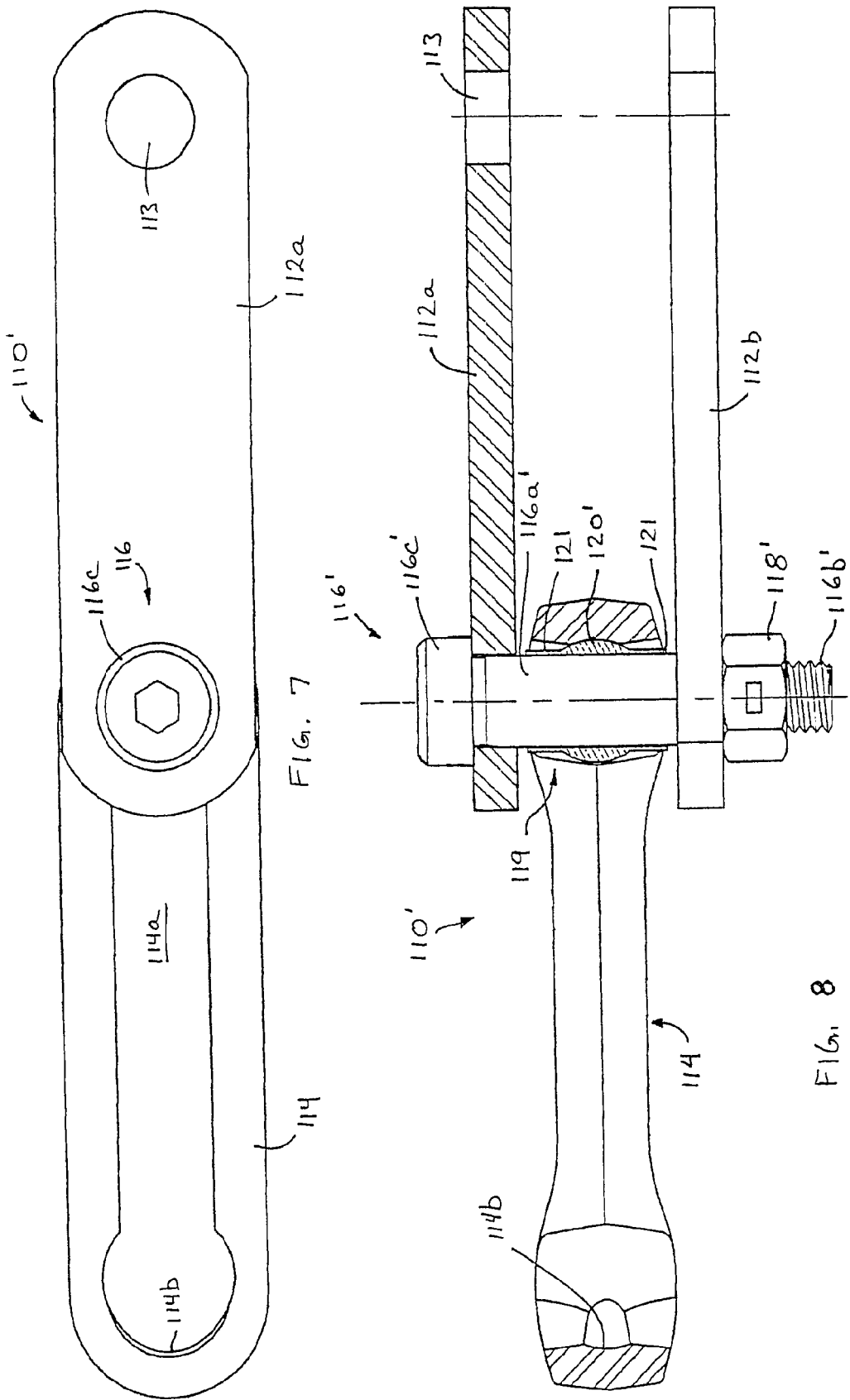
FIG. 7 is a top plan view of another ball and socket bolted section of chain in accordance with the present invention.
FIG. 8 is a side elevation and partial sectional view of the section of chain of FIG. 7.

Optionally, as shown in FIGS. 7 and 8, a chain or section of chain 110' includes side links 112a, 112b and a center link 114. The center link 114 is retained between corresponding ends of the side links 112a, 112b by a bolt or bolted pin 116' extending through corresponding openings 113 and through center region 114a of center link 114. Bolt 116' includes a shaft portion 116a', a threaded portion or end 116b', which threadedly receives a nut 118' thereon to retain the chain links together, and a head or head portion 116c' at an opposite end from threaded end 116b'. Bolt 116' further includes a sleeve portion or a spacer-ball-spacer assembly or member or portion 119 (FIG. 8), which may include a generally spherical or toroidal-shaped ball member or portion 120' and generally cylindrical spacers or sleeves 121 positioned at opposite ends of the ball member 120'. As discussed above, center link 114 may be a generally elongated ring with a rounded or concave surface 114b at each end thereof for partially receiving ball member 120' therein to maintain center link 114 on ball member 120'.

Sleeve portion 119 may slide onto shaft portion 116a' of bolt 116' or may be molded thereon. Sleeve portion 119 may comprise a metallic material, such as steel or the like, and may be treated or coated, such as with a low coefficient of friction material or slick material, such as a TEFLON® coating or material or a diamond like coating (DLC) or other suitable low friction material or the like; such that sleeve portion 119 provides a highly durable and slick wear surface or engaging surface along shaft portion 116a of bolt or pin 116. Optionally, sleeve portion 119 may comprise a polymeric material and may be slid onto or molded onto shaft portion 116a, which may comprise a metallic material.

Sleeve portion 119 may be loosely fit along bolt 116' to ease the assembly of the chain and to allow the ball member 120' and spacers or sleeves 121, and thus the center link 114, to move between the side links as the chain links negotiate through the conveying path. Sleeve portion 119 may include a hollow spacer ring or sleeve 121 positioned around and along the shaft 116a' at one or both sides of ball member 120' to maintain ball member 120' generally at a center region of the shaft 116a' of pin 116'. The spacer-ball-spacer configuration or assembly may be formed as a unitary member (as shown in FIG. 8) or may be separate components (one or two spacers and a ball member) slid onto the shaft portion 116a', without affecting the scope of the present invention. By making the spacer-ball-spacer configuration a unitary structure, assembly of the bolt and maintenance or replacement of the wear surface/ball member (if necessary) may be substantially simplified.

Such a spacer-ball-spacer configuration assists in maintaining the ball member in the center region of the shaft of the pin, while allowing for generally free rotational movement of the ball member about the shaft. This helps to keep the ball member in alignment with the recess 114b in center link 114 as the chain bends and moves along its conveying path. The spacer-ball-spacer configuration also provides for low cost replacement of the wear portions of the pin, since the spacer-ball-spacer assembly may be replaced without replacing the entire pin. For example, the nut may be removed and the spacer-ball-spacer structure (preferably a unitary structure) may be slid off of the bolt and replaced, thereby providing a new wear surface (a new ball member) to the bolted pin, without replacing the entire bolted pin. This may provide significant cost savings, especially in applications where the pin may be formed of stainless steel or other expensive materials and, thus, may be costly to replace.

Figure 9:
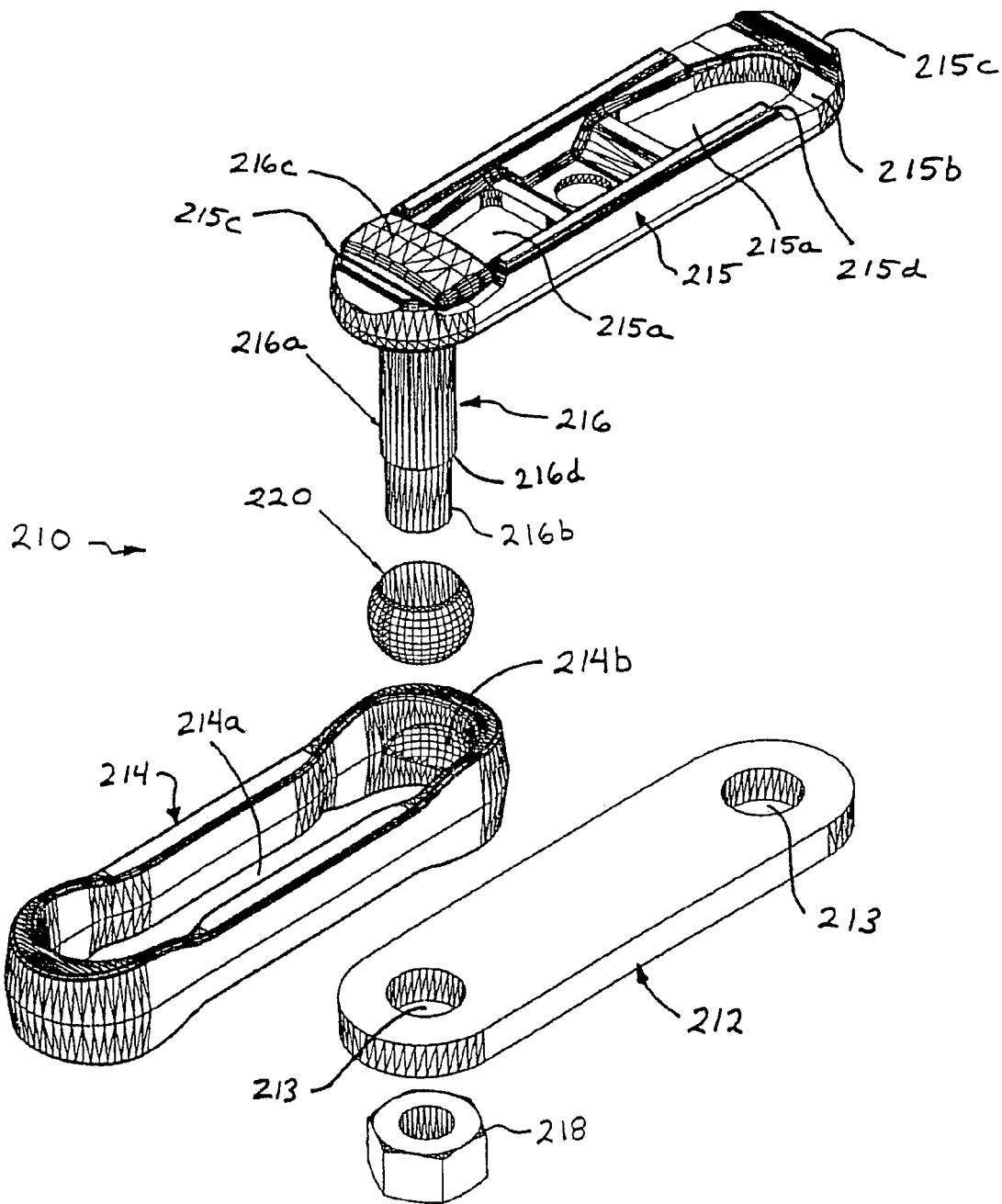
FIG. 9 is an exploded perspective view of another ball and socket section of chain in accordance with the present invention.
Figure 10:
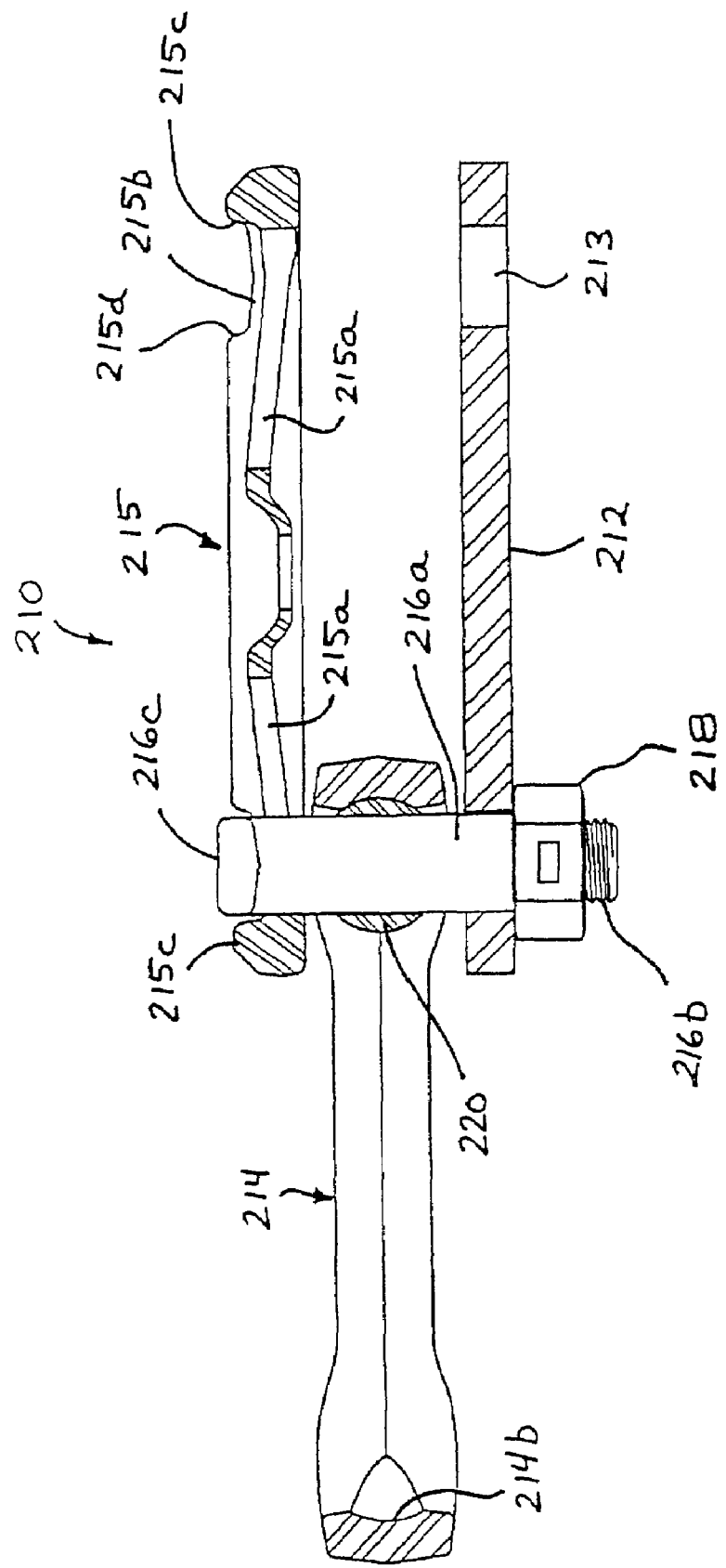
FIG. 10 is a side elevation and partial sectional view of the ball and socket section of chain of FIG. 9.

Referring now to FIGS. 9 and 10, a chain or section of chain 210 includes a pair of side links 215, 212 and a center link 214. The center link 214 is retained between the side links 215, 212 by a threaded or bolted pin 216 which extends through a center region 214a of center link 214 and through an opening 215a in side link 215 and an opening 213 in side link 212 and is retained therein and therethrough by a corresponding fastener or nut 218. Threaded pin 216 includes a generally spherical or toroidal-shaped ball member 220 positioned generally at a mid-point or mid-region of threaded pin 216. Similar to chain 10, chain 210 includes multiple linkages connected together in a continuous loop about a conveying system, as is known in the art. For ease of description, only one set of linkages of the chain is shown and described herein, with the other linkages being substantially identical.

Threaded pin 216 includes a center portion or shaft portion 216a and a threaded portion 216b at one end of the shaft portion 216a and a head or head portion 216c at the other end of the shaft 216a. Threaded portion 216b has a narrower diameter than center portion or shaft 216a, such that the end of shaft 216a provides an abutting surface 216d for abutting against the fastener or nut 218 as the nut is tightened onto threaded pin 216 or for abutting against an inward side of side link 212, to maintain the spacing between the side links when the chain is assembled.

As can be seen in FIGS. 9 and 10, head 216c of threaded pin 216 is a generally rectangular shaped head such that portions of the head 216c extend laterally outward from the end of the shaft 216a in opposite directions. Side link 215 includes a pair of slotted openings 215a which may be sized to receive head 216c therethrough when the head is rotated approximately 90 degrees from the orientation shown in FIG. 9, in order to facilitate assembly and disassembly of the chain links. Alternately, side link 215 may include circular apertures or passageways similar to side link 212, because the threaded portion 216b and shaft 216a may be inserted through such an aperture or opening to assemble the section of chain. Side link 215 includes a recessed region or pocket 215b at each end for head 216c of threaded pin 216 to rest when the section of chain is assembled. The recessed region 215b is defined by a raised end portion 215c and raised inward portions 215d which engage the sides of the head 216c to substantially preclude rotation of the pin relative to the side and center links.

Center link 214 may be substantially similar to center links 14 and 114, discussed above, and may comprise a generally oval shaped or elongated ring defining an opening 214a and having an inner rounded or concave surface 214b at each end of the center link for partially receiving ball member 220 therein to retain center link 214 at ball member 220 as the chain is moved along the conveying path.

Ball member 220 may be slid loosely onto shaft 216a of threaded pin 216 and allowed to slide and rotate along shaft 216a, or may be press fit onto or substantially fixed relative to shaft 216a, without affecting the scope of the present invention. Alternately, the threaded pin and ball member may be forged or otherwise integrally formed as a single member, without affecting the scope of the present invention.

Similar to ball members 20 and 120 of chains 10 and 110, respectively, ball member 220 of chain 210 allows for pivotal movement of center link 214 via sliding engagement of concave surface 214b along ball member 220. This provides greater flexibility to chain 210 and may allow the chain to negotiate sharper vertical curves in the conveying path without binding the links or joints of the chain. Chain 210 thus provides a half rivetless—half bolted pin which may negotiate sharper vertical turns and/or negotiate turns about different axes. The ball member and correspondingly formed concave surface thus may distribute the loads over a generally constant surface area, reducing or substantially eliminating the stress concentration that typically occur when conventional bolted chains articulate through vertical inclines and declines. The ball member and concave surface engagement may also function to distribute the loads between the chain links and bolt over a greater surface area than conventional bolted chains. This decreases the wear on the bolt and chain links and may result in less maintenance and a greater life cycle for the chain.

Although shown as having a generally rectangular shaped head, the threaded pin of the present invention may alternately have a rounded head (not shown in FIGS. 9 and 10) which may rest upon a generally flat or recessed side link, thereby allowing the threaded pin to rotate relative to the side and center links, without affecting the scope of the present invention.

Figure 11:
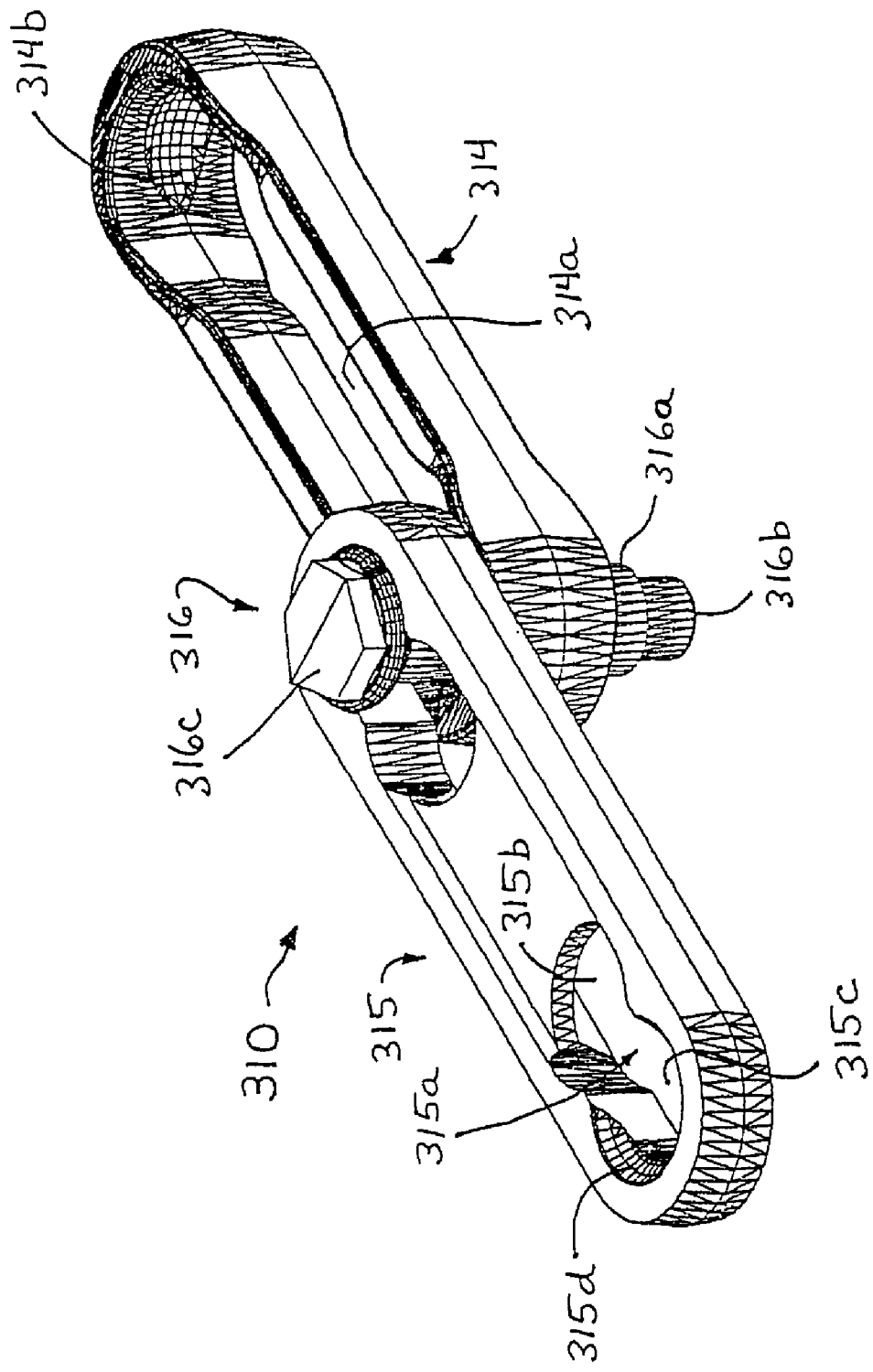
FIG. 11 is a perspective view of another ball and socket bolted section of chain in accordance with the present invention, with one of the side links removed.

Referring now to FIGS. 11-13, a chain or section of chain 310 includes a pair of side links 315, 312 and a center link 314. The center link 314 is retained between the side links 315, 312 by a threaded pin or bolted pin 316 which extends through a center region 314a of center link 314 and through an opening 315a in side link 315 and an opening 313 in side link 312 and is retained therein and therethrough by a corresponding fastener or nut 318. Threaded pin 316 includes a generally spherical or toroidal-shaped ball member 320 positioned generally at a mid-point or mid-region of a shaft portion 316a of threaded pin 316. Similar to chain 10, chain 310 includes multiple linkages connected together in a continuous loop about a conveying system, as is known in the art. For ease of description, only one section or set of linkages of the chain is shown and described herein, with the other sections or sets of linkages being substantially identical.

Threaded pin 316 includes center portion or shaft portion 316a, a threaded portion or end 316b at one end of the shaft portion 316a, and a head portion 316c at the other end of the shaft portion 316a. Threaded portion 316b has a narrower diameter than shaft portion 316a, such that the end of shaft portion 316a provides an abutting surface 316d for abutting against the fastener or nut 318 as the fastener is tightened onto threaded pin 316 or for abutting against an inward side of side link 312, to maintain the spacing between the side links when the chain is assembled. Head portion 316c may include a hex head or the like to facilitate preventing rotation of the bolt while the fastener 318 is being fastened thereto.

As can be seen in FIGS. 11-13, head 316c of threaded pin 316 is a generally circular-shaped head. Side link 315 includes a pair of slotted openings 315a which include a larger inward opening 315b, which may be sized to receive head 316c therethrough, in order to facilitate assembly and disassembly of the chain links, and a smaller outward opening 315c, which is smaller than the diameter of head 316c to retain head 316c therein. The smaller opening 315c defines a narrowed slotted region adjacent to larger opening 315b, to allow shaft portion 316a to slide along the slotted region to position head portion 316c at smaller outward opening 315c, whereby head portion 316c is retained in the smaller opening 315c, as discussed below. Alternately, side link 315 may include circular apertures or passageways similar to side link 312, because the threaded portion 316b and shaft portion 316a may be inserted through such an aperture or opening to assemble the section of chain.

Side link 315 includes a recessed area or region or pocket 315d at and at least partially around the smaller opening 315c at each end for head portion 316c of threaded pin 316 to rest when the chain is assembled. The lower portion or mating surface 316d (FIG. 13) of head portion 316c is preferably curved or rounded, while the recessed region 315d is correspondingly formed to provide generally uniform engagement and mating between the mating surface 316d of head portion 316c and recessed region 315d. The correspondingly formed mating surface and recessed region facilitate substantially smooth rotation between the pin 316 and the link 315, such that the bolted pin 316 may freely rotate relative to side links 315, 312 and center link 314 as the chain travels along its conveying path.

Center link 314 may be substantially similar to the center links discussed above, and may comprise a generally oval shaped or elongated ring defining an opening 314a and having an inner rounded or concave surface 314b at each end thereof for partially receiving ball member 320 therein to retain center link 314 at ball member 320 as the chain is moved along the conveying path.

Similar to the ball members and chains discussed above, ball member 320 of chain 310 allows for pivotal movement of center link 314 via sliding engagement of concave surface 314b along ball member 320. This provides greater flexibility to chain 310 and may allow the chain to negotiate sharper vertical curves in the conveying path without binding the links or joints of the chain. Chain 310 thus provides a half rivetless—half bolted pin which may negotiate sharper vertical turns and/or negotiate turns about different axes. The ball member and correspondingly formed concave surface thus may distribute the loads over a generally constant surface area, reducing or substantially eliminating the stress concentration that typically occur when conventional bolted chains articulate through vertical inclines and declines. The ball member and concave surface engagement may also function to distribute the loads between the chain links and bolt over a greater surface area than conventional bolted chains. This decreases the wear on the bolt and chain links and may result in less maintenance and a greater life cycle for the chain.

Ball member 320 may be slid loosely onto shaft portion 316a of threaded pin 316 and allowed to slide and rotate along shaft portion 316a, or may be press fit onto or substantially fixed relative to shaft portion 316a, without affecting the scope of the present invention. Alternately, the threaded pin and ball member may be forged or otherwise integrally formed as a single member, without affecting the scope of the present invention. Optionally, ball member 320 may be loosely slid onto shaft portion 316a, and may include a hollow spacer ring or sleeve (such as shown generally at 321 in FIG. 13) positioned along and around the shaft portion 316a at one or both sides of ball member 320 to maintain ball member 320 generally at a center region of shaft portion 316a of pin 316. The spacer-ball-spacer configuration or assembly may be formed as a unitary member or may be separate components (two spacers and a ball member) slid onto the shaft portion 316a, without affecting the scope of the present invention. By making the spacer-ball-spacer configuration a unitary structure, assembly of the bolt and maintenance or replacement of the ball member (if necessary) may be substantially simplified.

As discussed above with respect to bolted pin 116', such a spacer-ball-spacer configuration assists in maintaining the ball member in the center region of the shaft of the pin, while allowing for generally free rotational movement of the ball member about the shaft. This helps to keep the ball member in alignment with the recess 314b in center link 314 as the chain bends and moves along its conveying path. The spacer-ball-spacer configuration also provides for low cost replacement of the wear portions of the pin, since the spacer-ball-spacer assembly may be replaced without replacing the entire pin. The nut may be removed and the spacer-ball-spacer structure (preferably a unitary structure) may be slid off of the bolt and replaced, thereby providing a new wear surface (a new ball member) to the bolted pin, without replacing the entire bolted pin. This may provide significant cost savings, especially in applications where the pin may be formed of stainless steel or other expensive materials and, thus, may be costly to replace.

Referring to FIGS. 14 and 15, a chain or section of chain 310' includes a pair of side links 315, 312 and a center link 314'. The center link 314' is retained between the side links 315, 312 by a threaded pin 316' which extends through a center region 314a' of center link 314' and through an opening 315a in side link 315 and an opening 313 in side link 312 and is retained therein and therethrough by a corresponding fastener or nut 318. Threaded pin 316' includes a generally cylindrical shaft portion 316a', while center link 314' includes a generally flat or curved, non-concave surface 314b' for engaging shaft portion 316a'. Chain 310' may be otherwise substantially similar to chain 310, discussed above, such that a detailed discussion will not be repeated herein. Head portion 316c' may include a curved or rounded mating surface 316d', while side link 315 may include a correspondingly formed mating surface 315d at the smaller slotted opening 315c, as discussed above, to facilitate generally smooth rotation of pin 316' relative to the chain links. Optionally, threaded pin 316' may include a generally cylindrical sleeve portion (not shown in FIGS. 14 and 15) formed or positioned around shaft portion 316a', such as discussed above or as discussed below.

Figure 15A:
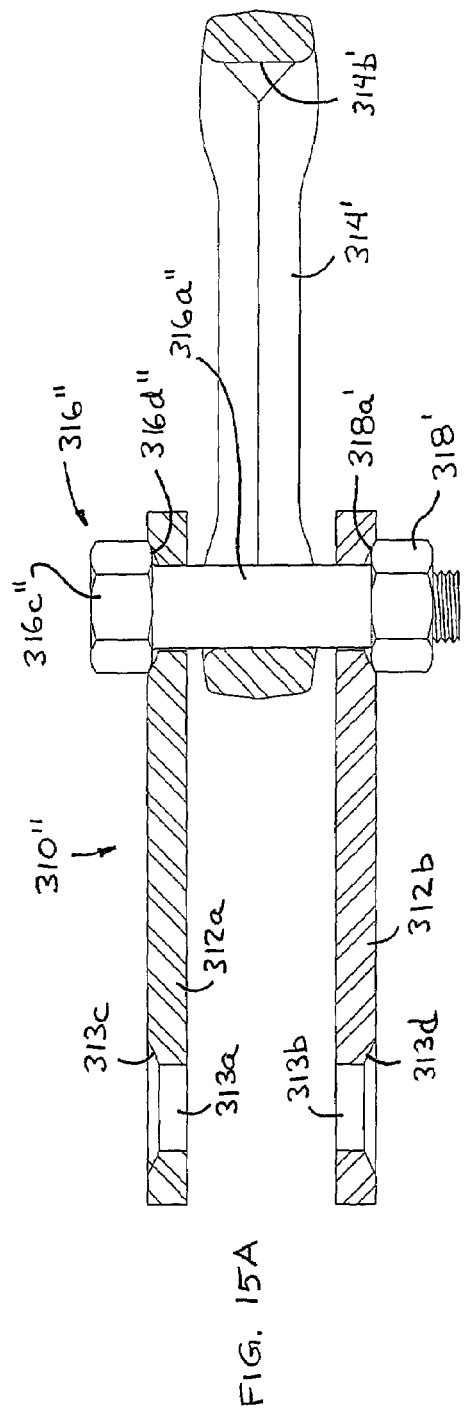
FIG. 15A is a side elevation and partial sectional view similar to FIG. 15, with a chamfered head and nut that are rotatably received within recesses on the respective side links.

Optionally, and as shown in FIG. 15A, a chain or section of chain 310" includes a pair of side links 312a, 312b and a center link 314'. The center link 314' is retained between the side links 312a, 312b by a threaded pin 316" which extends through center link 314' and through an opening 313a in side link 312a and an opening 313b in side link 312b and is retained therein and therethrough by a corresponding fastener or nut 318'. The head portion 316c" may include a curved or rounded mating surface 316d" for engaging a correspondingly formed mating surface 313c of side link 312a, while the nut or female fastener 318' may include a similarly curved or rounded or chamfered mating surface 318a' for engaging a correspondingly formed mating surface 313d of side link 312b to facilitate generally smooth rotation of pin 316" relative to the chain links. The engaging or mating surfaces 316d'" and 318a' of the head and nut may be generally correspondingly formed to match the recesses in the side links, such that the side links may be generally interchangeable without adversely affecting the rotation of the pin relative to the side links. The chamfers or curved mating surfaces may be at the ends of otherwise conventional hex heads and nuts, or may comprise generally curved circular base portions (such as shown at the head of the pins in FIGS. 11-15) of the heads and nuts to enhance rotation of the pin and reduce wear on the side links.

In the illustrated embodiment, threaded pin 316" includes a generally cylindrical shaft portion 316a", while center link 314' includes a generally flat, non-concave surface 314b' for engaging shaft portion 316a". However, the shaft portion may be otherwise formed, and may include a ball member or the like formed or positioned thereon, such as described herein. In applications with such a ball member, the side link 312a may be replaced with a side link similar to side link 315 of FIGS. 11-15 to ease assembly of the section of chain. Optionally, the threaded pin 316" may include a generally cylindrical sleeve portion (not shown in FIG. 15A) formed or positioned around shaft portion 316a", such as also discussed herein. Chain 310' may be otherwise substantially similar to chain 310, discussed above, such that a detailed discussion will not be repeated herein.

Additionally, it is further envisioned that a round headed pin may be provided with a rounded head at each end of the pin and a ball member on the shaft portion between the heads or head portions. The head portions may insert through enlarged, generally circular openings in the side links and slide outwardly toward the ends of the side links to a narrowed opening. The narrowed opening substantially precludes the circular heads from moving therethrough, and thus retains the side links relative to the center links and the pin. The side links may include a recessed area around the narrowed opening to receive the rounded head therein to substantially preclude longitudinal movement of the pin relative to the side link toward the enlarged opening in the side link. The pin is thus allowed to rotate relative to the side links and the center link, while allowing greater flexibility and reduced wear of the chain.

Figure 16:
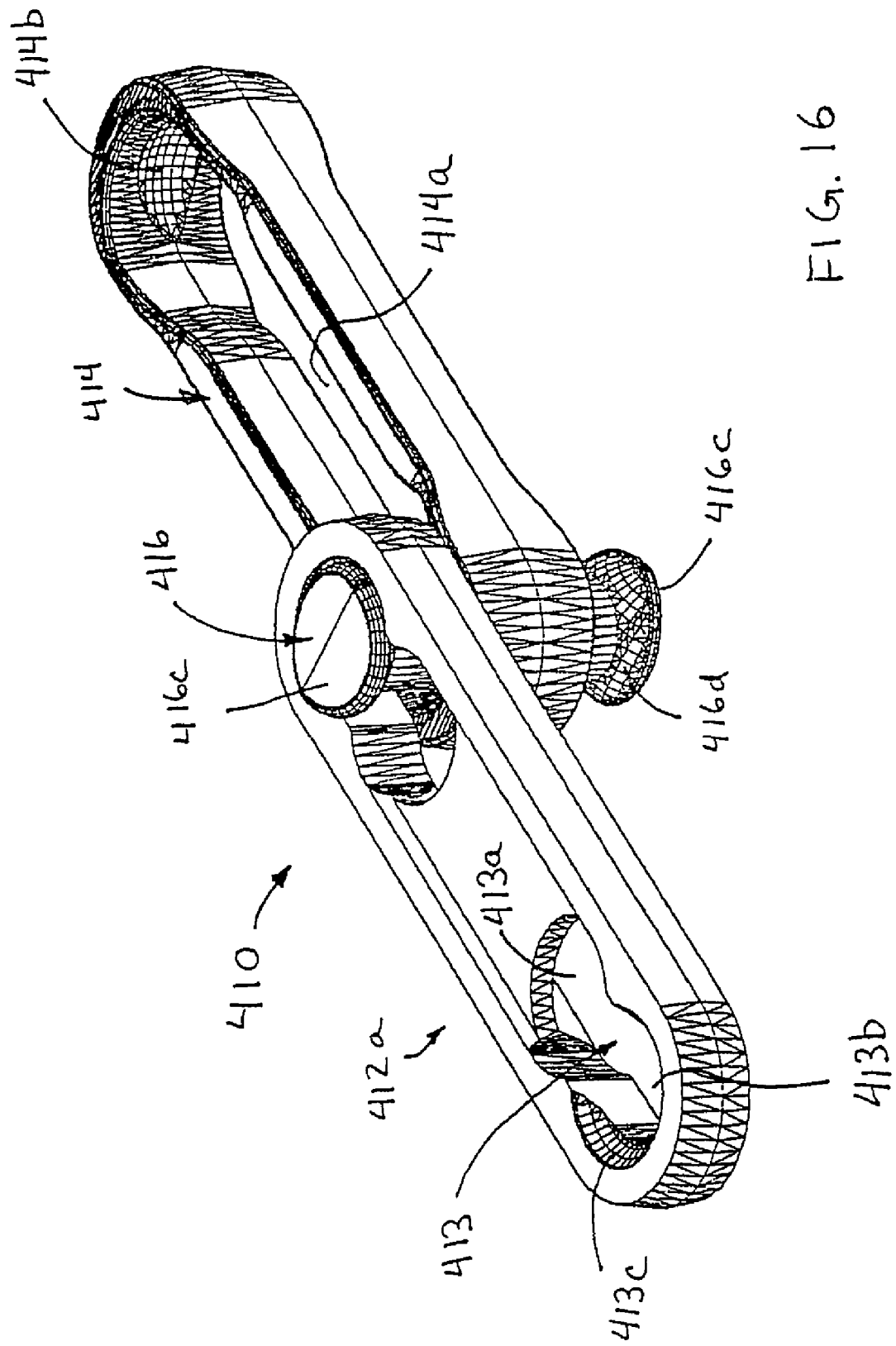
FIG. 16 is a perspective view of a ball and socket I-pin section of chain in accordance with the present invention with a pin rotatably received through the chain links, with one of the side links removed to show additional detail of the pin.

For example, and with reference to FIGS. 16-18, a chain or section of chain 410 includes a pair of side links 412a, 412b and a center link 414. The center link 414 is retained between the side links 412a, 412b by a pin 416 which extends through a center region 414a of center link 414 and through an opening 413 in each side link 412a, 412b. Openings 413 include a larger, inward generally circular opening 413a and a smaller, outer generally circular slot or opening 413b. Each head portion 416c of pin 416 is smaller than the larger opening 413a and larger than the smaller end opening 413b in each side link 412a, 412b and retains pin 416 to side links 412a, 412b and center link 414. Pin 416 includes a generally spherical or toroidal-shaped ball member 420 positioned generally at a mid-point or mid-region of a shaft portion 416b of pin 416. Center link 414 may be substantially similar to the center links discussed above and may comprise a generally oval-shaped or elongated ring having an inner rounded or concave surface 414b at each end thereof for partially receiving ball member 420 therein to retain center link 414 at ball member 420 as the chain is moved along the conveying path. Similar to chain 10, chain 410 includes multiple linkages connected together in a continuous loop about a conveying system, as is known in the art. For ease of description, only one section or set of linkages of the chain is shown and described herein, with the other sections or sets of linkages being substantially identical.

Pin 416 includes center portion or shaft portion 416a and a head portion 416c at each end of the shaft portion 416a. Head portions 416c are generally circular and include an angled or curved underside portion or mating surface 416d (FIG. 18) which extends generally radially outward from each end of the shaft portion 416a such that head portion 416c has a larger diameter than shaft portion 416a.

As can be seen in FIGS. 16 and 17, each side link 412a, 412b includes a pair of slotted openings 413 which may be sized to receive head 416c through the larger inward opening 413a, in order to facilitate assembly and disassembly of the chain. Once inserted through openings 413a, pin 416 and head portion 416c may be moved outwardly until shaft portion 416a is within outer slot or opening 413b. Head portion 416c then may rest at least partially within a curved recessed portion 413c at outer opening 413b, such that pin 416 and side links 412a, 412b and center link 414 are generally secured together. The curved recessed portion or region 413c is generally correspondingly formed with the mating surface 416d of head portion 416c to facilitate generally uniform engagement and generally smooth rotation between the head portion of the pin and the side links. Because the recessed portion 413c and mating surface 416d of head portion 416c are generally circular and are correspondingly formed, pin 416 is allowed to rotate relative to side links 412a, 412b as the chain moves along its conveying path, in order to substantially evenly distribute wear on the pin 416 and, thus, to extend the life cycle of the pin 416.

Similar to the other ball members discussed above, ball member 420 of chain 410 allows for pivotal movement of center link 414 via sliding engagement of concave surface 414b along ball member 420. This provides greater flexibility to chain 410 and may allow the chain to negotiate sharper vertical curves in the conveying path without binding the links or joints of the chain. Chain 410 thus provides a pin which may negotiate sharper vertical turns and/or negotiate turns about different axes. The ball member and correspondingly formed concave surface thus may distribute the loads over a generally constant surface area, reducing or substantially eliminating the stress concentration that typically occur when conventional chains articulate through vertical inclines-and declines. The ball member and concave surface engagement may also function to distribute the loads between the chain links and pin over a greater surface area than conventional chains. This decreases the wear on the bolt and chain links and may result in less maintenance and a greater life cycle for the chain.

Figure 18A:
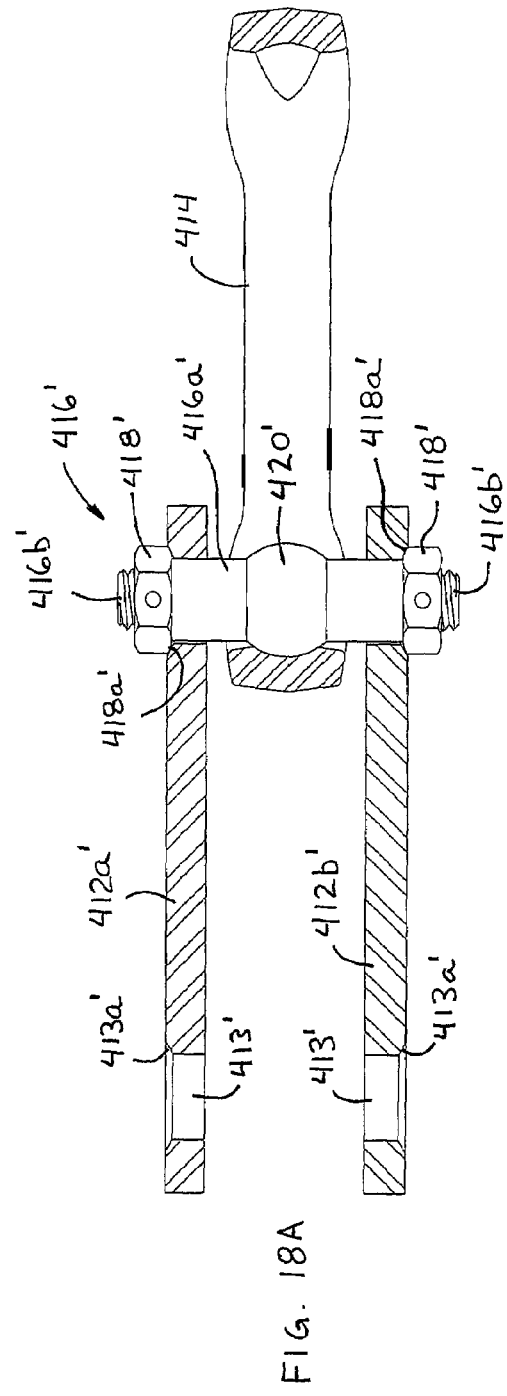
FIG. 18A is a side elevation and partial sectional view of another section of chain similar to that of FIGS. 16-18, but with chamfered fasteners at either end of a double ended stud pin.

Optionally, and with reference to FIG. 18A, the pin 416'0 may include threaded ends 416b' at opposite ends of the shaft portion 416a' and ball member 420'. The threaded ends may be inserted through openings 413' in side links 412a', 412b' and retained therein via female fasteners or nuts 418'. Similar to nut 318', discussed above, nuts 418' may include a chamfered or curved or rounded mating surface 418a' for engaging a generally correspondingly curved or rounded recess 413a' around opening 413' of side link 412a', 412b'. The correspondingly formed surfaces allow for substantially smooth rotation of the pin relative to the side links. The pin 416' thus provides a rotatable bolted style pin with a ball member on the shaft portion of the pin, which may be readily assembled to the side and center links of a section of chain 410'.

Referring now to FIGS. 19 and 20, a chain or section of chain 410" includes a pair of side links 412a, 412b and a center link 414'. The center link 414' is retained between the side links 412a, 412b by a rotatable pin 416" which extends through a center region 414a' of center link 414' and through an opening 413 in each side link 412a, 412b. Pin 416" includes a generally cylindrical shaft portion 416a", while center link 414' includes a generally flat or non-concave surface 414b' for engaging shaft portion 416a". Both head portions 416c" of pin 416" comprise a generally rounded and generally circular mating surface 416d", while side links 412a, 412b include a correspondingly formed recessed area or region or engaging surface 413c for engaging mating surfaces 416d" to facilitate generally smooth rotation between pin 416" and side links 412a, 412b. Chain 410" may be otherwise substantially similar to chain 410, discussed above, such that a detailed discussion will not be repeated herein. Optionally, pin 416" may include a generally cylindrical sleeve portion (not shown in FIGS. 19 and 20) formed or positioned around shaft portion 416a", such as discussed above or as discussed below.

It is further envisioned that a head portion of a pin of a section of chain may be non-circular shaped and the recessed portion of at least one of the side links may be correspondingly non-circular shaped, such that the head portion, and thus the pin, may be non-rotatably secured relative to the side link. For example, the head portion and a recessed region of a side link may be formed with two or more sides to provide for non-rotational engagement between the head and the recessed region, while allowing the head and bolt or pin to be manually rotated to adjust or change the wear surface engagement of the shaft and ball member with the center link. For example, the pin or bolt portion (shaft and head) of a bolted pin may be ratcheted or rotated sixty degrees or ninety degrees or some other amount (depending on the number of sides of the head and the recessed region) to provide a new wear surface of the shaft and ball member (the portion that engages the center link and wears as the links bend and turn relative to one another). The adjustable or dialable pin design of the present invention thus may provide for a significant increase in the life cycle of the pin, because the ball member (or spacer-ball-spacer assembly) may be replaced as needed, and/or the pin may be selectably rotated to provide a new wear surface as needed, which may substantially extend the overall life of the pin or bolted pin.

Each wear surface may span or cover approximately sixty or ninety or one hundred twenty degrees or the like about the pin, whereby the pin may be rotated that amount as necessary to provide six or four or three different wear surfaces or wear surface portions about the pin and, thus, to facilitate control of the amount of wear or amount of time of wear on each wear surface portion. This may be especially useful in applications where the chain is an exact pitch design (the chain length is specified with a small tolerance range), and excessive wear in one or more of the pins may affect the pitch, which may cause the chain to bind or chains to bind (if two such chains are running alongside one another with something connected or cradled between them) or may otherwise adversely affect the chain or conveyor. The pins of such a chain may then be dialed or rotated to provide a new wear surface for each pin, thereby effectively resetting the pins to their original tolerances and thus resetting the chain to its initial specified length. For example, each pin may be dialed to a second position or a third position or any other position to move a fresh wear surface to the wear position. In some cases, only a first pin or set of pins may need to be reset to provide an appropriate adjustment. Optionally, the degree of wear on the pin or shaft portion (or wear surface) may be monitored or determined, and the pin may be selectably rotated to limit wear on the wear surface of the pin. It is further envisioned that each station or lobe on the head portion of the pin may be marked or numbered to indicate which portion or portions of the wear surface have already been selected or used. The shaft of the pin may define at least one wear surface, and may define two or more distinct wear surfaces, such as discussed below with respect to FIGS. 41-64.

For example, and with reference to FIGS. 21 and 22, a head portion 516*c* of a pin 516 and openings 513*b* of side links 512 may be non-circular, such that pin 516 is non-rotatably positioned at and through side links 512 of a chain or section of chain 510. For example, the head portion 516*c* may be lobed or non-circular shaped with three or more sides or portions 516*e* (such as the three curved and generally equal-sized sides shown in FIGS. 21 and 22), with the recessed area 51 3*c* correspondingly shaped to receive the head portion, such that the mating surfaces of the head portion 516*c* within the correspondingly formed recessed area or impression 513*c* in the side link 512 substantially precludes rotation of the pin 516 relative to the side links 512. For example, one or more of the side portions of the head portion may engage a corresponding one or more of the sidewalls of the side link at the aperture to substantially preclude rotation of the pin relative to the side links. The wear surface of the shaft portion 516*a* and/or ball member 520 thus may be generally fixed relative to the side links 512 by substantially fixing head 516*c* within recess 513*c*, such that only a portion of the shaft and/or ball member will contact and wear against the concave surface 514*b* of the center link 514 as the chain travels along its conveying path.

The pin may be generally non-rotatable relative to the chain links when in each of the positions (such as in each of the three positions in the illustrated embodiment of FIGS. 21 and 22, or such as in each of the six positions in the illustrated embodiment of FIGS. 23-25, discussed below, or such as in any other number of positions suitable for such an arrangement), and may be selectably adjustable between the positions to adjust the wear surface of the shaft portion of the pin relative to the chain links, thereby providing selective engagement of a portion or portions of the wear surface with the chain links. Such an arrangement allows for controlling the wear and life cycle of the pin by wearing a particular wear surface of the pin at a time, and allows for controlled or manual or selective rotation from one wear surface of the pin to the next wear surface of the pin. The pin and side link arrangement of the present invention thus provides a dialable pin, which may be manually and selectably dialed or rotated to provide a new wear surface against the side link after the first wear surface has been sufficiently worn. Such a configuration facilitates control of the amount of time each wear surface or wear surface portion of the pin is in use.

Figure 23:
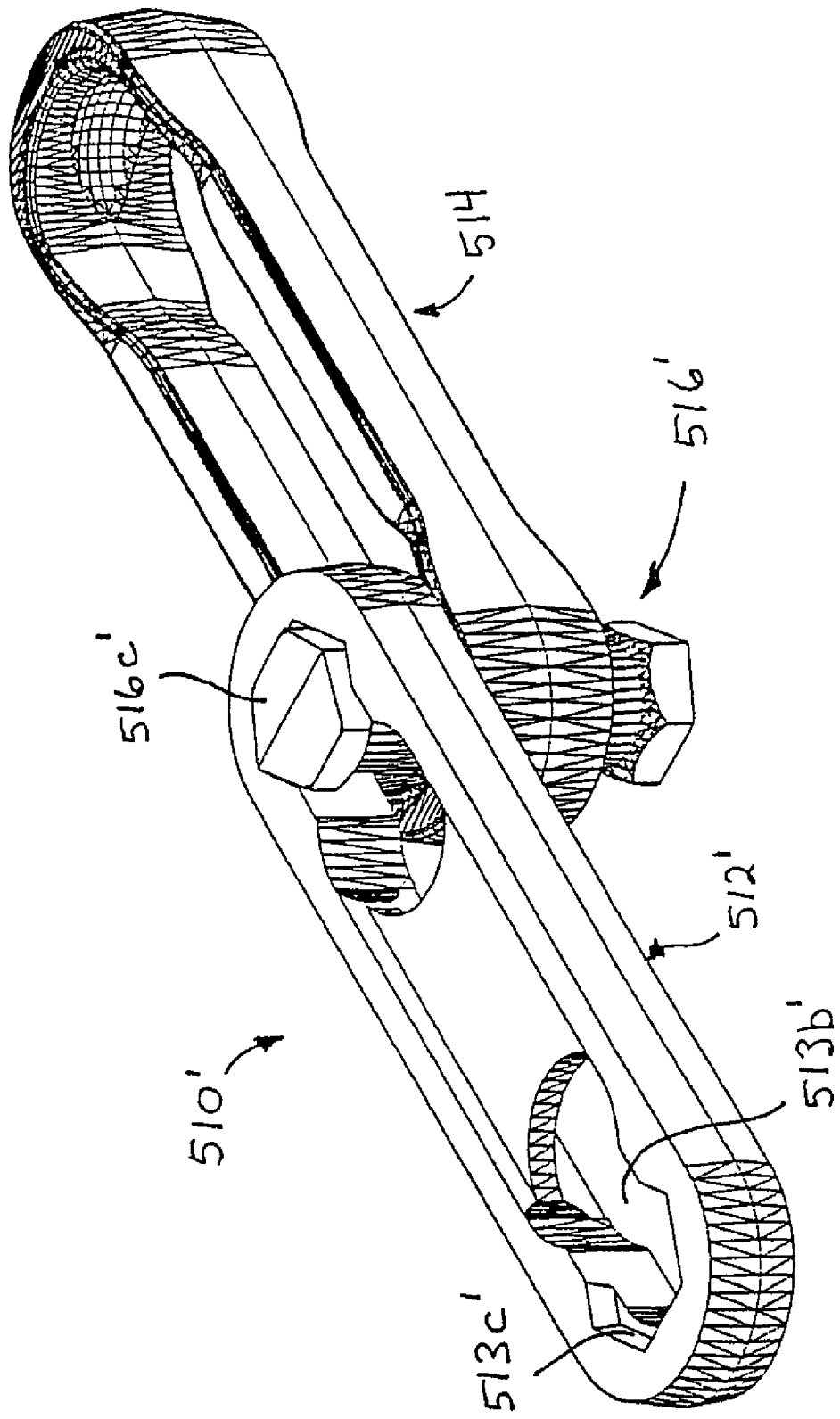
FIG. 23 is a perspective view of another ball and socket I-pin section of chain with the pin being selectably non-rotatably positioned at the chain links, shown with one of the side links removed to show additional detail of the pin.

Optionally, and with reference to FIGS. 23-25, a head portion 516*c'* of a pin 516' and openings 513*b'* of side links 512' may be non-circular, such that pin 516' is non-rotatably positioned at and through side links 512' of a chain or section of chain 510'. As shown in FIGS. 23-25, the head portion 516*c'* may be generally hex-shaped, with the recessed area 513*c'* being correspondingly shaped to receive the head portion, such that the mating of the head portion 516*c'* within the correspondingly formed recessed area or impression 513*c'* in the side link 512' substantially precludes rotation of the pin 516' relative to the side links 512' in six positions. The wear surface of the shaft portion 516*a'* and/or ball member 520' may be generally fixed relative to the side links 512' by substantially fixing head 516*c'* within recess 513*c'*, such that only a portion of the shaft and/or ball member will contact and wear against the concave surface 514*b* of the center link 514 as the chain travels along its conveying path. The wear surface may then be adjusted or dialed to a new surface by rotating the pin 516' to a next orientation relative to the recesses 513*c'* in the side links 512', as discussed above.

Optionally, and with reference to FIGS. 26 and 27, a chain or section of chain 510" may include a pin 516", which may comprise shaped or lobed or hex-shaped head portions 516*c'"* at opposite ends of a generally cylindrical shaft portion 516*b'"*. The center link 514" includes a generally flat or curved, non-concave surface 514*b"* for engaging the shaft portion 516*b"*. Pin 516" and side links 512' may be otherwise substantially similar to pin 516' discussed above, such that a detailed discussion will not be repeated herein.

Optionally, and with reference to FIGS. 28-30, a chain or section of chain 610 may include a threaded pin or bolt 616, which may comprise a shaft portion 616*a* and a shaped or lobed or hex-shaped head portion 616*c* at one end and a threaded portion 616*b* at an opposite end for receiving a nut or threaded fastener or the like 618 (FIG. 30). Head portion 616*c* may be received in a correspondingly formed or shaped recess 613*c* in one side link 612*a*, while a generally cylindrical shaft portion 616*a* and/or threaded end portion 616*b* may extend through an opening 613 in the other side link 612*b* of chain 610. The center link 614 includes a concave inner surface 614*b* for engaging a ball member 620 positioned along shaft portion 616*a* of pin 616. Ball member 620 may be formed as part of shaft portion 616*a* or may be slid onto or formed or molded onto shaft portion 616*a*, and pin 616 may include a generally cylindrical sleeve portion over and along shaft portion 616*a*, such as any of the types of sleeves discussed above or below. Chain 610 may be otherwise substantially similar to chain 510, discussed above, such that a detailed discussion will not be repeated herein.

Optionally, and with reference to FIGS. 31 and 32, a chain or section of chain 610' may include a threaded pin or bolt 616', which may comprise a shaft portion 616*a'* and a non-circular shaped or lobed or hex-shaped head portion 616*c'* at one end and a threaded portion 616*b'* at an opposite end for receiving a nut or threaded fastener or the like 618. Head portion 616*c'* may be received in a correspondingly formed or shaped recess 613*c* in one side link 612*a*, while a generally cylindrical shaft portion 616*a'* and/or threaded end portion 616*b'* may extend through an opening 613 in the other side link 612*b* of chain 610'. The center link 614' may include a generally flat or non-concave inner surface 614*b'* for engaging shaft portion 616*a'* of pin 616'. Optionally, pin 616' may include a generally cylindrical sleeve portion over and along shaft portion 616*a'*, such as the types of sleeve portions discussed above or below. Chain 610' may be otherwise substantially similar to chain 610, discussed above, such that a detailed discussion will not be repeated herein.

It is further envisioned that the shaft portions of the pins or studs or bolted pins may provide different or distinct wear surfaces when they are rotated or dialed to the next setting, in order to accommodate wearing at the wear surface of the center links or elsewhere in the chain links. The shaft portion thus may provide two or more different wear surfaces, with each particular wear surface corresponding to a dialable setting of the pin and head relative to the chain links. For example, each subsequent wear surface may be larger than (or have a larger radius relative to the center axis of the pin) the previous wear surface, in order to take up or account for any loss in dimensions of the wear surface of the center link. The shaft portion of the pin thus may be rotationally non-symmetrical or non-uniform, such that different wear surfaces may be provided by rotating or dialing the pin to the next setting. The wear surfaces may have different radii and may extend different amounts outward from the center axis of the shaft portion, such that the pin may effectively be a different size or radius by rotating or dialing the pin to the next setting, whereby an effective size or diameter of the shaft may be larger to replace a smaller effective size shaft, in order to accommodate the wear or erosion or deterioration of the wear surface of the center link. Each wear surface of the pin may correspond with a respective lobe or portion of the head portion of the pin, such that when a particular lobe is positioned in a particular part of the recess in the side link, the respective wear surface of the pin is generally aligned with the wear surface of the center link.

For example, and with reference to FIGS. 41-44, a chain or section of may include a pin 1016, which may comprise a shaft portion 1016a and opposite head portions 1016b. Pin 1016a may comprise an I-pin type of pin, and the head portions 1016b may be received in a correspondingly formed or shaped recesses in respective side links of the section of chain (such as the head portions of the pins of FIGS. 9, 10 and 21-32, discussed above), while the shaft portion 1016a includes at least one wear surface 1017 that engages a center link of the section of chain. The section of chain is not shown in FIGS. 41-44, but may be otherwise substantially similar to the chains or sections of chain described herein such that a detailed discussion will not be repeated herein. Shaft portion 1016a is rotationally non-symmetrical or non-uniform, such that the wear surface 1017 of the shaft portion 1016a comprises two distinct wear surfaces 1017a, 1017b, which are selectively positioned to engage the end portion of the center link. The different wear surfaces 1017a, 1017b provide different surfaces at the center link when the pin is rotated or flipped 180 degrees.

For example, the pin 1016 may initially be positioned at the chain links such that wear surface 1017a engages the center link. Wear surface 1017a provides a smaller radius surface or radius of curvature than wear surface 1017b (which protrudes further outward from a center axis 1016c of pin 1016 than wear surface 1017a). After the wear surface 1017a has worn (and after the wear surface of the center link has also worn), the pin may be rotated 180 degrees such that wear surface 1017b is positioned to engage the center link. The larger radius wear surface 1017b accommodates any wear that may occur to the surface of the center link to provide similar overall dimensions of the chain links as compared to the initial dimensions (when the first wear surface 1017a was initially positioned to engage the wear surface of the center link). The pin may be an I-pin as shown, or may be any other type of pin or threaded stud or bolt or the like or may have multiple lobes that correspond to the different wear surfaces, such as discussed below with respect to FIGS. 49-64, without affecting the scope of the present invention.

Optionally, and with reference to FIGS. 45-48, the pin 1016' may comprise an I-pin with a ball member 1020 positioned along the shaft portion 1016a'. Ball member 1020 is rotationally non-symmetrical or non-uniform and comprises two wear surfaces 1017a', 1017b', which are selectively positioned to engage a wear surface or end portion of the center link of the section of chain. Pin 1016' and the chain section may be otherwise substantially similar to the pins and chains described herein such that a detailed discussion will not be repeated herein. The ball member may be integrally or unitarily formed as part of the shaft portion or may be fixedly or movably positioned on the shaft portion and/or may be molded onto the shaft portion or may receive the shaft portion therethrough, without affecting the scope of the present invention. Although shown and described as having a ball member with two wear surfaces, the ball member of the pin may provide three or more wear surfaces (such as described below with respect to pins 1116 and 1216), without affecting the scope of the present invention. The pin may be an I-pin as shown or may be any other type of pin or threaded stud or the like or may have multiple lobes that correspond to the different wear surfaces, such as discussed below with respect to FIGS. 49-64, without affecting the scope of the present invention.

Optionally, and with reference to FIGS. 49-56, a chain or section of 1110 may include a pin or bolt 1116, which may comprise a shaft portion 1116a and a head portion 1116b at one end and a threaded portion 1116c at an opposite end for receiving a nut or threaded fastener or the like 1118. Head portion 1116b may be received in a correspondingly formed or shaped recess 1113a in one side link 1112a, while shaft portion 1116a and/or threaded end portion 1116c may extend through an opening 1113b in the other side link 1112b of chain 1110. Head portion 1116b may be selectively received in the correspondingly formed or shaped recesses 1113a in side link 1112a, while the shaft portion 1116a may engage a wear surface of a center link (not shown). Shaft portion 1116a is rotationally non-symmetrical and comprises three distinct wear surfaces 1117a, 1117b, 1117c, which engage the end portion or wear surface of the center link. Each wear surface 1117a, 1117b, 1117c corresponds to a different lobe 1116b', 1116b'', 1116b''' of head portion 1116b to provide different surfaces at the center link when the pin is rotated approximately 120 degrees.

For example, the pin 1116 may be initially positioned at the chain links such that wear surface 1117a engages the center link. Wear surface 1117a provides a smaller diameter surface than wear surface 1117b (which protrudes radially further from a center axis 1116d of pin 1116 than the first or smaller wear surface 1117a), which in turn provides a smaller diameter surface than wear surface 1117c (which protrudes radially further from center axis 1116d than second wear surface 1117b). After the first wear surface 1117a has worn, the pin may be rotated 120 degrees such that lobe 1116b'' (which may have a number "2" or other indicia printed or formed thereon to indicate the order of the wear surfaces of the pin) is at the end position of the link to align wear surface 1117b with the wear surface of the center link, and the pin may be further rotated or dialed to the third setting in a similar manner, as desired. The larger wear surface of the second or third setting accommodates any wear or erosion or deterioration or degradation that may occur to the surface of the center link during use of the chain with the pin at the previous setting, in order to provide similar overall dimensions of the chain links as compared to the initial dimensions. Chain 1110 may be otherwise substantially similar to the chains described herein such that a detailed discussion will not be repeated herein.

Figure 57:
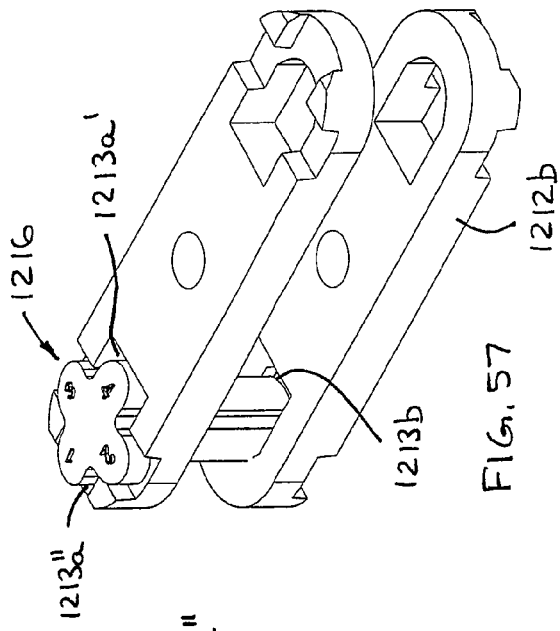
FIG. 57 is a chain section in accordance with the present invention.
Figure 60:
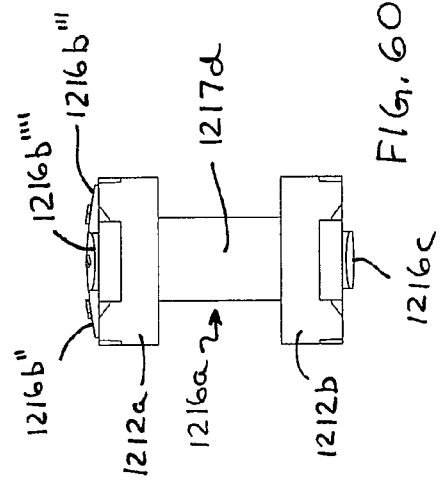
FIG. 60 is an end elevation of the chain section of FIG. 57.
Figure 58:
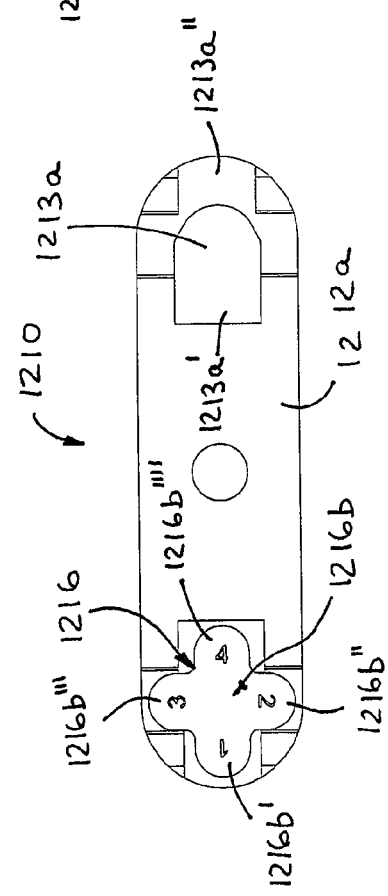
FIG. 58 is a plan view of the chain section of FIG. 57.
Figure 59:
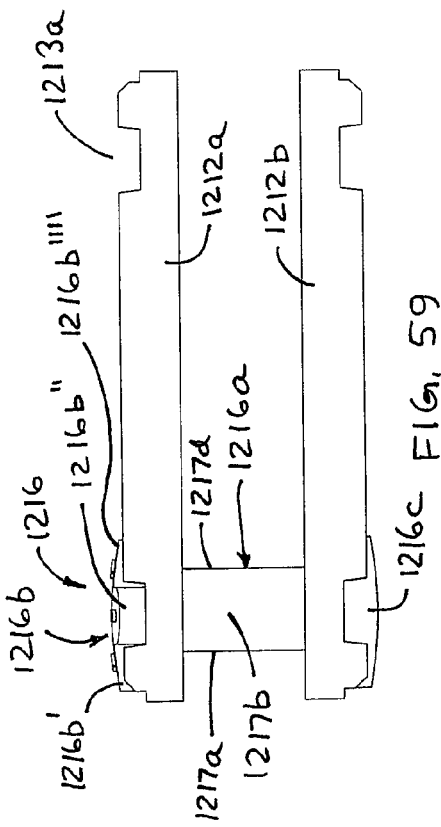
FIG. 59 is a side elevation of the chain section of FIG. 57.
Figure 61:
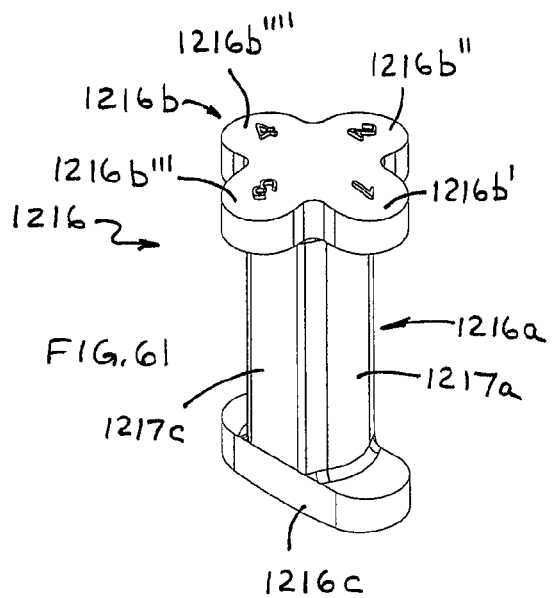
FIG. 61 is a perspective view of a rotationally non-symmetrical pin of the chain section of FIGS. 57-60.
Figure 62:
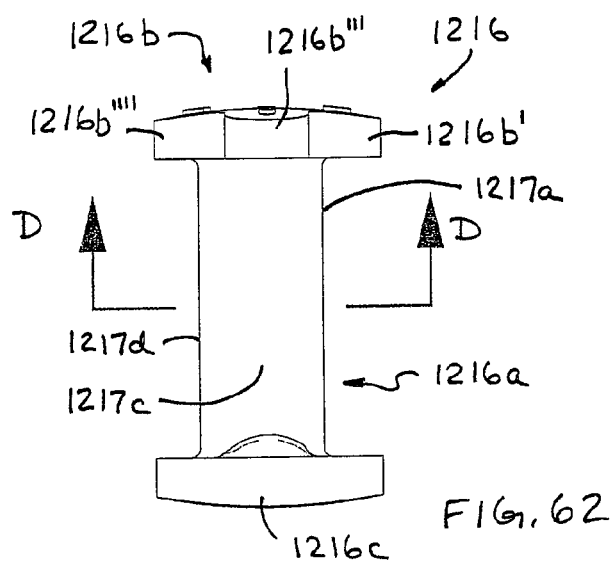
FIG. 62 is a side elevation of the pin of FIG. 61.
Figure 64:
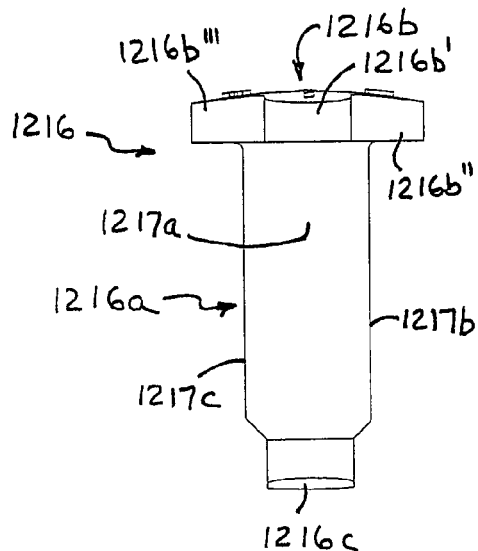
FIG. 64 is another side elevation of the pin of FIG. 61.
Figure 63:
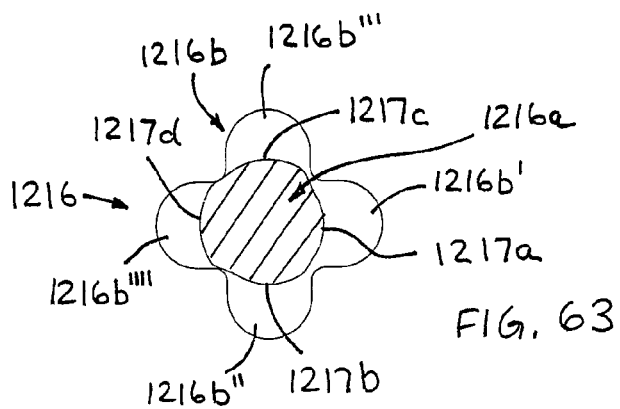
FIG. 63 is a sectional view taken along the line D-D in FIG. 62.

Optionally, and with reference to FIGS. 57-64, a chain or section of 1210 may include a pin or bolt 1216, which may comprise a shaft portion 1216a and a lobed head portion 1216b at one end and a head portion or end portion 1216c at an opposite end. Head portion 1216b may be received in a correspondingly formed or shaped recess 1213a in one side link 1212a, while shaft portion 1216a and/or end portion 1216c may extend through an opening 1213b in the other side link 1212b of chain 1210. Head portion 1216b may be selectively received in the correspondingly formed or shaped recesses 1213a in side link 1212a, while the shaft portion 1216a may thus selectively engage a wear surface of a center link (not shown). As can be seen in FIGS. 57 and 58, the recess 1213a in side link 1212a has slots or channels or recesses formed to receive the respective lobes of the head portion 1216b. Preferably, the side link has an opening or aperture 1213a' next to or opposite to the end recess 1213a'' that extends through the side link 1212a, such that the lobe of the pin may slide along and through the opening to facilitate insertion of the head portion into the opening in the side link to facilitate assembly of the section of chain.

In the illustrated embodiment, the opposite head portion 1216c comprises a two-lobed head portion having lobes extending radially outwardly from a longitudinal axis of the pin in generally opposite directions from one another (such as is typically done at both ends of known I-pins and the like). Because head or end portion 1216c is only a two-lobed head, head portion 1216c may be readily inserted through the openings 1213a', 1213b in the side links and through the opening in the center link to assemble the section of chain. The pin 1216 thus provides an adjustable or dialable rivetless or non-bolted style pin that can be readily assembled to the chain links of a section of chain.

Optionally, the side link 1212b may include a recess or notch at the end of the opening 1213b and opposite to the end recess to provide support for one of the lobes of the head portion 1216c when it is oriented with the lobes extending generally longitudinally along the side link. The lobes of the head portion 1216c thus may be fully engaged with and supported by the recesses at the side link 1212b in each of the four (or three or more) orientations that the pin may be set at when the pin and links are assembled together. Optionally, it is envisioned that the opening in one or both of the side links may be angled to allow for insertion of the two-lobed head portion 1216c, while the surfaces of the recesses limit withdrawal of the pin from the side link when the pin is in any of the four positions of the lobed pin relative to the side links. For example, the side link 1212b may include an elongated opening that is oriented at about a forty-five degree angle relative to the longitudinal axis of the side link so that the pin head portion 1216c may insert through the opening and then may be rotated forty-five degrees in either direction to align the lobes with an engaging surface or recess of the side link while positioning the pin at a desired initial orientation relative to the chain links. Optionally, it is further envisioned that the lobes of the opposite head portion 1216c may be oriented at an angle relative to the lobes of the first head portion 1216b and then may engage recesses in the side link 1212b that are oriented at angles relative to the recesses at the other link 1212a when the pins and links are assembled together. Although shown on a pin having a four-lobed head portion, it is envisioned that the two-lobed head portion may be provided on a pin having a three lobed head portion or other types of dialable head portions, without affecting the scope of the present invention.

Shaft portion 1216a of pin 1216 is rotationally non-symmetrical and comprises four wear surfaces 1217a, 1217b, 1217c, 1217d, which are selectively positioned to engage the end portion or wear surface of the center link. Each wear surface 1217a, 1217b, 1217c, 1217d corresponds to a different lobe 1216a', 1216a", 1216a', 1216a''' of head portion 1216a to provide different surfaces at the center link when the pin is rotated approximately 90 degrees. For example, the pin 1216 may initially be positioned at the chain links such that wear surface 1217a engages the center link (with lobe 1216a' positioned at recess 1213a" of side link 1212a), and the pin may be rotated 90 degrees (to position lobe 1216a" at recess 1213a''') after the pin and chain link have worn a sufficient or specified amount, and further rotated as farther wear occurs. The different wear surfaces provide increasing effective diameters of the shaft of the pin, in order to accommodate wear or erosion or deterioration or degradation of the wear surface of the center link during use of the pin and chain, as described above with reference to pins 1016, 1116. Chain 1210 may be otherwise substantially similar to the chains described herein such that a detailed discussion will not be repeated herein.

In the illustrated embodiments, the pin may have an I-pin type head at its end opposite from the multiple lobed head or may have a threaded end for threadedly receiving a nut or fastener or the like to retain the pin at the side link, without affecting the scope of the present invention. As discussed above, the I-pin type head or two-lobed head allows the rivetless or non-bolted pin to be readily assembled to the chain links of the section of chain. However, it is envisioned that other head or end configurations, such as a three or four lobed head similar to the multi-lobed or dialable head portion of the pin may be incorporated at the opposite end of the pin or bolt or stud, without affecting the scope of the present invention. Also, although shown as having generally straight shaft portions, the shaft portion of the multiple wear surface pin may include a ball member that is rotationally non-symmetrical, such as described above, without affecting the scope of the present invention.

The dialable pin of the present invention thus may be rotated or dialed to the next position when the degree of wear on the engaged wear surface (the wear surface of the pin that is engaged with the wear surface of the center link) and/or the center link wear surface approaches or reaches approximately a predetermined amount. The degree of wear in the chain may be determined by detecting various points or locations along the chain as the chain is driven or moved along its path, in order to determine or estimate the degree of wear in the chain links or pins of the section or sections of chain between the detected points or locations. For example, a chain measurement or wear measurement device or system may detect points along a chain and calculate the distance between the points (such as by determining the distance between the points based on the speed of the chain and the time that elapses between the detections). As the distance between the points changes, the system may determine the wear in the pins or links for that chain section. The chain wear measurement device or system may detect any desired or appropriate or suitable location along the chain, or may detect the ends of the pins, such as at an extension at an end of one or more pins, such as is accomplished by the chain wear measurement device described in U.S. patent application, Ser. No. 10/356, 063, filed Jan. 31, 2003 by Frost for WEAR MEASUREMENT DEVICE, and published Jul. 31, 2003 as U.S. publication No. US-2003-0140709-A1, now U.S. Pat. No. 6,862, 939, which is hereby incorporated herein by reference. For example, a wear measurement system or device may include a sensor positioned along a conveying path of a conveyor system, where the sensor is operable to detect at least one of the pins (or other points or locations) of the section of chain as the chain is conveyed along the conveying path. The sensor generates a signal indicative of the detection of the pin (such as a detection of an extension from an end of one or more of the pins of the chain) or other location or locations along the chain. The pin or pins of the section of chain may be dialed or rotated to the next position to align the next or larger wear surface with the center link wear surface in response to an output of the wear measurement device or system, such as an output that is indicative of a particular degree of wear in a section or length of chain (as calculated or estimated in response to the detection of the ends of the pins or of other locations along the section of chain).

By providing a larger radius wear surface (or a new wear surface that protrudes further from a center axis of the pin from the previous wear surface and thus provides a larger effective diameter of the shaft of the pin) at the next selected or dialed wear surface of the pin, the degree of wear in the pin and links may be taken up or replaced with the larger wear surface when the pin is dialed or rotated to the next wear surface. The rotationally non-symmetrical or non-uniform wear surfaces of the pin may be designed to provide a particular increase in the effective diameter of the pin for each wear surface, such that the pin may be dialed to the next wear surface when a particular degree of wear (that may generally or substantially correspond with the particular increase in the wear surface of the pin) in the chain is detected by the wear measurement device. The dialable pin configuration, in conjunction with a chain wear measurement device or system, may thus be used to control the wear of the wear surfaces of the pin and chain links to maintain the chain at a desired working configuration, without having to replace the center link each time that the pin is rotated.

Also, the dialable pin configuration of the present invention may thus provide significantly greater life cycles for such chains and pins, since the pins do not have to be replaced when one or more of the pins wears a sufficient amount. Such a pin-head and side link design may be implemented with a pin with a ball member or the like or a pin with a generally cylindrical shaft portion and no ball member, without affecting the scope of the present invention. Also, such a dialable pin concept is suitable for use on a double headed pin or a single headed or bolted pin, with the head or heads of the pin being lobed or non-circular shaped or formed and engaged with a correspondingly formed recess in one of the side links, while a threaded end of a bolted pin may extend through a circular opening in the other side link and may be secured therein by a nut or other fastener, without affecting the scope of the present invention. Also, by providing a rotationally non-symmetrical or non-uniform wear surface on the shaft portion or ball member, the pin may accommodate wear or erosion or deterioration or degradation of the wear surface of the center link when the pin is rotated or dialed to provide the next wear surface of the shaft or ball member. The wear surfaces and degree of wear may be monitored by a wear measurement device or system to further control the wear of the chain.

The ball members and/or the concave surfaces of the center links of the present invention may comprise a metallic material, or may comprise a nylon or plastic or polymeric material, without affecting the scope of the present invention. The selected material is preferably a highly durable material which may minimize wear of the ball and/or the concave surface when the chain is in use and moving through various curves while under load.

Therefore, the present invention provides a bolted or pinned or half-bolted chain which has improved flexibility to ease negotiation of the chain links through sharp vertical changes in the chain path. The ball members of the present invention allow for pivotable movement between the center link and side links as the chain negotiates through the conveying path. More particularly, the ball member allows the center link to pivot about a longitudinal axis of the bolt, stud or pin in a conventional manner, while also allowing the center link to pivot about the ball member in other directions as well, such as pivoting upward or downward relative to the side links. The ball member and bolt or stud combination of the present invention thus allows the bolted chain to negotiate inclines along the conveying path without binding or excessive wear occurring at the chain joints. Also, the ball and socket type connection of the present invention allows the chain to flex about both axes, which further may allow the chain to twist or corkscrew over a sufficient length of track. Because the ball member may be loosely fit onto the bolt or stud, the ball member of the present invention provides for an easy assembly process of the bolt or stud and also facilitates easy disassembly or disconnection of the chain links for service or maintenance of the bolted chain. The present invention thus provides for a chain with much greater flexibility which is easy to manufacture and assemble.

Figure 33:
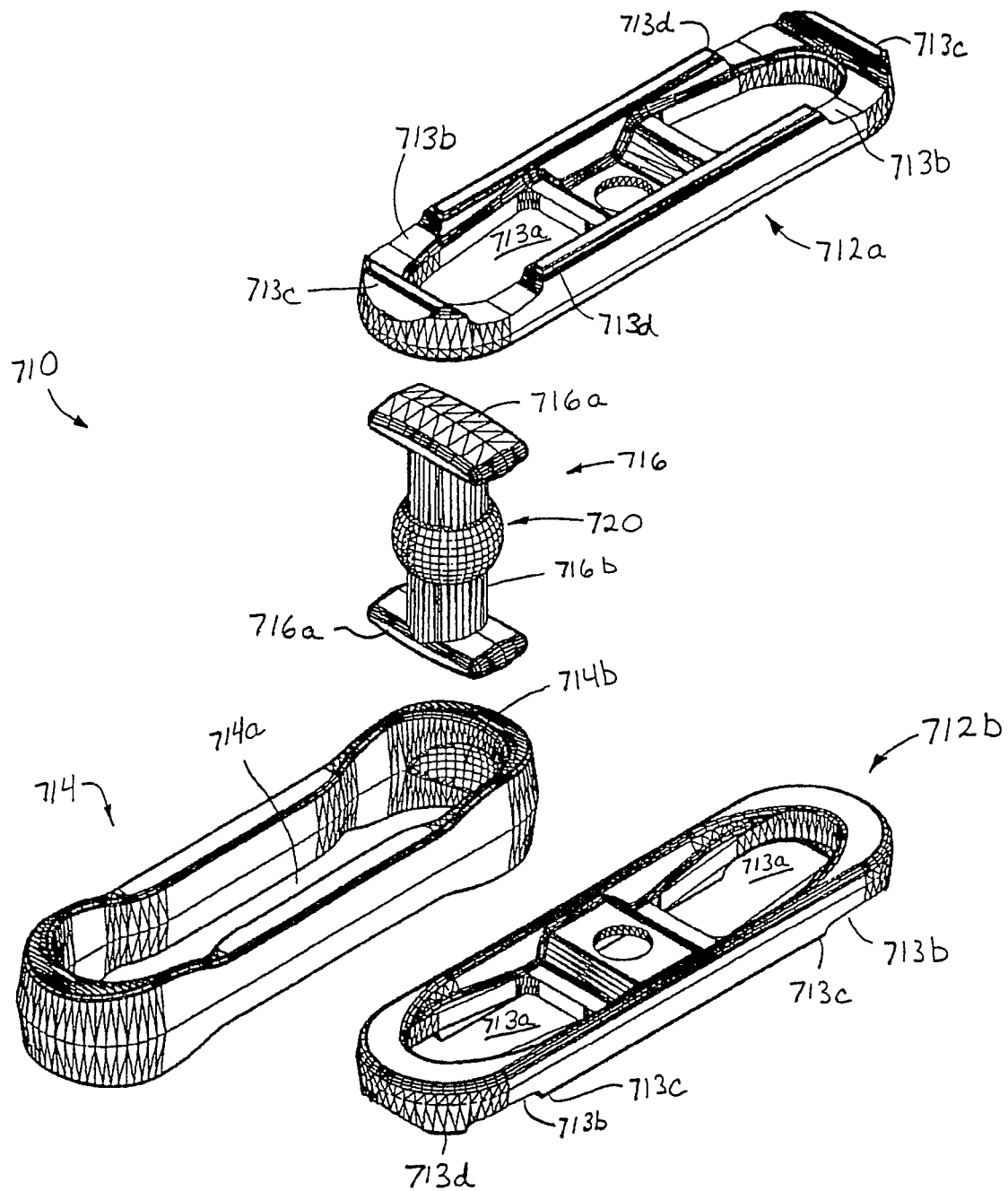
FIG. 33 is an exploded perspective view of a ball and socket section of chain in accordance with the present invention, with a ball member molded around a shaft portion of a pin.
Figure 34:
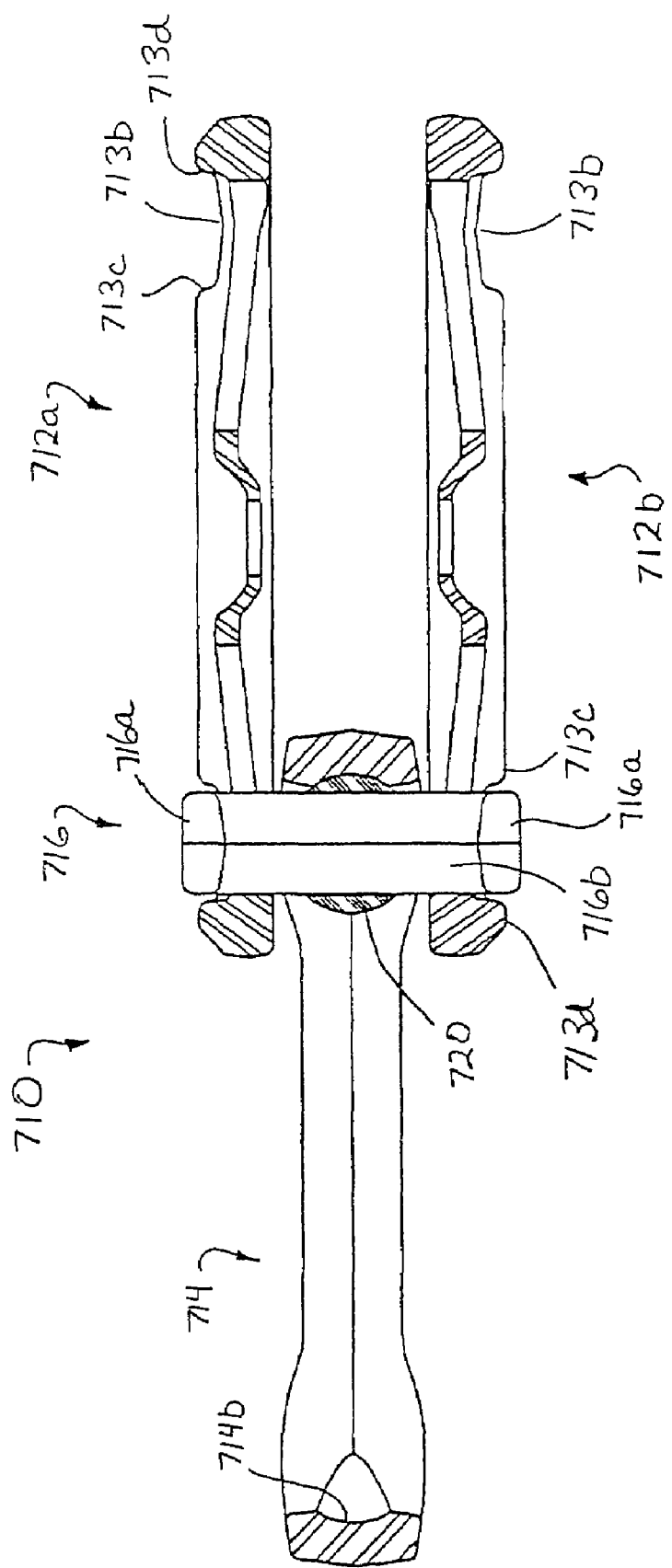
FIG. 34 is a side elevation and partial sectional view of the section of chain of FIG. 33.

Referring now to FIGS. 33 and 34, a chain or section of chain 710 includes a pair of side links 712a, 712b and a center link 714. The center link 714 is retained between the side links 712a, 712b by a pin 716, such as an I-pin or other type of pin, bolt, stud or the like, which extends through a center region or opening 714a of center link 714 and through an opening 713a in each side link 712a, 712b. Pin 716 is retained in and through side links 712a, 712b by opposite head portions 716a of pin 716 engaging a recessed region 713b of a respective side link 712a, 712b. Pin 716 includes a generally spherical or toroidal-shaped ball member 720 which is molded around a shaft portion 716b of pin 716. Chain 710 includes multiple linkages connected together in a continuous loop about a conveying system, as is known in the art. For ease of description, only one set of linkages of the chain is shown and described herein, with the other linkages being substantially identical.

Shaft portion 716b of pin 716 may comprise a metallic material, and may provide a substantially smooth exterior surface. The shaft portion 716b may be coated or treated, or may have a material deposited thereon, in a manner to provide a low coefficient of friction surface of the shaft portion. For example, the shaft portion may be treated with a TEFLON® coating or type material or a hard, carbon or diamond like material, or any other durable and low coefficient of friction material or slick material, without affecting the scope of the present invention. The low coefficient of friction or slick surface facilitates the breaking free of the molded sleeve or ball 720 (as discussed below) and further facilitates rotation or movement of the sleeve or ball 720 relative to the shaft of the pin as the chain negotiates through its conveying path. Although shown as an I-pin type fastener or connector, the side links 712a, 712b and center 714 may be retained together via any other type of pin or bolt or stud for connecting the links of a chain, without affecting the scope of the present invention.

Each head portion 716a of pin 716 may comprise a generally rectangular shaped head such that portions of the head 716a extend laterally outward from the end of the shaft portion 716b in opposite directions. Each side link 712a, 712b includes a pair of slotted openings 713a which may be sized to receive head 716a therethrough when the head is rotated approximately 90 degrees from the orientation shown in FIGS. 33 and 34, in order to facilitate assembly and disassembly of the chain links. Each side link 712a, 712b includes a recessed region or pocket 713b at each end for head 716a of pin 716 to rest when the chain is assembled. The recessed region 713b is defined by a raised end portion 713c and raised inward portions 713d which engage the sides of the head 716a to substantially preclude rotation of the pin 716 relative to side links 712a, 712b and center link 714.

Center link 714 may comprise a generally oval shaped or elongated ring defining inner opening 714a. Center link 714 includes an inner rounded or concave surface 714b (FIGS. 33 and 34) at each end thereof for engaging and partially receiving ball member 720 therein to retain center link 714 at ball member 720 as the chain is moved along the conveying path. Optionally, concave surface 714b may be coated or treated with a low coefficient of friction material, similar to shaft portion 716b of pin 716 discussed above, to reduce the function between ball member 720 and center link 714.

Ball member 720 may comprise a plastic or polymeric member which is molded onto the substantially smooth metallic shaft portion 716b of pin 716. Ball member 720 is molded around the shaft portion 716b after pin 716 is formed and is then allowed to cool and harden around the shaft portion. Because shaft portion 716b has a substantially smooth, and preferably slick, outer surface, ball member 720 may be twisted, slid, or otherwise moved relative to shaft portion 716b to break ball member 720 free from shaft member 716b. Ball member 720 may then be freely rotatable and movable around and along shaft portion 716b to allow for relative movement between ball member 720 and pin 716. Ball member 716 thus provides a unitarily formed ball which is movable relative to pin 716 and center link 714. Ball member 716 may include one or more spacers or sleeve portions extending from one or both ends of the ball member, such as discussed above, to assist in retaining the ball member in place along the shaft portion.

Ball member 720 may be formed by injection molding a polymeric material around the shaft portion 716b of pin 716 or may be formed via any other molding process or method, without affecting the scope of the present invention. Ball member 720 may be formed of a durable, hard polymeric material, such as a nylon material or filled nylon material, a PBT material, or an engineering plastic or the like. Clearly, however, other materials may be used for ball member 720, without affecting the scope of the present invention.

Optionally, ball member 720 may provide an exterior surface which has a durable and low coefficient of friction to also enhance the relative movement between ball member 720 and center link 714. Optionally, ball member 720 may be coated with a slick or low coefficient of friction material, similar to shaft portion 716b discussed above, to further reduce the friction between the components, without affecting the scope of the present invention.

Ball member 720 thus allows for pivotal movement of center link 714 via sliding engagement between ball member 720 and shaft portion 716b of pin 716 and/or sliding engagement between concave surface 714b and ball member 720. This provides greater flexibility to chain 710 and may allow chain 710 to negotiate sharper vertical curves in the conveying path without binding the links or joints of the chain. The ball member and correspondingly formed concave surface thus may distribute the loads over a generally constant surface area, reducing or substantially eliminating the stress concentration that typically occur when conventional chains articulate through vertical inclines and declines. The ball member and concave surface engagement may also function to distribute the loads between the chain links and pin over a greater surface area than conventional chains. This decreases the wear on the pins and chain links and may result in less maintenance and a greater life cycle for the chain. Also, because chain 710 may provide a low coefficient of friction surface at shaft 716b of pin 716 and/or at center link 714, ball member 720 may provide for a reduced amount of friction between the center link 714 and pin 716, which may further reduce wear on the components and may result in even less maintenance and an even greater life cycle of the chain.

Figure 35:
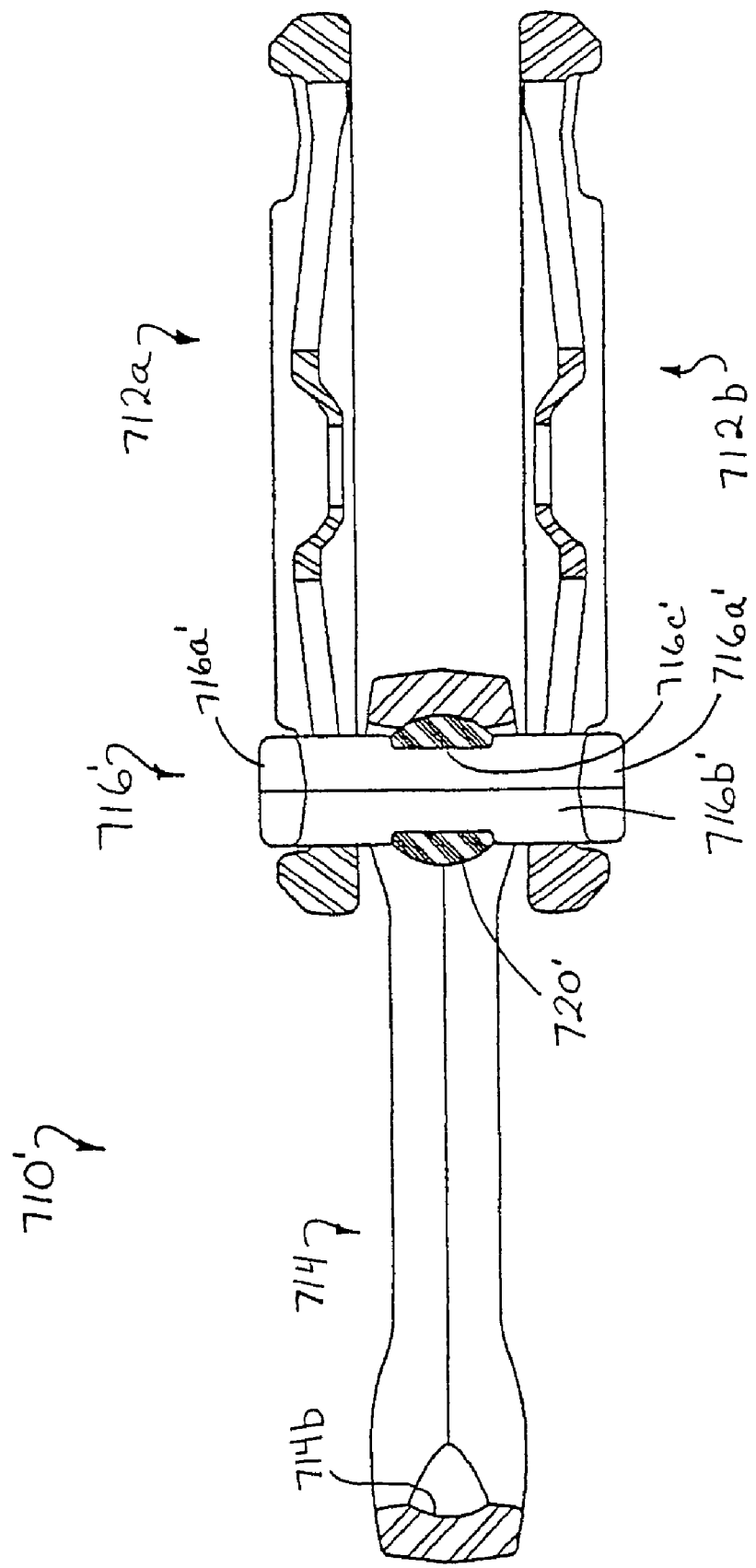
FIG. 35 is a side elevation and partial sectional view of another ball and socket section of chain in accordance with the present invention.

Referring now to FIG. 35, a chain or section of chain 710' includes side links 712a, 712b and a center link 714, which are retained together by a pin 716'. Side links 712a, 712b and center link 714 may be substantially similar to the side links and center link discussed above with respect to chain 710, such that a detailed discussion of these components will not be repeated herein.

Pin 716' includes head portions 716a', similar to pin 716, and a shaft portion 716b' extending between the opposite head portions 716a'. Shaft portion 716b' comprises a generally cylindrical shaft portion and includes a notched or narrowed section 716c' at a central region thereof. Notched section 716c' of pin 716' may extend circumferentially around shaft portion 716b', so as to define a narrowed diameter central region of shaft portion 716b'. However, notched section 716c' may optionally provide separate notched portions or indents or grooves in a portion of the central region of the shaft portion, without affecting the scope of the present invention.

Similar to pin 716, discussed above, shaft portion 716b' and notched section 716c' of pin 716' may provide substantially smooth, cylindrical exterior surfaces. Shaft portion 716b' may be coated or treated in a manner to provide a low coefficient of friction surface of the shaft portion, such as described above with respect to pin 716 of chain 710. The low coefficient of friction or slick surface facilitates the breaking free of a molded sleeve or ball 720' (discussed below) and further facilitates rotation or movement of the sleeve or ball 720' relative to the shaft of the pin as the chain negotiates through its conveying path. Although shown as an I-pin type fastener or connector, the links 712a, 712b and 714 may be retained together via any other type of pin or bolt or stud, such as formed using the principles described above, for connecting the links of a chain, without affecting the scope of the present invention.

Pin 716' includes a generally spherical or toroidal-shaped ball member 720' around shaft portion 716b' of pin 716'. Ball member 720' may comprise a plastic or polymeric member which is molded onto the substantially smooth shaft portion 716b' of pin 716', such that an inner portion of ball member 720' is molded within notched section 716c' of pin 716'. Ball member 720' is molded around the shaft portion 716b' after pin 716' is formed and is then allowed to cool and harden around the shaft portion. Because shaft portion 716b' and notched section 716c' may have a substantially smooth and cylindrical outer surface, and which may be treated with a slick material or coating, ball member 720' may be twisted or otherwise moved relative to shaft portion 716b' to break ball member 720' free from shaft member 716b'. Ball member 720' may then be freely rotatable around and notched section 716c' of shaft portion 716b' to allow for relative movement between ball member 720' and pin 716'. Notched section 716c' functions to retain ball member 720' in place and limits or substantially precludes longitudinal movement of ball member 720' along shaft portion 716b' of pin 716'.

Similar to ball member 720, ball member 720' may be formed by injection molding a polymeric material around the shaft portion 716b' of pin 716' or may be formed via any other molding process or method, without affecting the scope of the present invention. Optionally, ball member 720' may provide an exterior surface which is durable and which may have a low coefficient of friction to enhance the relative movement between ball member 720' and center link 714. Optionally, ball member 720' may be coated with a slick or low coefficient of friction material, such as discussed above with respect to ball member 720, to further reduce the friction between the components. As discussed above, concave surface 714b of center link 714 may also or otherwise be coated or treated to provide a surface having a lower coefficient of friction for engagement with ball member 720'.

Figure 36:
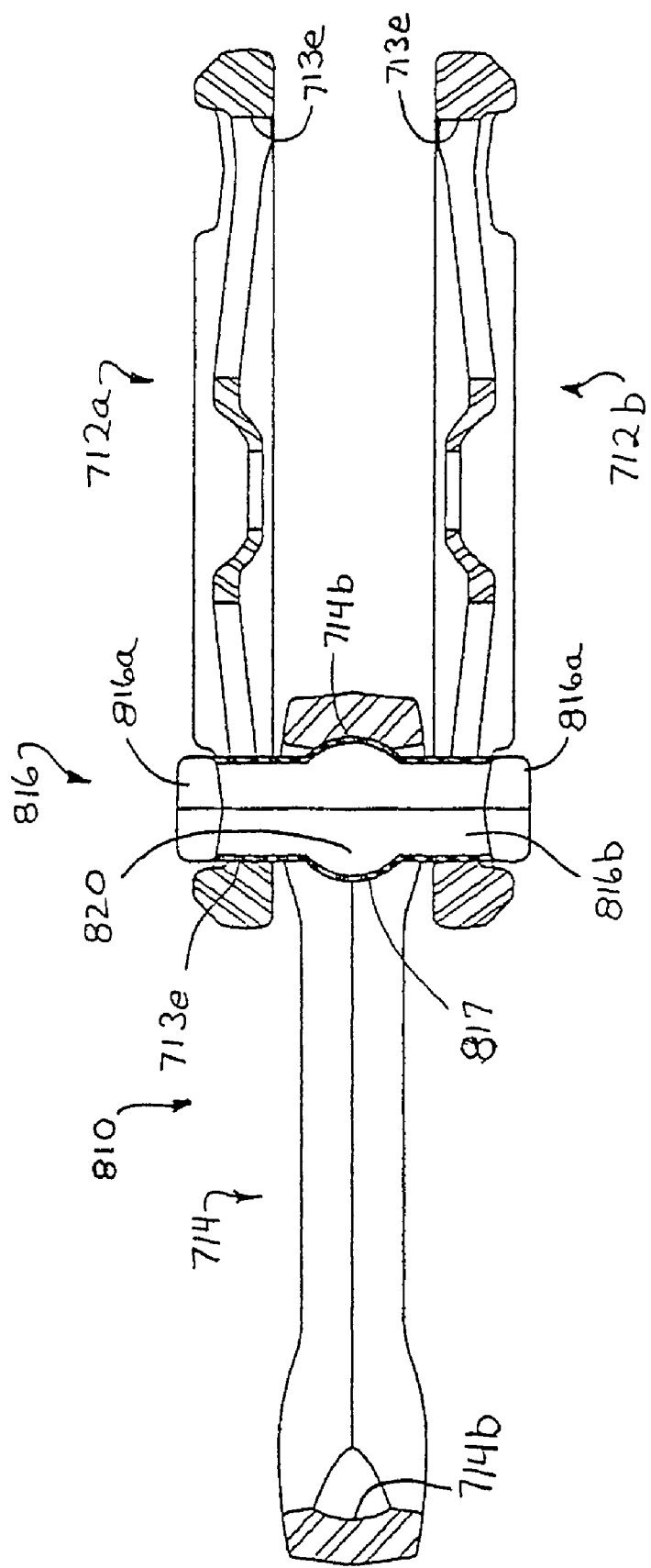
FIG. 36 is a side elevation and partial sectional view of another ball and socket section of chain in accordance with the present invention, with a sleeve molded around the shaft portion and ball member of the pin.

Referring now to FIG. 36, a chain or section of chain 810 includes side links 712a, 712b and a center link 714, which are retained together by a pin 816. Side links 712a, 712b and center link 714 may be substantially similar to the side links and center link discussed above with respect to chain 710, such that a detailed discussion of these components will not be repeated herein.

Pin 816 includes opposite head portions 816a, similar to pin 716, and a shaft portion 816b extending between the opposite head portions 816a. Shaft portion 816 comprises a generally cylindrical shaft portion and includes a spherical or toroidal-shaped ball member 820 integrally formed at a generally central region thereof. Similar to pin 716, discussed above, shaft portion 816b and ball member 820 of pin 816 may provide a substantially smooth exterior surface. Shaft portion 816b and ball member 820 may be coated or treated in a manner to provide a low coefficient of friction surface, such as described above with respect to pin 716 of chain 710. The low coefficient of friction or slick surface facilitates the breaking free of a molded sleeve 817 (discussed below) from the shaft portion and ball member of pin 816 and further facilitates rotation or movement of the sleeve relative to the shaft and ball of the pin as the chain negotiates through its conveying path. Although shown as an I-pin type fastener or connector, the links 712a, 712b and 714 may be retained together via any other type of pin or bolt or stud for connecting the links of a chain, such as formed using the principles discussed above, without affecting the scope of the present invention.

Pin 816 includes a polymeric or plastic sleeve portion 817 molded around shaft portion 816b and ball member 820. The slick surface of the shaft portion 816b and ball member 820 allows sleeve portion 817 to be broken free from shaft portion 816b after sleeve portion 817 is molded thereon, and allows for rotation of sleeve portion 817 about shaft portion 816b and ball member 820. Optionally, sleeve portion 817 may provide a highly durable and slick or low friction surface for engagement of sleeve 817 with the concave surface 714b of center link 714. As can be seen in FIG. 36, sleeve portion 817 may extend along shaft portion 816b to head portions 816a, such that sleeve portion 817 also provides a highly durable and optionally slick or low friction surface for engagement between shaft portion 816b and the end walls 713e of openings 713a of side links 712a, 712b.

Similar to ball members 720 and 720', sleeve portion 817 may be molded over shaft portion 816b after pin 816 has been formed. Because shaft portion 816b and ball member 820 of pin 816 provide a substantially smooth surface and may have a treated slick surface at which sleeve portion 817 is molded, the sleeve portion may be twisted or otherwise moved relative to pin 816 to break the molded sleeve portion away from shaft portion 816b and ball member 820, such that sleeve portion 817 may be generally freely rotatable about shaft portion 816b and ball member 820. When chain 810 is assembled, sleeve portion 817 may thus be movable relative to side links 712a, 712b, center link 714 and pin 816 as the chain flexes or bends through its conveying path.

Similar to ball member 720, sleeve portion 817 may be formed by injection molding a polymeric material around the shaft portion 816b and ball member 820 of pin 816 or may be formed via any other molding process or method, without affecting the scope of the present invention. Optionally, sleeve portion 817 may provide an exterior surface (or may be treated with a material or coating) which has a low coefficient of friction to enhance the relative movement between sleeve portion 817 and center link 714, such as discussed above with respect to ball member 720. As discussed above, concave surface 714b of center link 714 may also or otherwise be coated or treated to provide a surface having a lower coefficient of friction for engagement with sleeve portion 817.

Figure 37:
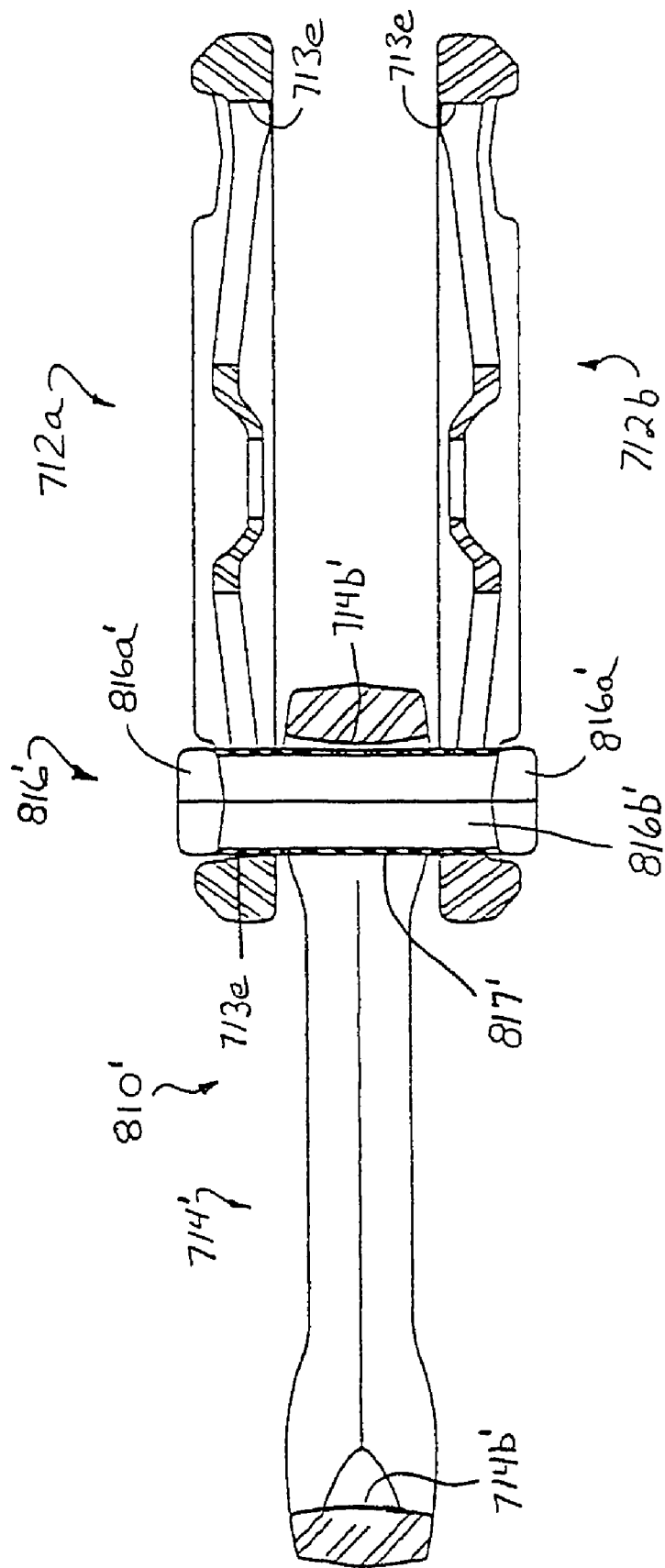
FIG. 37 is a side elevation and partial sectional view of a section of chain in accordance with the present invention, with a generally cylindrical sleeve molded over a generally cylindrical shaft portion of the pin.

Referring now to FIG. 37, a chain or section of chain 810' includes side links 712a, 712b and a center link 714', which are retained together by a pin 816'. Side links 712a, 712b and center link 714'∝0 may be substantially similar to the side links and center link discussed above with respect to chain 710, such that a detailed discussion of these components will not be repeated herein. However, center link 714' of chain 810' may have a generally straight or slightly curved pin engaging surface 714b' at its ends, and does not include a concave pin engaging surface.

Pin 816' includes opposite head portions 816a', similar to pin 716, and a shaft portion 816b' extending between the opposite head portions 816a'. Shaft portion 816' comprises a generally cylindrical shaft and preferably provides a substantially smooth exterior surface. Shaft portion 816b' may be coated or treated in a manner to provide a low coefficient of friction surface of the shaft portion, such as described above with respect to pin 716 of chain 710. For example, the shaft portion may be treated with a TEFLON® coating or type material or a hard, diamond like material or any other low coefficient of friction material or slick material, without affecting the scope of the present invention, to substantially reduce the friction between the components. The low coefficient of friction or slick surface facilitates the breaking free of a molded sleeve 817' and further facilitates rotation or movement of the sleeve relative to the shaft of the pin as the chain negotiates through its conveying path. Although shown as an I-pin type fastener or connector, the links 712a, 712b and 714' may be retained together via any other type of pin or bolt or stud for connecting the links of a chain, such as formed using the principles discussed above, without affecting the scope of the present invention.

Pin 816' includes a polymeric or plastic sleeve portion 817' molded around shaft portion 816b'. Optionally, sleeve portion 817' may provide a highly durable and slick or low friction surface for engagement of sleeve portion 817' with the surface or end 714b' of center link 714'. As can be seen in FIG. 37, sleeve portion 817' may extend along shaft portion 816b' to head portions 816a', such that sleeve portion 817' may also provide a highly durable (and optionally a slick or low friction surface) for engagement of shaft portion 816b' with the end walls 713e of openings 713a of side links 712a, 712b. As discussed above, the end of center link 714' may also or otherwise be coated or treated to provide a surface having a lower coefficient of friction for engagement between sleeve portion 817' and center link 714'.

Similar to ball members 720 and 720' and sleeve portion 817, sleeve portion 817' is molded over shaft portion 816b' after pin 816' has been formed. Because shaft portion 816b' of pin 816' provides a substantially smooth and slick surface at which sleeve portion 817' is molded, the sleeve portion may be twisted or otherwise moved relative to pin 816' to break the sleeve portion away from shaft portion 816b', such that sleeve portion 817' may be generally freely rotatable about shaft portion 816b'. When chain 810' is assembled, sleeve portion 817' is movable relative to side links 712a, 712b, center link 714' and pin 816' as the chain flexes or bends through its conveying path. Similar to ball member 720, sleeve portion 817' may be formed by injection molding a polymeric material around the shaft portion 816b' of pin 816' or may be formed via any other molding process or method, without affecting the scope of the present invention.

Figure 38:
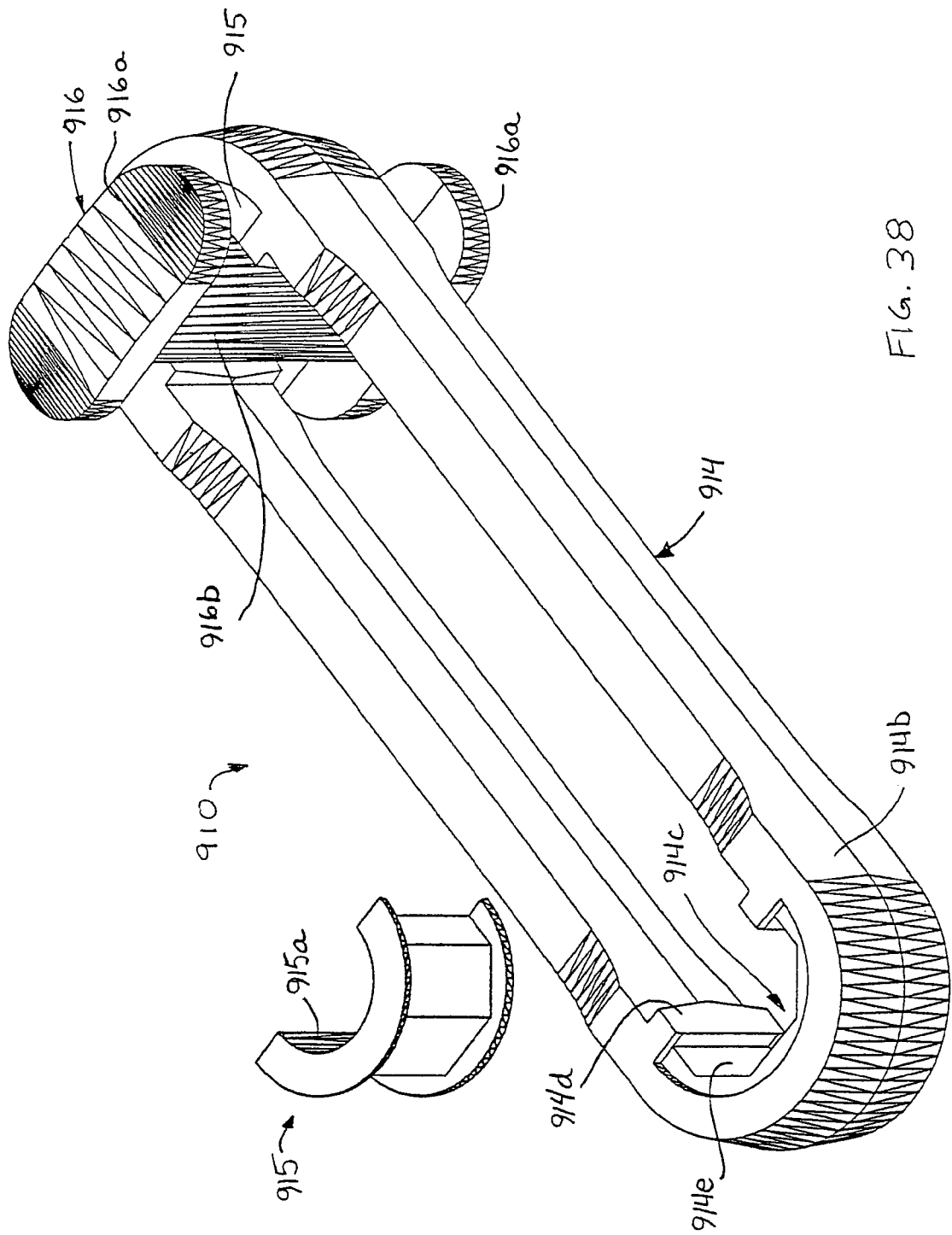
FIG. 38 is a perspective view of a center link and pin of another section of chain in accordance with the present invention, with a plastic insert at each end of the center link.

As shown in FIG. 38, a chain or section of chain 910 may include a pin 916 and side links (not shown) and a center link 914. Center link 914 includes a plastic or polymeric insert or member 915 at each end for engagement with the shaft portion 916b of pin 916. The plastic insert 915 may be coated or treated with or may otherwise provide a durable and slick or low friction material surface for engagement between plastic insert 915 of center link 914 and pin 916. Insert 915 may be molded at an end 914b of center link 914, such as via an injection molding process or the like. However, insert 915 may be molded to center link 914 via other molding means, or may be snapped or removably mounted or affixed to center link 914, without affecting the scope of the present invention.

Pin 916 includes opposite head portions 916a and shaft portion 916b extending between the opposite head portions 916a. Shaft portion 916 may comprise a generally cylindrical shaft and may provide a substantially smooth exterior surface. Similar to pin 716, shaft portion 916 may be coated or treated in a manner to provide a slick or low coefficient of friction surface. However, other pins, bolts, studs or the like may be implemented with chain 910, without affecting the scope of the present invention.

Each end 914b of center link 914 provides a recessed area 914c, such that insert 915 may be molded or retained generally within recessed area 914c and may be substantially fixed or non-movable within recessed area 914c. In the illustrated embodiment, recessed area 914c provides a pair of raised end stops 914d at opposite ends of a generally octagonal, curved surface 914e. The octagonal surface 914e and end stops 914d function to substantially preclude movement of insert 915 relative to center link 914 after insert 915 has been molded thereto. Although shown as an octagonal shaped surface, clearly, other shapes may be provided at recessed area 914c to limit or substantially preclude movement of insert 915 relative to center link 914.

Insert 915 may provide a durable and low coefficient of friction surface 915a for engagement with shaft portion 916b of pin 916. The low coefficient of friction surface may provide enhanced relative movement between pin 916 and center link 914, which may reduce wear on the center link and pin as the chain negotiates through the conveying path. Insert 915 may be made from a durable polymeric or plastic material, such as a nylon material, such as a filled nylon material, a PBT material, or an engineering plastic or the like. Optionally, the insert 915 and/or the shaft portion 916b of pin 916 may be treated or coated with a material which provides a low coefficient of friction to enhance relative movement between the pin and the center link and to reduce the wear on the components to increase the life cycle of the chain.

Although shown as being implemented with a cylindrical shaft pin, it is envisioned that an insert in accordance with the present invention may include a concave surface (not shown in FIG. 38), such as a surface similar to concave surface 714b of center link 714, discussed above, for engagement with a ball member or other sleeve or the like (also not shown in FIG. 38) on the shaft portion of the pin, such as a ball member or sleeves of the types discussed above or the like. The insert may be removably mounted or affixed to the center link to facilitate removal and replacement of the insert to provide a center link with a replaceable wear surface.

Figure 39:
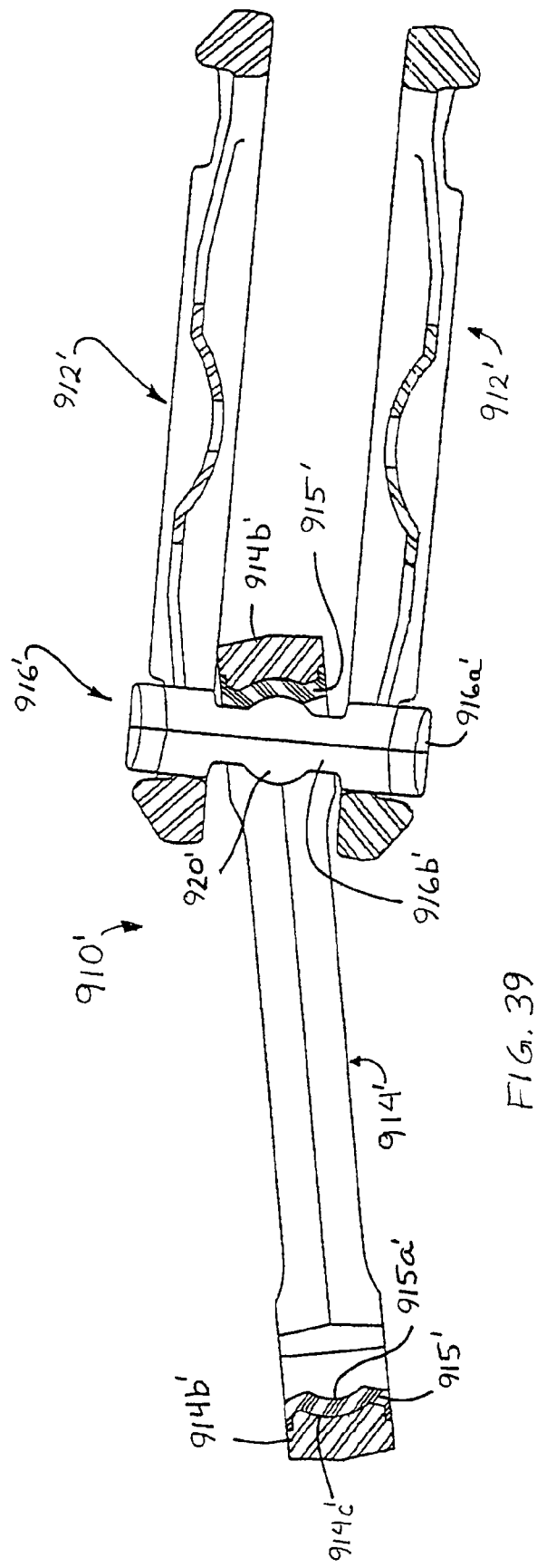
FIG. 39 is a side elevation and partial sectional view of another section of chain in accordance with the present invention, with a plastic insert at each end of the center link and a ball member formed on the shaft of the pin.

Referring now to FIG. 39, a chain or section of chain 910' includes a pin 916', side links 912' and a center link 914'. Center link 914' includes a plastic or polymeric insert or member 915' at each end for engagement with the shaft portion 916b' of pin 916'. The plastic insert 915' may be coated or treated with or may otherwise provide a durable and slick or low friction material surface for engagement between center link 914' and pin 916'. Insert 915' may be molded at an end 914b' of center link 914', such as via an injection molding process or the like. However, insert 915' may be molded to center link 914' via other molding means, without affecting the scope of the present invention. Optionally, insert 915' may be a replaceable insert which may be snapped or otherwise affixed to the end 914b' of the center link 914'. Insert 915' may include a concave engagement surface or socket 915a' for generally uniformly engaging an outer surface of a ball portion or member 920' of pin 916', discussed below.

Pin 916' includes opposite head portions 916a' and shaft portion 916b' extending between the opposite head portions 916a'. Shaft portion 916' comprises a generally cylindrical shaft and includes generally spherical ball member or portion 920' at a generally central portion of shaft portion 916b'. Ball member 920' may be formed as part of the shaft of pin 916' or may be slid or molded or formed onto pin 916', such as utilizing the principles discussed above or the like. The outer surface of shaft portion 916b' and ball portion 920' preferably provides a substantially smooth exterior surface for engagement with insert 915' at center link 914'. Similar to pin 716, shaft portion 916b' and ball portion 920' of pin 916' may be coated or treated in a manner to provide a slick or low coefficient of friction surface. However, other pins, bolts, studs or the like may be implemented with chain 910', without affecting the scope of the present invention.

Similar to center link 914, discussed above, each end 914b' of center link 914' may provide a recessed area (shown generally at 914c'), such that insert 915' may be molded generally within the recessed area and may be substantially fixed or non-movable within the recessed area. Recessed area 914c' may be generally similar to recessed area 914c discussed above, such that a detailed discussion of the recessed area will not be repeated herein. Recessed area 914c' of center link 914' may include a concave mating surface or socket, which generally corresponds to the curvature of socket or surface 915a' of insert 915'. The insert 915' may then be molded to have a generally uniform thickness at the socket area. However, the center link 914' may have a generally flat or otherwise formed mating surface for the insert 915', without affecting the scope of the present invention.

Insert 915' may provide a durable and low coefficient of friction surface 915a' for engagement with ball member or portion 920' of pin 916'. The low coefficient of friction may provide enhanced relative movement between pin 916' and center link 914', which may reduce wear on the center link and pin as the chain negotiates through the conveying path. The corresponding shapes or curvature of the surface 915a' and ball member 920' provides for enhanced flexibility of chain 910', with reduced wear on the ends of center link 914' and/or on the shaft of pin 916'. Insert 915' may be made from a durable polymeric or plastic material, such as a nylon material, such as a filled nylon material, a PBT material, or an engineering plastic or the like. The ball and socket arrangement minimizes any tension and shear stresses on the insert 915', such that insert 915' may be exposed primarily to compression loads, which are less damaging to the plastic insert. Optionally, the insert 915' and/or the ball portion 920' of pin 916' may be treated or coated with a material which provides a low coefficient of friction to enhance relative movement between the pin and the center link and to reduce the wear on the components to increase the life cycle of the chain.

Figure 40:
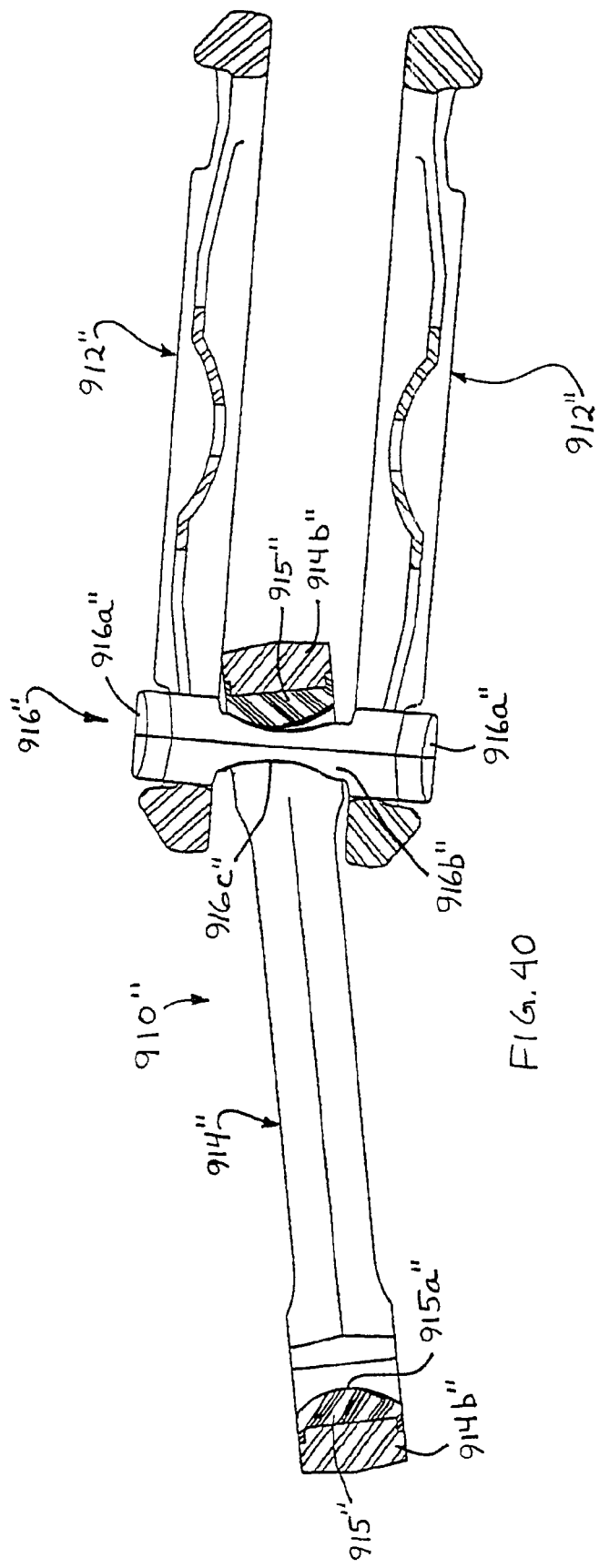
FIG. 40 is a side elevation and partial sectional view of another section of chain in accordance with the present invention, with a rounded plastic insert at each end of the center link and a concave or narrowed shaft of the pin.
Figure 45:
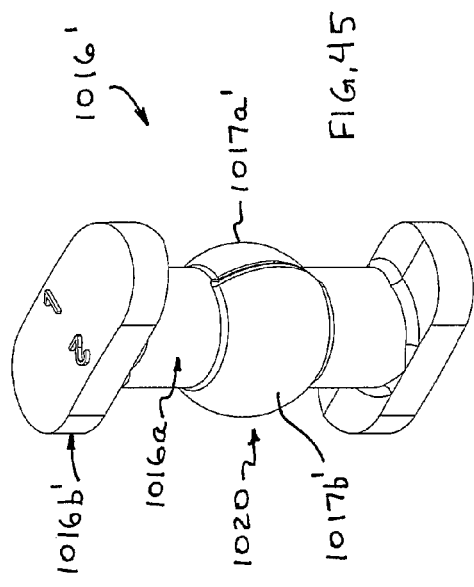
FIG. 45 is a perspective view of a pin having a rotationally non-symmetrical ball member in accordance with the present invention.
Figure 48:
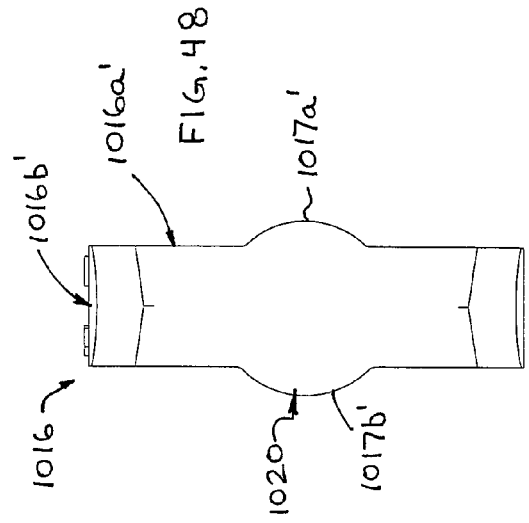
FIG. 48 is another side elevation of the pin of FIG. 45.
Figure 47:
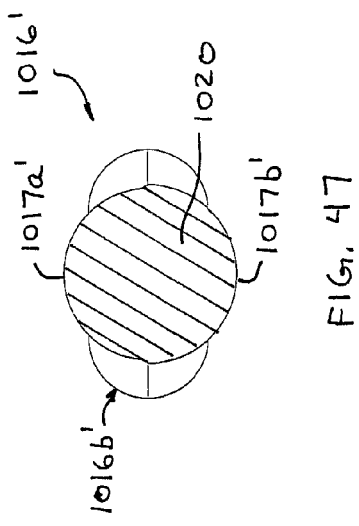
FIG. 47 is a sectional view taken along the line B-B in FIG. 46.
Figure 46:
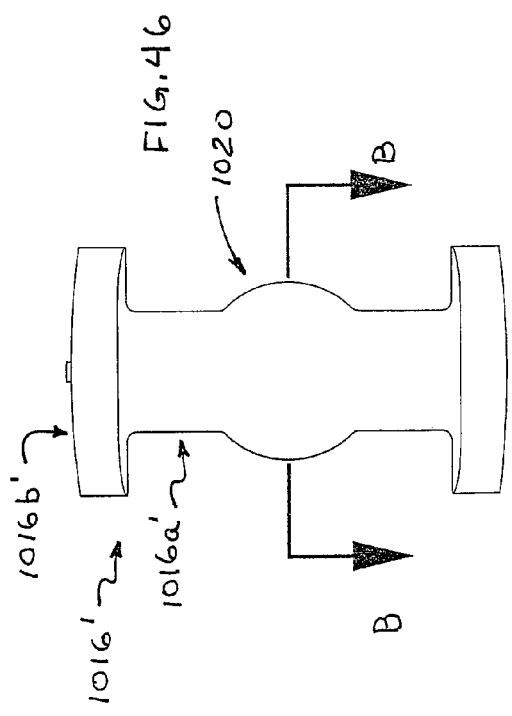
FIG. 46 is a side elevation of the pin of FIG. 45.
Figure 53:
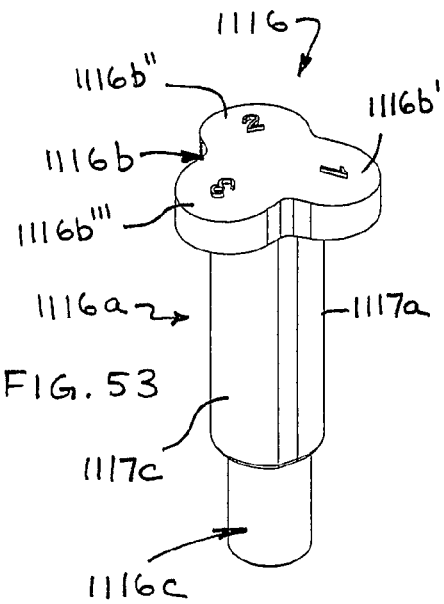
FIG. 53 is a perspective view of a rotationally non-symmetrical pin of the chain section of FIGS. 49-53.
Figure 54:
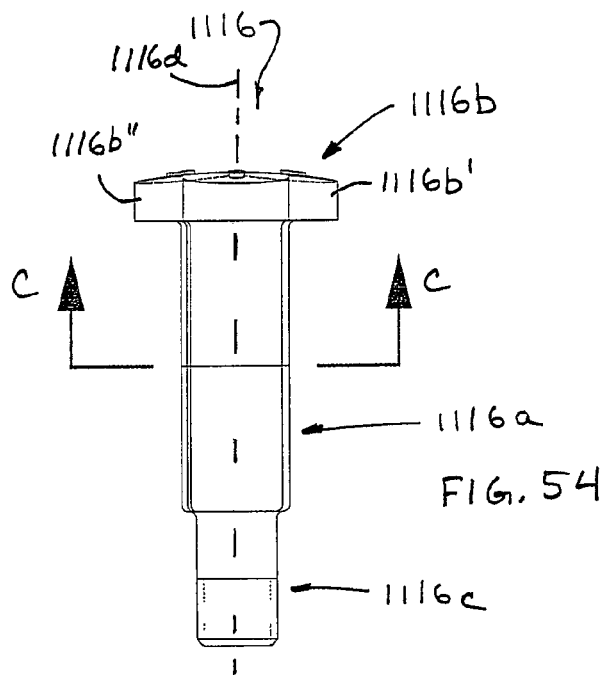
FIG. 54 is a side elevation of the pin of FIG. 53.
Figure 56:
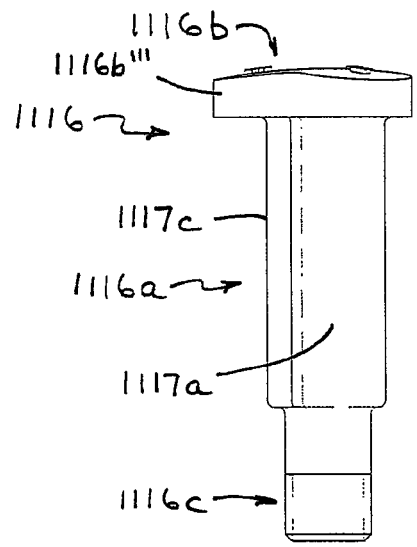
FIG. 56 is another side elevation of the pin of FIG. 53.
Figure 55:
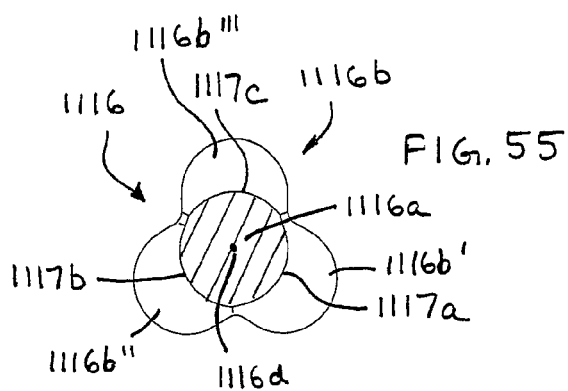
FIG. 55 is a sectional view taken along the line C-C in FIG. 54.

Optionally, as shown in FIG. 40, a chain or section of chain 910" may include a pin 916", side links 912" and a center link 914". Center link 914" includes a plastic or polymeric insert or member 915" at each end for engagement with the shaft portion 916b" of pin 916". The plastic insert 915" may be coated or treated with or may otherwise provide a durable and slick or low friction material surface for engagement between center link 914" and pin 916". Insert 915" may be molded at an end 914b" of center link 914", such as via an injection molding process or the like. However, insert 915" may be molded to center link 914" via other molding means, without affecting the scope of the present invention. Insert 915" may include a convex engagement surface 915a" for generally uniformly engaging a narrowed, outer surface of shaft portion 916b" of pin 916", as discussed below.

Pin 916" includes opposite head portions 916a" and shaft portion 916b" extending between the opposite head portions 916a". Shaft portion 916" comprises a generally cylindrical shaft and includes a narrowed portion 916c" at a generally central portion of shaft portion 916b". Narrowed portion 916c" provides an inwardly curved surface for generally uniform engagement with the outwardly curved surface 915a" of insert 915". The outer curved surface 916c" of shaft portion 916b" may provide a substantially smooth exterior surface for engagement with convex surface 915a" of insert 915" at center link 914". Similar to pin 716, shaft portion 916" may be coated or treated in a manner to provide a slick or low coefficient of friction surface. However, other pins, bolts, studs or the like may be implemented with chain 910", without affecting the scope of the present invention.

Center link 914" may be substantially similar to center links 914, 914', discussed above, such that a detailed discussion of the center link 914" will not be repeated herein. Suffice it to say that insert 915" may be molded generally within a recessed area at each end of center link 914" and may be substantially fixed or non-movable within the recessed area. Optionally, the insert may be snapped or otherwise affixed to or removably mounted to the center link and may provide a removable and replaceable wear surface for the center link.

Similar to inserts 915 and 915', insert 915" may provide a durable and low coefficient of friction surface 915a" for engagement with the narrowed curved portion 916c" of shaft 916b" of pin 916". The low coefficient of friction provides enhances relative movement between pin 916" and center link 914", which may reduce wear on the center link and pin as the chain negotiates through the conveying path. The corresponding shapes or curvature of the outwardly curved surface 915a" of insert 915" and the inwardly curved surface 916c" of pin 916" provides for enhanced flexibility of chain 910", with reduced wear on the ends of center link 914" and/or on the shaft of pin 916". Insert 915" may be made from a durable polymeric or plastic material, such as a nylon material, such as a filled nylon material, a PBT material, or an engineering plastic or the like. Optionally, the insert 915" and/or the curved surface 916c" of pin 916" may be treated or coated with a material which provides a low coefficient of friction surface or coating to enhance relative movement between the pin and the center link and to reduce the wear on the components to increase the life cycle of the chain.

Although each of the embodiments of chain sections discussed above with respect to FIGS. 33-40 includes a pin with oval or rectangular head portions, it is further envisioned that a round-headed pin may be provided (such as with any of the chains of the present invention discussed above) with a rounded head at each end of the pin and a ball member and/or sleeve or the like on the shaft portion between the heads. The head portions may then insert through enlarged, generally circular openings in the side links and may slide outwardly toward the ends of the side links to a narrowed opening. The narrowed opening substantially precludes the circular heads from moving therethrough, and thus retains the side links relative to the center links and the pin. The side links include a recessed area around the narrowed opening to receive the rounded head therein to substantially preclude movement of the pin relative to the side links toward the enlarged openings in the side links. The pin is thus allowed to rotate relative to the side links and the center link, while allowing greater flexibility and/or reduced wear of the chain.

Although shown as being joined by a pin in FIGS. 33-40, it is further envisioned that the linkages of the chains of the present invention may otherwise be joined by other pins, bolts, studs, half-bolt / half-pin type pins or fasteners, or any other fastening or joining means for retaining the side links and the center links together. The fastening or joining means may be formed using the principles discussed above.

It is envisioned that any of the pin and chain link embodiments discussed above may have wear surface components comprising any suitable material. For example, the wear surface components may comprise steel or other metallic material, bronze or other softer metallic material, a polymeric material, such as engineering plastics or other strong and durable polymeric material, a ceramic material, a sintered material, a TEFLON® coating or material, a fluorocarbon material or the like. It is also envisioned that any of the pin and chain link embodiments discussed above may include a low coefficient of friction or slick coating at or on the wear surfaces of the pins and/or chain links. The coating thus may provide enhanced relative movement or rotation or sliding between the wear surfaces to enhance performance of the section of chain and to increase the life cycle of the section of chain. The coating may comprise a TEFLON® type coating or a diamond like coating or the like or any other low coefficient of friction or slick coating or the like suitable for such an application.

The present invention thus may provide a diamond like coating (DLC) over a metallic or plastic (or other material) wear surface of the pin or chain link. The wear surface component may define a substantially smooth wear surface to enhance sliding or moving engagement with a corresponding wear surface of the section of chain. The metallic wear surface component or components may be formed to be substantially smooth via any known means, such as via tumbling, vibrating or the like of the component, such as tumbling with ceramic chips or steel chips or the like, while the plastic wear surface component or components may be molded to the desired form and/or tumbled or vibrated to achieve the desired surface smoothness, without affecting the scope of the present invention.

The diamond like coating on the wear surface or surfaces provides enhanced performance and an increased life cycle to the section of chain. Because such a diamond like coating may be sensitive to point loading and shock in some applications, the wear surface components of the present invention may comprise a ball member and a correspondingly formed socket to reduce or substantially eliminate such point loading conditions. Such ball and socket arrangements reduce such shock or impact or point loading concerns by spreading out the contact area over a wider area.

Therefore, the present invention provides a sleeve and/or a ball member and a pin or bolt or stud which allows for pivotal movement of the center link via sliding engagement of the center link along the ball member and via sliding engagement of the sleeve or ball member around the shaft of the pin. This provides greater flexibility to the chain and may allow the chain to negotiate sharper vertical curves in the conveying path without binding the links or joints of the chain. The ball member and correspondingly formed concave surface thus may distribute the loads over a generally constant surface area, reducing or substantially eliminating the stress concentration that typically occur when conventional chains articulate through vertical inclines and declines. The ball member and concave surface engagement may also function to distribute the loads between the chain links and pin or bolt or stud over a greater surface area than conventional chains. This decreases the wear on the pin and chain links and may result in less maintenance and a greater life cycle for the chain.

The ball member, and/or the sleeve over the ball member or shaft of the pin, and/or the insert at the center link may comprise a high strength, durable polymeric or plastic material. The selected material may comprise a highly durable material which may minimize wear of the ball member and/or the concave surface when the chain is in use and moving through various curves while under load. The material may be selected or treated or coated to also provide a low coefficient of friction surface to enhance movability of the components relative to one another and to reduce wear on the components. Optionally, one or more of the contacting surfaces may be treated or coated with a material which may provide a low coefficient of friction surface between the contacting components to further reduce wear on the chain. The ball member, sleeve, insert or other wear surface component may optionally comprise a metallic material, such as steel or the like or bronze or other softer metallic or the like, and may be coated or treated to enhance the low friction engagement between respective wear surfaces. Because the ball member, pin and/or center link of the present invention may include a low friction surface, the present invention provides for a reduced amount of friction between the center link and the pin and/or between the side links and the pin, which further reduces wear on the components and may result in less maintenance and a greater life cycle of the chain. It is envisioned that the low friction surfaces of the present invention may substantially reduce or obviate the need for lubrication of the joints of the chain during use. The present invention thus may provide a non-lubricated chain with plastic components.

The present invention also provide for a unitary plastic component formed or molded onto a pin to enhance the performance of the chain. The molded ball member or sleeve may be broken free from the pin to allow relative movement between the pin and the ball member or sleeve while also allowing relative movement between the ball or sleeve and the chain links. The molded ball or sleeve is thus a unitarily formed, durable member which provides an engagement component between the metal components of the chain. Optionally, a metal or plastic ball or sleeve may be slid or pressed onto a stud or bolt type pin and may be removable therefrom.

The present invention thus provides a chain which has improved flexibility to ease negotiation of the chain links through sharp vertical changes in the chain path. The ball member or the narrowed shaft portion of the present invention allows for pivotable movement between the center link and side links as the chain negotiates through the conveying path. More particularly, the ball member or narrowed shaft portion allows the center link to pivot about a longitudinal axis of the pin in a conventional manner, while also allowing the center link to pivot relative to the pin, such as about the ball member or within the curved shaft portion, in other directions as well, such as pivoting upward or downward relative to the side links. The ball member/curved engagement surface and pin combination of the present invention thus allows the chain to negotiate inclines along the conveying path without binding or excessive wear occurring at the chain joints. Also, the ball and socket type connection of the present invention allows the chain to flex about both axes, which further may allow the chain to twist or corkscrew over a sufficient length of track. The present invention thus provides for a chain with much greater flexibility and greater life cycles which is easy to manufacture and assemble.

Changes and modifications in the specifically described embodiments may be carried out without departing from the principles of the present invention, which is intended to be limited only by the scope of the appended claims, as interpreted in accordance with the principles of patent law.

The embodiments of the invention in which an exclusive property or privilege is claimed are defined as follows:

1. A conveying system for conveying product along a conveying path, said conveying system comprising:
   a track element;
   a plurality of trolleys movable along said track element;
   a chain connecting to said trolleys for moving said trolleys along said track element;
   wherein said chain comprises a plurality of chain sections having a pin that connects a respective center chain link with a respective pair of side chain links, each of said center chain links having a pin engaging surface at an end thereof;
   wherein said pin of a respective chain section extends through said side chain links and said center chain link and connects said side chain links and said center chain link with said center chain link being disposed at least partially between said side chain links, said pin comprising opposite end portions and a shaft portion extending between said opposite end portions, wherein said shaft portion comprises first, second and third wear surfaces for selective engagement with said pin engaging surface of said center chain link; and
   wherein said pin is selectively adjustable to first, second and third positions relative to said chain links to generally align a respective one of said first, second and third wear surfaces with said pin engaging surface of said center chain link, said pin being generally non-rotatable relative to at least one of said side chain links when in each of said first, second and third positions.

2. The conveying system of claim 1 further comprising a chain wear measurement device operable to detect at least a portion of said chain and to determine a degree of wear in said chain as said chain moves along said conveying path, said pin being selectively adjustable to a selected one of said first, second and third positions in response to an output of said wear measurement device.

3. The conveying system of claim 1, wherein said shaft portion comprises a generally cylindrical shaped shaft portion, and wherein said first, second and third wear surfaces comprise respective portions of said generally cylindrical shaft portion.

4. The conveying system of claim 1, wherein said first wear surface has a first radius of curvature and said second wear surface has a second radius of curvature, said second radius of curvature being greater than said first radius of curvature so that said second wear surface, when engaged with said pin engaging surface, accommodates for wear of said pin engaging surface that occurs during operation of said section of chain when said first wear surface is engaged with said pin engaging surface.

5. The conveying system of claim 1, wherein at least one of said end portions comprises a head portion having at least one lobe extending radially outwardly therefrom and radially outwardly relative to said shaft portion for engaging a receiving portion of a respective one of said side chain links to limit rotation of said pin relative to said respective side chain link when said pin is in a selected one of said first, second and third positions.

6. The conveying system of claim 1, wherein said shaft portion is rotationally non-uniform, said first wear surface having a different radius than said second and third wear surfaces and said second wear surface having a different radius than said third wear surface.

7. The conveying system of claim 1, wherein said pin includes indicia indicative of which of said first, second and third wear surfaces is generally aligned with said pin engaging surface.

8. The conveying system of claim 1, wherein one of said end portions of said pin comprises a threaded portion for engaging a fastener.

9. A method of adjusting a pin of a section of chain to adjust a wear surface of said pin relative to a pin engaging surface of a center link of said section of chain, said method comprising:
   providing a conveying system for conveying product along a conveying path, said conveying system comprising a track element, a plurality of trolleys movable along said track element, and a chain having a plurality of sections of chain joined together and connected to said trolleys for moving said trolleys along said track element;
   wherein at least some of said sections of chain comprise a center chain link and two side chain links and a pin connecting said center chain link to said side chain links via insertion of said pin through said chain links, said pin comprising opposite end portions and a shaft portion extending between said opposite end portions, said shaft portion having first and second wear surfaces that selectively engage a pin engaging surface of said center chain Link, at least one of said end portions of said pin being non-rotatably positionable at least one of said side chain links when said pin is in a selected one of first and second positions;
   non-rotatably positioning said pin in said first position, said first wear surface being generally aligned with said pin engaging surface of said center chain link when said pin is in said first position;
   wearing said first wear surface via relative movement of said first wear surface and said pin engaging surface while said chain conveys product along said conveying path during operation of said conveying system; and
   selectively rotating said pin and non-rotatably positioning said pin in said second position, said second wear surface being generally aligned with said pin engaging surface of said center chain link when said pin is in said second position.

10. The method of claim 9 including determining a degree of wear of said chain, wherein selectively rotating said pin comprises selectively rotating said pin in response to the determination of the degree of wear of said chain.

11. The method of claim 9, wherein providing a conveying system comprises providing a conveying system having at least some of said sections of chain comprising a pin with said shaft portion of said pin comprising a rotationally non-uniform shaft portion defining said first and second wear surfaces, wherein said second wear surface comprises at least one of (a) a larger radius than said first wear surface and (b) a larger radius of curvature than said first wear surface.

12. The method of claim 9 including providing indicia at said pin indicative of which of said first and second wear surfaces is generally aligned with said pin engaging surface.

* * * * *

UNITED STATES PATENT AND TRADEMARK OFFICE
CERTIFICATE OF CORRECTION

| | | |
|---|---|---|
| PATENT NO. | : 7,726,469 B2 | Page 1 of 1 |
| APPLICATION NO. | : 11/781609 | |
| DATED | : June 1, 2010 | |
| INVENTOR(S) | : Charles C. Frost | |

It is certified that error appears in the above-identified patent and that said Letters Patent is hereby corrected as shown below:

Col. 7, Line 12:
"51 3c" should be --513c--

Col. 28, Line 4:
"714 $\propto$ 0" should be --714'--

Col. 35, Claim 9, Line 27:
"Link" should be --link--

Signed and Sealed this
Fifteenth Day of November, 2011

David J. Kappos
*Director of the United States Patent and Trademark Office*